US010228043B2

(12) United States Patent
Ng et al.

(10) Patent No.: US 10,228,043 B2
(45) Date of Patent: Mar. 12, 2019

(54) HYDRAULIC VIBRATORY TOOL FOR DRIVING RIVETS OF CONVEYOR BELT FASTENERS

(71) Applicant: Flexible Steel Lacing Company, Downers Grove, IL (US)

(72) Inventors: Pan Yim Ng, Chicago, IL (US); David A. Lotarski, Sheridan, IL (US); Ahmed Mohamed Nagib Mohamed Elmetwaly Elmekawy, Lisle, IL (US)

(73) Assignee: Flexible Steel Lacing Company, Downers Grove, IL (US)

( * ) Notice: Subject to any disclaimer, the term of this patent is extended or adjusted under 35 U.S.C. 154(b) by 483 days.

(21) Appl. No.: 14/671,084

(22) Filed: Mar. 27, 2015

(65) Prior Publication Data

US 2015/0273568 A1     Oct. 1, 2015

Related U.S. Application Data

(60) Provisional application No. 61/972,016, filed on Mar. 28, 2014.

(51) Int. Cl.
  *B21J 15/20*     (2006.01)
  *F16G 3/16*      (2006.01)
  *F16B 5/04*      (2006.01)
(52) U.S. Cl.
  CPC .................. *F16G 3/16* (2013.01); *F16B 5/04* (2013.01); *Y10T 29/49833* (2015.01)
(58) Field of Classification Search
  CPC ......... F16G 3/16; F16B 5/04; Y10T 29/49833
  See application file for complete search history.

(56) References Cited

U.S. PATENT DOCUMENTS 3,670,943 A   6/1972   Berger
4,440,336 A   4/1984   Kifor
(Continued)

FOREIGN PATENT DOCUMENTS

CN   201696545 U    1/2011
CN   202555759 U    11/2012

OTHER PUBLICATIONS

Notification of Transmittal of the International Search Report and the Written Opinion of the International Searching Authority, or the Declaration from the International Bureau of WIPO for corresponding International Application No. PCT/US2015/023073, dated Aug. 28, 2015, 14 pages.

(Continued)

*Primary Examiner* — John C Hong
(74) *Attorney, Agent, or Firm* — Fitch, Even, Tabin & Flannery LLP

(57) ABSTRACT

In one aspect, a vibratory tool is provided for driving a plurality of rivets out from bores of a guide block into an underlying conveyor belt. The tool has a body, a hydraulically operated main drive rod mounted to the body, and a driver aligned with the main drive rod and slidably mounted to the body. The driver has a plurality of elongated drive rod members for engaging and simultaneously driving multiple rivets out of the guide block bores. The driver has an intermediate impact surface for being impacted by the main drive rod impact end as the main drive rod impact end rapidly reciprocates between retracted and extended positions. The driver also has a rearwardly extending spacer wall for axially spacing the driver intermediate impact surface and the main drive rod impact end in the retracted position thereof by at least a predetermined axial distance sized for optimizing energy transfer from the main drive rod to the driver.

24 Claims, 37 Drawing Sheets

(56) References Cited

U.S. PATENT DOCUMENTS

| | | |
|---|---|---|
| 4,620,657 A | 11/1986 | Gladding et al. |
| 4,688,711 A | 8/1987 | Gladding et al. |
| D324,472 S | 3/1992 | Gandlmayr |
| D330,318 S | 10/1992 | Snider |
| D331,357 S | 12/1992 | Snider |
| D339,277 S | 9/1993 | Snider |
| 5,337,946 A | 8/1994 | Richardson et al. |
| 5,487,217 A | 1/1996 | Richardson et al. |
| D369,732 S | 5/1996 | Rosier |
| D369,733 S | 5/1996 | Rosier |
| 5,524,808 A | 6/1996 | Vogrig |
| D377,898 S | 2/1997 | Frame |
| 5,653,372 A | 8/1997 | Richardson et al. |
| 5,680,790 A | 10/1997 | Richardson et al. |
| D407,615 S | 4/1999 | Cerulo et al. |
| D423,896 S | 5/2000 | Steiner et al. |
| 7,076,864 B2 | 7/2006 | Malaka |
| 7,077,263 B1 | 7/2006 | Richardson et al. |
| 7,493,682 B2 | 2/2009 | Richardson et al. |
| 7,818,858 B2 | 10/2010 | Daniels et al. |
| 8,082,646 B2 | 12/2011 | Richardson et al. |
| 8,403,139 B2 | 3/2013 | Richardson et al. |
| 2004/0168294 A1 | 9/2004 | Malaka |
| 2005/0230278 A1 | 10/2005 | Vogrig et al. |
| 2007/0124911 A1 | 6/2007 | Lang et al. |
| 2009/0106973 A1 | 4/2009 | Richardson et al. |
| 2009/0107810 A1 | 4/2009 | Richardson et al. |
| 2012/0227231 A1 | 9/2012 | Richardson et al. |
| 2012/0228170 A1 | 9/2012 | Richardson et al. |
| 2013/0105542 A1 | 5/2013 | Richardson et al. |

OTHER PUBLICATIONS

U.S. Appl. No. 61/839,679, filed Jun. 26, 2013, 9 pages.
U.S. Appl. No. 29/469,591, filed Oct. 11, 2013, 9 pages.
Chinese Patent Office, Office Action dated Dec. 14, 2017 from corresponding Chinese Patent Application No. 201580026939.8, 10 pages.
Chinese Patent Office, Search Report dated Dec. 6, 2017 from corresponding Chinese Patent Application No. 201580026939.8, 2 pages.

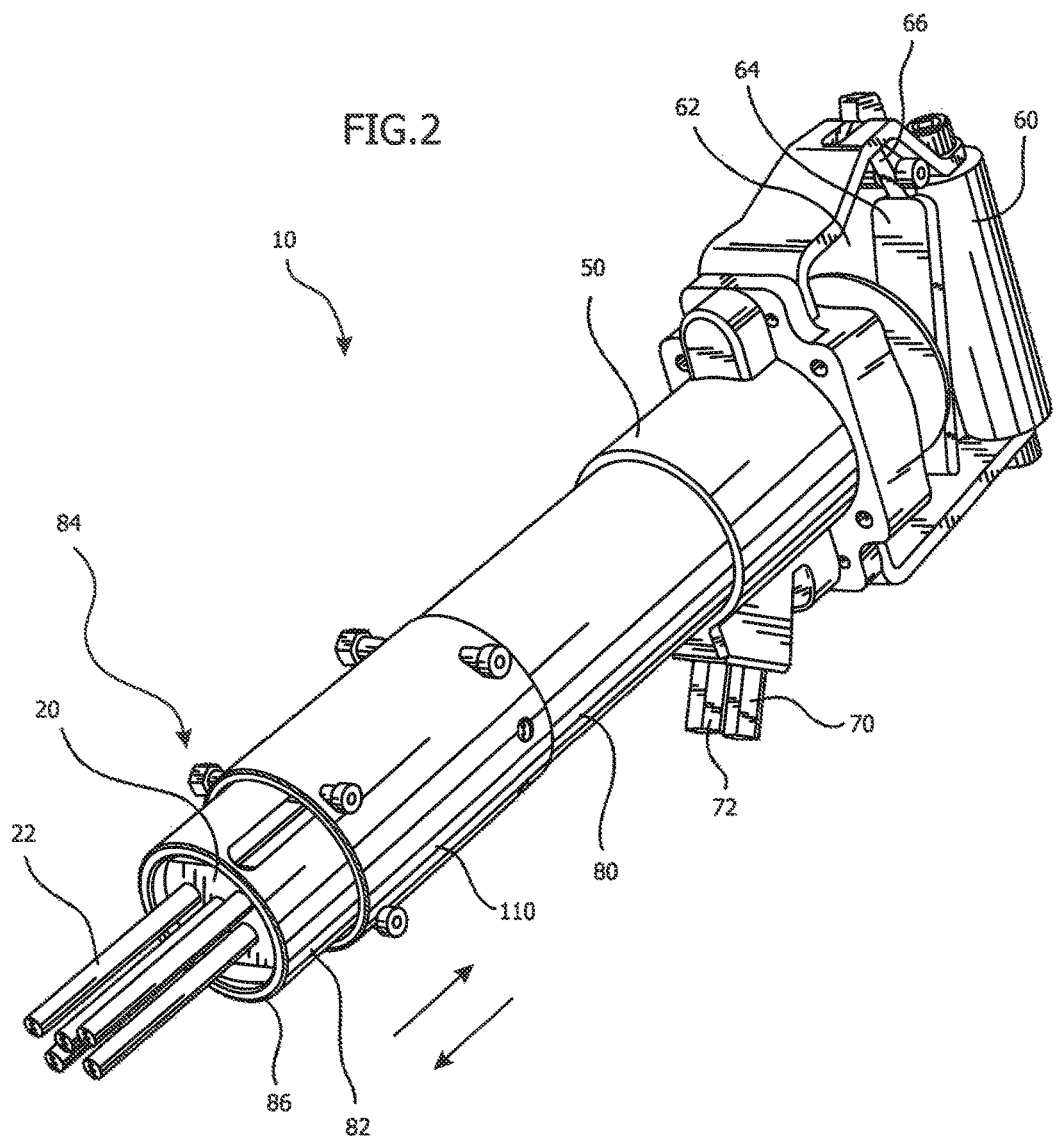

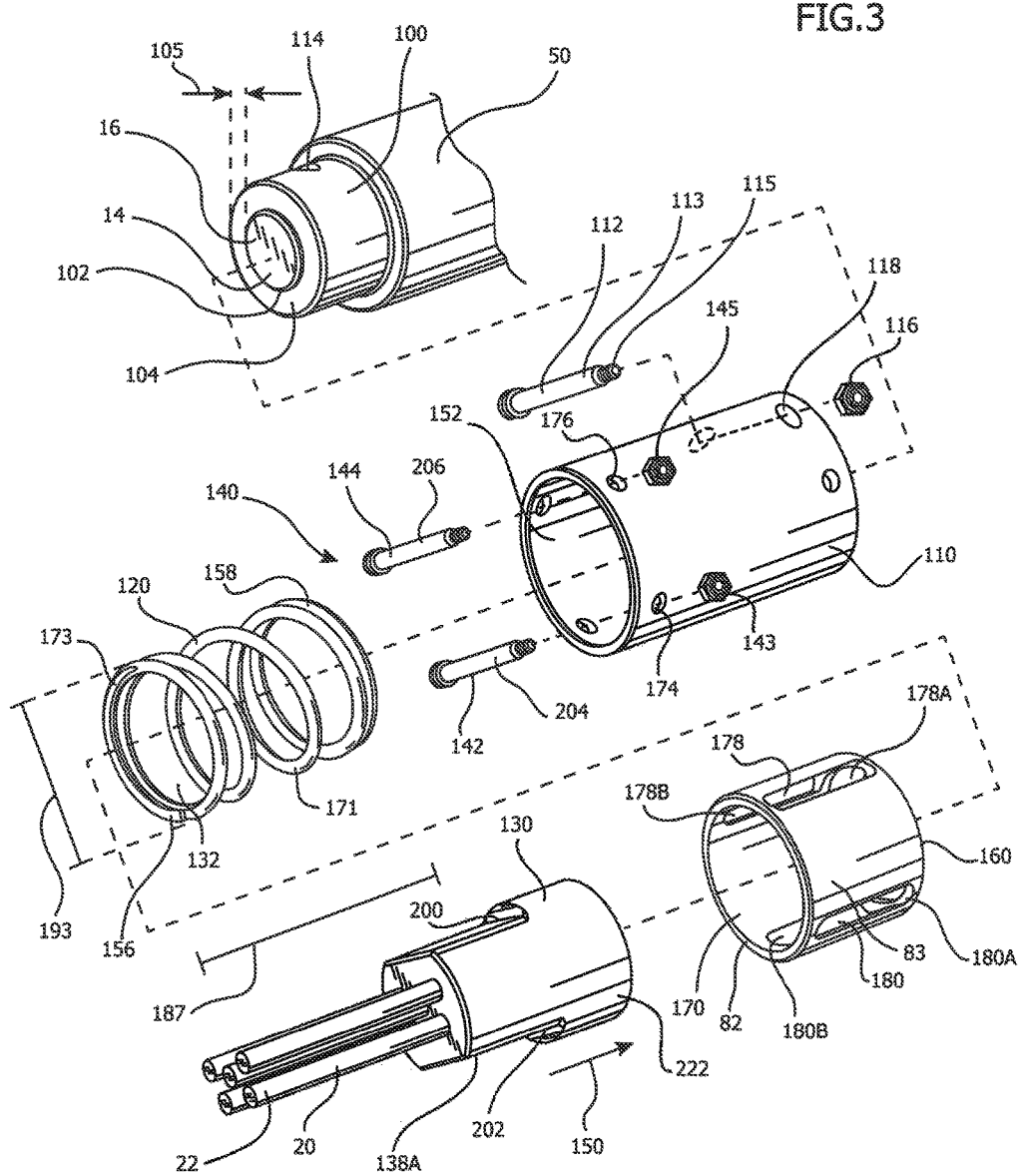

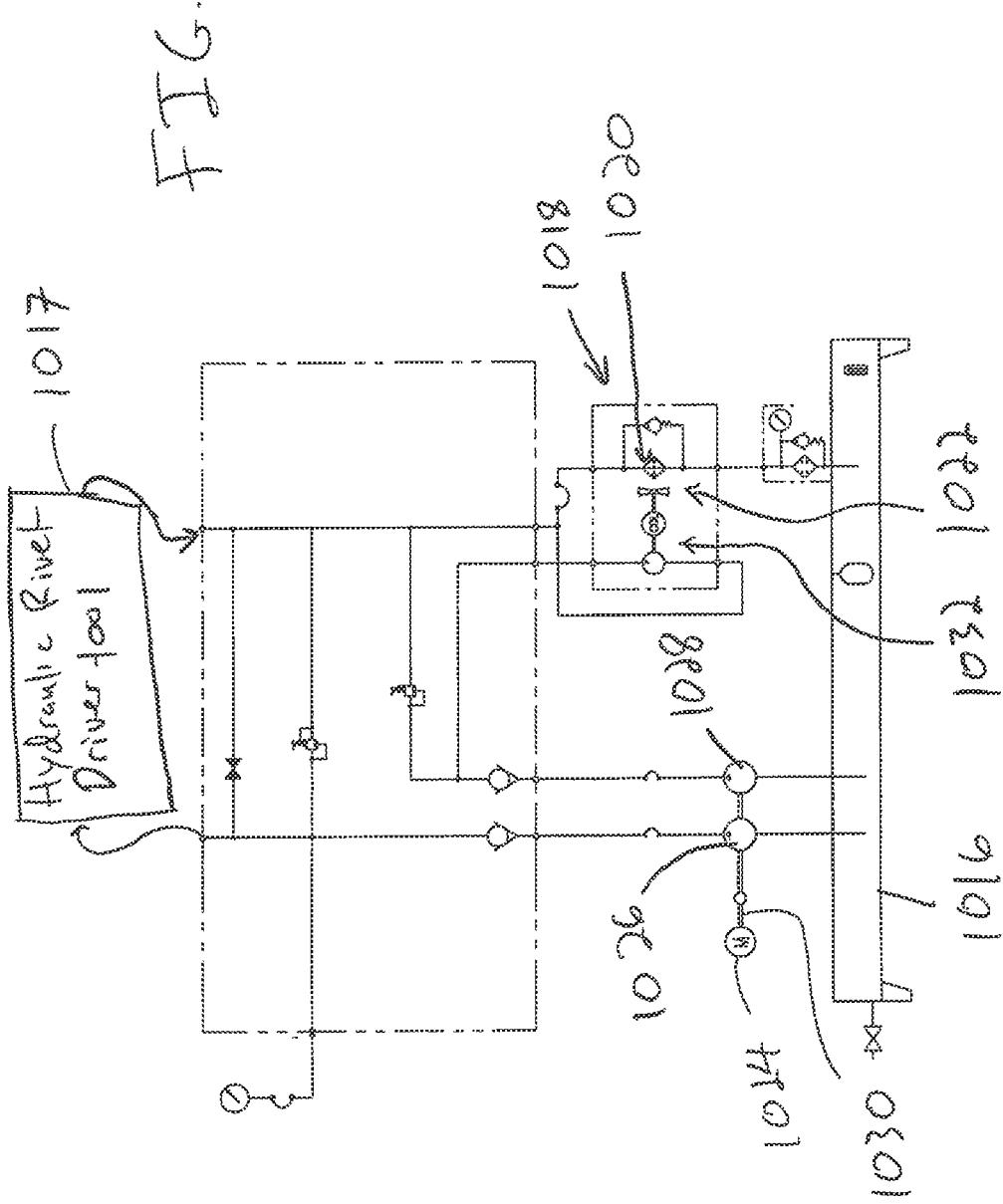

HYDRAULIC VIBRATORY TOOL FOR DRIVING RIVETS OF CONVEYOR BELT FASTENERS

CROSS REFERENCE TO RELATED APPLICATION

This application claims the benefit of U.S. Provisional Patent Application No. 61/972,016, filed Mar. 28, 2014, which is hereby incorporated by reference herein in its entirety.

FIELD OF THE INVENTION

The invention relates to systems for attaching fasteners to ends of conveyor belts and, more particularly, to power tools for attaching fasteners to ends of conveyor belts.

BACKGROUND OF THE INVENTION

Powered applicator systems are known for attaching fasteners to ends of a conveyor belt. U.S. Pat. No. 5,524,808 discloses a power tool and a separate driver for applying rivets of a fastener to a conveyor belt end. The driver has multiple driving rods that are arranged to be inserted in bores of a guide block to drive rivets out from the guide block bores and through the conveyor belt end. The tool has a nose assembly with a large central bore that is sized to allow the tool to be advanced downward toward the guide block with a body of the driver being received in the central bore. In this regard, the driving rods of the driver have already been placed into the bores of the guide block before the tool is lowered over the driver.

In use, the tool and driver are transported to the conveyor belt to be repaired and the driving rods of the driver are inserted into bores of a guide block above an end of the conveyor belt. The nose assembly of the tool is advanced downward onto the driver body so that the driver body is received in the nose assembly central bore. The nose assembly is pressed downward onto the guide block, which closes a safety switch of the tool, and the user pulls a trigger of the tool which causes a pneumatic cylinder of the tool to fire. The firing of pneumatic cylinder drives a rod downward within the nose assembly into contact with the driver body. The multiple driving rods transfer the impact from the rod striking the driver body to the rivets in the guide block bores thereby driving the rivets out of the bores and into the conveyor belt below. Because the powered tool and driver are separate components, a user needs to manually position the driver relative to the guide block to fit the driving rods into the guide block bores, align the central bore of the tool nose assembly with the driver, advance the aligned tool so that the driver body is received in the tool nose assembly central bore, and fully lower the tool nose assembly onto the guide block. As is apparent, having the tool and the driver be separate undesirably requires extra handling and alignment steps.

Hydraulic power packs for hydraulic tools are known. Generally, the greater the power or pressure rating of the tool, the greater the size of the power pack due to increased sizing of the hydraulic pump and the reservoir for the hydraulic fluid. With tools having relatively high operating pressures, the hydraulic fluid tends to become very hot due to the energy provided by the hydraulic fluid and the operation of the high pressured hydraulic tool. For this reason, reservoirs for the hydraulic fluid are sized to be larger to allow the hydraulic fluid to cool.

SUMMARY OF THE INVENTION

In accordance with one aspect of the present invention, a vibratory tool is provided for quickly and easily driving a plurality of rivets out from bores of a guide block into an underlying conveyor belt. The tool has a body, a hydraulically actuated main drive rod mounted to the body, and a driver slidably mounted to the body for travel along a driving axis. The driver has a plurality of elongated drive rod members configured and sized to extend forwardly into guide block bores for engaging and simultaneously driving multiple rivets out of the guide block bores. The hydraulically actuated main drive rod has an impact end that rapidly reciprocates along the driving axis between retracted and extended positions and impacts an intermediate impact surface of the driver, which causes the drive rod members to drive the rivets out of the guide block bores and into the conveyor belt. The vibratory tool thereby provides an efficient, easy-to-use approach for driving multiple rivets into a conveyor belt.

The driver includes a rearwardly extending spacer wall for axially spacing the driver intermediate impact surface and the main drive rod impact end in the retracted position thereof by at least a predetermined axial distance. This minimum predetermined axial distance created by the rearwardly extending spacer wall is sized to optimize the energy transfer from the main drive rod to the driver when the main drive rod end impacts the driver impact surface. It has been discovered that the rearwardly extending spacer wall is particularly advantageous when used with the hydraulically actuated main drive rod because it permits the main drive rod impact end to impact the driver impact surface when the main drive rod impact end is at a "sweet spot" along its travel which optimizes energy transfer to the driver (and is discussed in greater detail below). By optimizing energy transfer from the main drive rod to the driver, the rivets can be fully driven into the conveyor belt end with fewer impacts of the main drive rod impact end against the driver. Driving the rivets into the conveyor belt end with fewer impacts decreases the time it takes to attach a fastener to the conveyor belt. This time savings is multiplied with each fastener applied to the ends the conveyor belt and thereby provides a significant reduction in the overall downtime of the conveyor belt.

The energy transfer from the main drive rod to the driver may be optimized by ensuring that the main drive rod impact end strikes the driver impact surface with maximum or near-maximum kinetic energy. More specifically, the main drive rod has a generally fixed mass but the velocity of the main drive rod varies as the main drive rod impact end travels between the retracted and extended positions thereof. The varying velocity of the main drive rod produces a varying kinetic energy of the main drive rod as the main drive rod impact end travels between the retracted and extended positions. This velocity profile (and corresponding kinetic energy profile) is unique for a hydraulically actuated main drive rod because the main drive rod velocity begins to decrease much earlier than pneumatically actuated drive rods due to the use of hydraulic fluid to slow the main drive rod. As an example of the velocity profile of a hydraulically actuated main drive rod, the main drive rod velocity may be zero when the main drive rod impact end is in the retracted position, the main drive rod velocity reaches a maximum as the main drive rod impact end travels toward the extended position, and the velocity decreases sharply after the main drive rod achieves its maximum velocity and as the main drive rod impact end travels toward the extended position.

The energy transfer from the main drive rod to the driver is therefore optimized by the driver rearwardly extending spacer wall which axially spaces the driver impact surface and the retracted main drive rod impact end by at least a predetermined axial distance. This ensures that the main drive rod impact end travels at least the predetermined axial distance from the retracted position before striking the driver impact surface. The predetermined axial distance is preferably chosen to match the position of the main drive rod impact end where it has maximum or near-maximum velocity. In this manner, the main drive rod impact end will have to travel at least the predetermined axial distance before striking the driver impact surface, which permits the main drive rod impact end to achieve its maximum or near-maximum velocity and an associated maximum or near-maximum kinetic energy before striking the driver impact surface. Further, the rearwardly extending spacer wall of the driver may be sized to ensure the main drive rod velocity (and corresponding kinetic energy) is within a predetermined range to accommodate for some variation in the position of the driver during operation of the tool. The predetermined range ensures that, even with this variation, the main drive rod impact end generally transmits the maximum or near-maximum kinetic energy to the driver at each impact of the main drive rod impact end against the driver impact surface.

In accordance with another aspect of the present invention, a power tool is provided that includes a tool housing, a nose stabilizing member slidably connected to the tool housing, and a driver slidably mounted to the tool housing and axially shiftable along a driving axis of the tool housing. The tool housing has a retainer device configured to keep the driver slidably mounted to the tool housing. By keeping the driver slidably mounted to the tool housing, the driver may be carried on the tool rather than being a separate component that needs to be manually transported to the conveyor belt being serviced in addition to the power tool. Further, by keeping the driver slidably mounted to the tool housing, the power tool may be used by simply positioning the power tool onto the guide block and actuating a main drive rod thereof to strike the driver without having to first position the driver, then position the tool on the driver, as in a prior approach.

The driver assembly further includes a biasing member that generates a biasing force biasing the nose stabilizing member and the tool housing apart. With the nose stabilizing member pushed into engagement with the guide block, sliding the tool housing toward the nose stabilizing member against the biasing force urges the nose stabilizing member into tight engagement with the guide block to stabilize the guide block so that the nose stabilizing member is urged thereagainst. The tight engagement of the nose stabilizing member against the guide block keeps rivets in the guide block from jumping out of the guide block due to impacts from the main drive rod of the tool against the driver. More specifically, sets of rivets are often arranged in groups along a strip of material and are positioned in bores of a guide block above a conveyor belt end by striking the strip with a hammer to disengage the rivets from the strip. The vibratory tool of the subject application may then be used to drive a first set of rivets outward from the guide block bores and through the conveyor belt end while the remaining sets of rivets remain in other bores of the guide block. Although the guide block is typically held in place on the conveyor belt end by a fixture, the impacts from the main drive rod of the vibratory tool striking the driver may shake the guide block and cause the other sets of rivets to be shaken out of the guide block. The biasing member keeps the nose stabilizing member urged tightly against the guide block, restricts the movement of the guide block, and reduces any shaking imparted to the other sets of rivets which keeps the other sets of rivets in the guide block bores.

A vibratory tool is also provided for driving a plurality of rivets out from bores of a guide block into an underlying conveyor belt. The tool includes a tool housing, a hydraulically actuated main drive rod mounted to the tool housing, and a driver aligned with the main drive rod and slidably mounted to the tool housing for travel along a driving axis. The driver has a plurality of elongated drive rod members configured and sized to extend into guide block bores for engaging and driving rivets out of the guide block bores. The main drive rod has an impact end operable to rapidly reciprocate along the driving axis between retracted and extended positions to strike the driver and cause the driver drive rod members to drive the rivets out of the guide block bores and into an underlying conveyor belt. The tool further includes a nose stabilizing member slidably connected to the tool housing and projecting axially beyond the tool housing for engaging the guide block.

With the nose stabilizing member pushed into engagement with the guide block, sliding the tool housing toward the nose stabilizing member causes the tool housing to seat against the driver. By allowing the tool housing to seat against the driver, the nose stabilizing member permits a minimum predetermined axial distance to be established between the retracted main drive rod impact end and the driver with each seating of the tool housing against the driver. The minimum predetermined axial distance established with each seating of the tool housing against the driver provides a consistent transfer of energy from the main drive rod impact end to the driver as the main drive rod impact end shifts from the retracted position to the extended position and strikes the driver.

The slide connection between the tool housing and the nose stabilizing member further provides a robust approach for establishing the minimum predetermined axial distance despite recoil from operation of the vibratory tool. More specifically, the main drive rod impact end striking the driver produces recoil that shifts the tool housing away from the nose stabilizing member. The nose stabilizing member compensates for this recoil by permitting the tool housing to slide axially back toward the nose stabilizing member and seat the tool housing against the driver after each impact of the main drive rod impact end against the driver. In this manner, the tool housing may seat against the driver and reestablish the minimum predetermined axial distance substantially every time after the main drive rod impact end impacts the driver despite the recoil from the impact causing the tool housing to shift away from the nose stabilizing member.

In one form, the driver includes an impact surface for being impacted by the main drive rod impact end and the tool housing and the driver are configured to axially space the driver impact surface from the main drive rod impact end in the retracted position thereof by at least a predetermined axial distance. The predetermined axial distance may be sized to optimize energy transfer from the main drive rod impact end to the driver once the main drive rod impact end has been retracted and the tool housing seated against the driver. The tool housing and driver thereby permit the main drive rod impact end to repeatedly strike the driver with approximately the same amount of kinetic energy after traveling at least the predetermined axial distance.

In accordance with another aspect, a method is provided for driving rivets of a conveyor belt fastener. The method includes inserting a plurality of elongated driver members of a driver of a tool into bores of a guide block and into contact with rivets received in the guide block bores. The method includes retracting an impact end of a main drive rod of the tool to a retracted position and abutting a body of the tool against the driver. The method further includes shifting the main drive rod impact end from the retracted position thereof toward an extended position thereof by at least a predetermined minimum distance before the main drive rod impact end impacts an impact surface of the driver and drives the rivets out from the guide block bores. Abutting the tool body against the driver provides a repeatable, set positioning between the tool body and the driver and permits the main drive rod impact end to travel at least the predetermined minimum distance before impacting the driver each time the main drive rod impact end is shifted from the retracted toward the extended position. Further, the predetermined minimum distance preferably optimizes energy transfer from the main drive rod to the driver which increases the efficiency with which the rivets may be driven into the conveyor belt.

BRIEF DESCRIPTION OF THE DRAWINGS

FIG. 2 is a perspective view of a tool of FIG. 1 showing the driver received in a nose assembly of the tool and the driver drive rods extending out distally from the nose assembly;

FIG. 3 is an exploded view of the nose assembly of the tool of FIG. 1 showing a shaft of the tool having a hydraulically actuated main drive rod and other components of the tool connected to the shaft including a sleeve, a spring, a nose stabilizing member, and the driver;

FIGS. 9-18 are cross-sectional views similar to FIG. 8 showing the process of driving rivets out of the guide block bores and into an underlying conveyor belt end, with:

FIG. 9 showing the main drive rod impact end shifted to a retracted position and the shaft of the tool shifting toward the driver in response to operation of a trigger of the tool, FIG. 10 showing the shaft of the tool seated against the driver spacer wall to establish a predetermined distance between the main drive rod impact end and an impact surface of the driver, FIG. 11 showing the main drive rod impact end shifting toward the extended position and striking the impact surface of the driver after traveling the predetermined distance established by the driver spacer wall, FIG. 12 showing the rivets driven partially into the conveyor belt and the shaft of the tool shifted away from the driver in response to the main drive rod impact end striking the driver impact surface, FIG. 13 showing the shaft of the tool having shifted back toward and seated against the driver spacer wall which again establishes the predetermined distance between the main drive rod impact end and the driver impact surface, FIG. 14 showing the main drive rod impact end striking the driver impact surface after traveling the predetermined distance established by the driver spacer wall, FIG. 15 showing the rivets driven farther into the conveyor belt and the shaft of the tool recoiling in response to the main drive rod impact end striking the driver impact surface, FIG. 16 showing the tool shaft having shifted back towards and seated against the driver spacer wall which again establishes the predetermined distance between the main drive rod impact end and the driver impact surface, FIG. 17 showing the main drive rod impact end striking the driver impact surface after traveling the predetermined distance established by the driver spacer wall, and FIG. 18 showing the rivets driven fully into the conveyor belt and the tool shaft recoiling in response to the main drive rod impact end striking the driver impact surface;

DETAILED DESCRIPTION OF THE PREFERRED EMBODIMENTS

Figure 1:
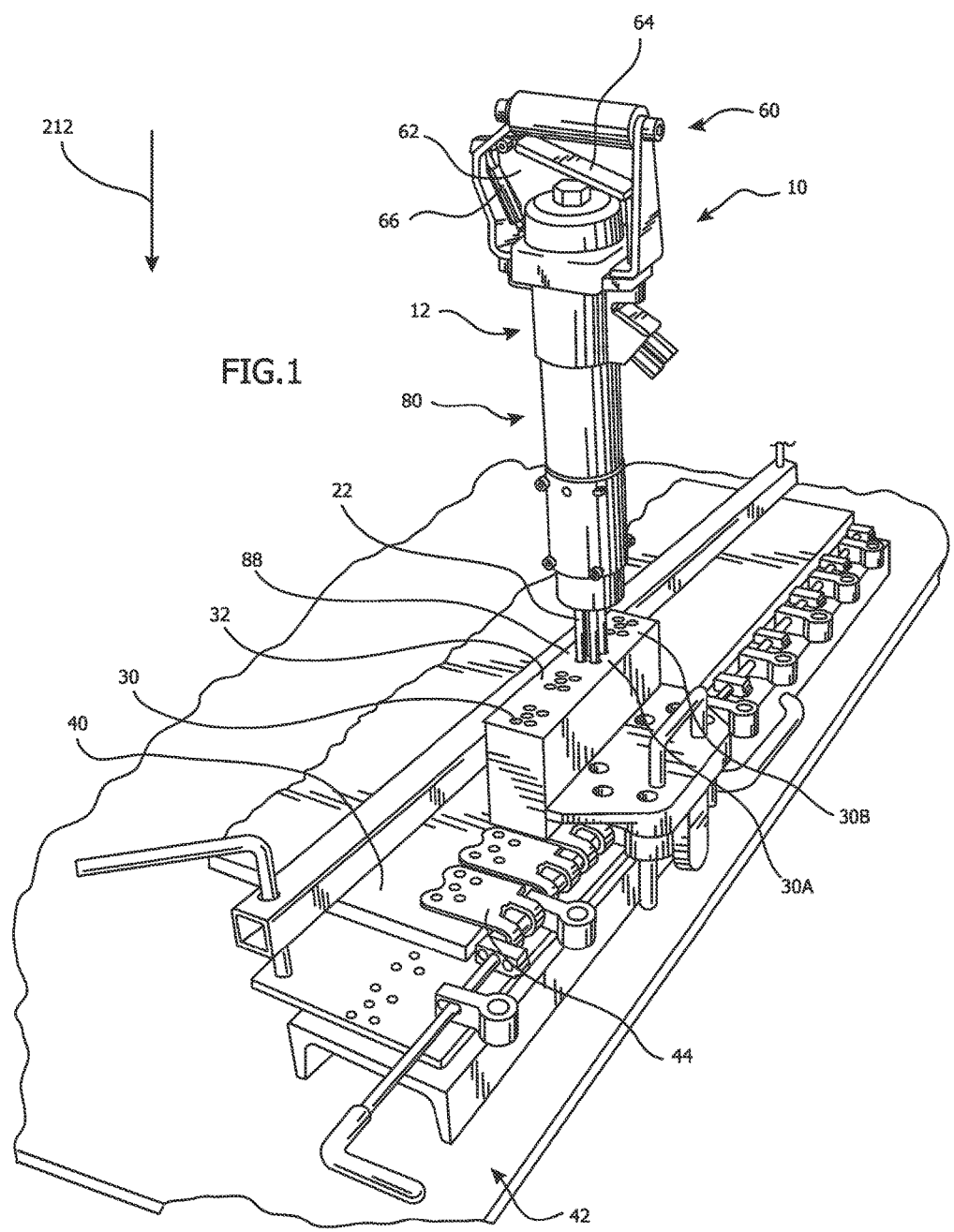
FIG. 1 is a perspective view of a hydraulic vibratory tool and a fixture holding a conveyor belt showing drive rods of a driver of the tool inserted into bores of a guide block of the fixture.

With reference to FIG. 1, a hydraulic vibratory tool 10 is provided having a body 12 and a hydraulically actuated main drive rod 14 (see FIGS. 3 and 6) mounted to the body 12 with a main drive rod impact end 16 operable to rapidly reciprocate along a driving axis 18 (see FIG. 6) and impact a driver 20 slidably mounted to the body 12. With reference to FIG. 1, the driver 20 has drive rods 22 sized to fit into bores 30 of a guide block 32 and simultaneously drive multiple rivets 34 out of the guide block bores 30 and into a conveyor belt end 40 held by a fixture 42. The hydraulically actuated main drive rod 14 may include a piston 14A (see FIG. 2A) configured to travel within a hydraulic cylinder 33. The hydraulic cylinder 33 generates significant forces on the main drive rod 14 which, in turn, produces significant impact forces against the driver 20 and permits the tool 10 to drive multiple rivets 34 out of the guide block bores 30 and into the conveyor belt end 40 in a short period of time. The tool 10 may apply, for example, approximately 2150 N of force against five rivets 34 at one time to drive the rivets 34 out of the guide block bores 30. In one embodiment, the tool 10 is configured to reciprocate the main drive rod impact end 16 at a rate of between 15 and 30 times per second, such as 20 to 23 times per second, and may drive multiple rivets 34 out of the guide block 32 and into the conveyor belt end 40 in approximately five to approximately fifteen seconds. Although the driver 20 is shown with five drive rods 22 in a somewhat "W" shaped pattern for simultaneously driving five rivets 34 into the conveyor belt end 40, the driver 20 may have different patterns of drive rods 22 on the driver 20. The driver 20 may also have any number of drive rods, such as one, two, three, four, five, and eight drive rod 22 configurations for driving a corresponding number of rivets 34 out of guide block bores 30.

The tool body 12 includes a housing 80 with a retainer device 140 (see FIG. 3) configured to keep the driver 20 slidably mounted to the housing 80. By keeping the driver 20 slidably mounted to the housing 80, the tool 10 may be engaged with rivets 34 in the guide block bores 30 by transporting the tool 10 to the guide block 32 and advancing the drive rods 22 into the guide block bores 30, without having to first position the driver 20 on the guide block 32 and then position an impact tool on the driver 20 as in some prior approaches. Not only does the tool 10 permit rapid positioning on the guide block 32, but the retainer device 140 makes repositioning the tool 10 on the guide block 32 from one set of bores 30 to another set of bores 30 faster because a user does not need to remove the tool 10 from the driver 20, move the driver 20 to the next set of bores 30, and then position the tool 10 back onto the driver 20 as in some prior approaches. For example and with reference to FIG. 1, once the conveyor belt end 40 and fasteners 44 thereon are held by the fixture 42, the tool 10 may be used to rapidly drive multiple rivets out of a grouping 30A of the guide block bores 30, moved to the grouping 30B of the guide block bores 30, and then used to drive multiple rivets out the grouping 30B of the guide block bores 30.

Figure 5:
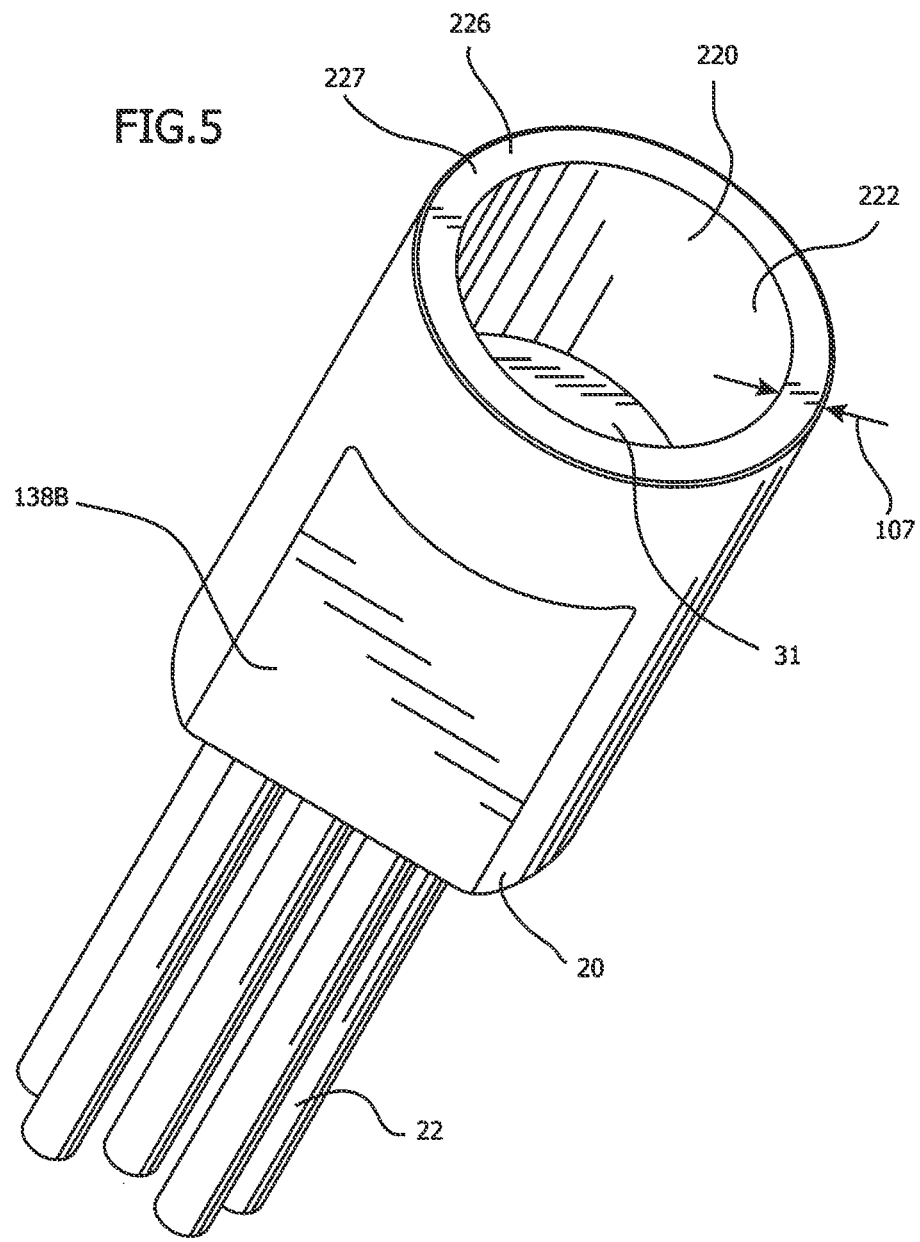
FIG. 5 is a perspective view of the driver of FIG. 3 showing a cylindrical spacer wall of the driver.

With reference to FIGS. 3 and 5, the driver 20 has a spacer wall 222 and the tool housing 80 has a shaft 100 configured to seat against the driver spacer wall 222 as the user (and gravity) shift the housing 80 toward the guide block 32 during operation of the tool 10. The driver spacer wall 222 establishes a distance 284 (see FIG. 10) along the driving axis 18 between the main drive rod impact end 16 and an impact surface 31 of the driver 20 with the main drive rod impact end 16 in the retracted position and the tool shaft 100 seated against the driver spacer wall 222. The distance 284 may be in the range of approximately 1.2 inches to approximately 1.8 inches, such as approximately 1.4 inches. By establishing the distance 284 between the main drive rod impact end 16 and the driver impact surface 31, the main drive rod impact end 16 must travel at least the distance 284 before striking the driver impact surface 31 which permits the energy transfer between the main drive rod impact end 16 and the driver impact surface 31 to be optimized.

Figure 19:
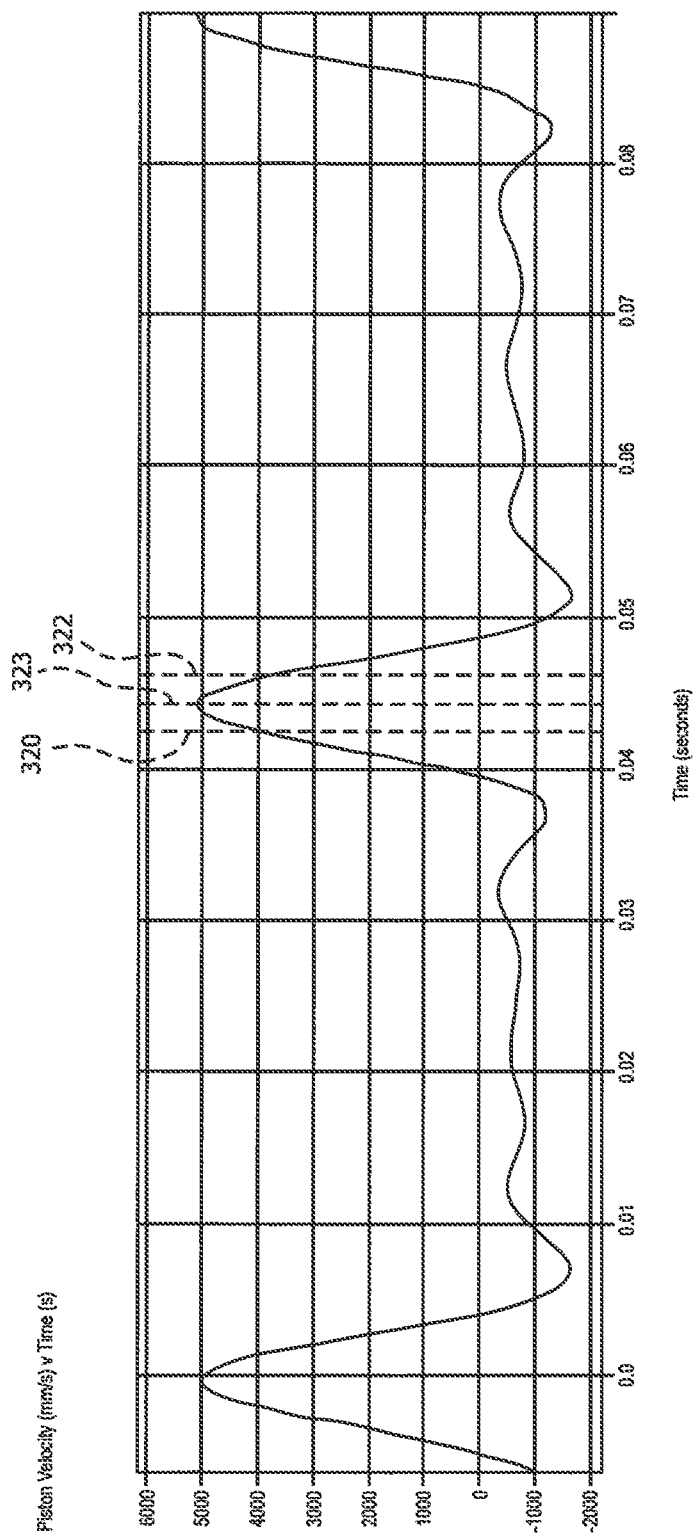
FIG. 19 is a graph showing main drive rod velocity versus time during operation of the tool FIG. 1.

In one form, the driver spacer wall 222 optimizes energy transfer by permitting the main drive rod impact end 16 to develop a velocity within a predetermined range, such as between points 320 and 322 in the main drive rod velocity versus time graph of FIG. 19, as the impact end 16 shifts from a retracted position and strikes the driver impact surface 31. In the example of FIG. 19, the predetermined velocity range between points 320, 322 is centered on a maximum velocity (point 323) that would permit the main drive rod impact end 16 to have a maximum kinetic energy immediately before striking the driver impact surface 31. Due to the vibratory operation of the tool 10, the rapidly shifting position of the main drive rod impact end 16 and the tool housing 80 during operation of the tool 10 may cause the main drive rod impact end 16 to impact the driver impact surface 31 with a slower velocity (i.e., either toward point 320 or point 322) and lower resulting kinetic energy during some impacts than if the main drive rod impact end 16 possessed velocity 323. However, the driver spacer wall 222 provides a fixed, minimum axial spacing 284 between the retracted main drive rod impact end 16 and the driver impact surface 31 that ensures the main drive rod impact end 16 travels axially far enough to achieve at least the velocity at point 320 (and associated kinetic energy) before striking the driver impact surface 31. Stated differently, the driver spacer wall 222 inhibits the main drive rod impact end 16 from striking the driver impact surface 31 with a velocity less than at point 320 in FIG. 20 (i.e., with a velocity to the left of point 320 on the graph) because the main drive rod impact end 16 must travel at least the distance 284 (and develop the corresponding velocity 320) before reaching the driver impact surface 31.

The predetermined range of the velocity of the main drive rod impact end 16 between points 320, 322 is generally centered on maximum velocity (point 323 in FIG. 19) of the main drive rod impact end 16. Because the driver spacer wall 222 is sized to cause the main drive rod impact end 16 to develop velocity between points 320, 322, the main drive rod impact end 16 develops the maximum or near-maximum velocity, and corresponding maximum or near-maximum kinetic energy, shortly before the main drive rod impact end 16 strikes the driver impact surface 31.

The driver spacer wall 222 thereby ensures that the main drive rod impact end 16 strikes the driver impact surface 31 with maximum or near-maximum kinetic force which produces a significant driving force against the rivets 34. Further, the tool 10 includes the hydraulic cylinder 33 (see FIG. 2A) that actuates the main drive rod 14 with a predetermined amount of hydraulic force based at least in part on the pressurized hydraulic fluid provided by a hydraulic power pack 35. In one approach, the main drive rod 14 and the piston 14A thereof may be formed integrally as a one-piece unit.

When the main drive rod impact end 16 strikes the driver impact surface 31, the predetermined hydraulic force generated by the hydraulic cylinder 33 is divided primarily between a driving force applied to the driver 20 and a recoil force applied to the housing 80. The driver spacer wall 222 reduces recoil by maximizing the kinetic energy of the main drive rod impact end 16 immediately before the impact end 16 strikes the driver 20 (i.e., permitting the main drive rod impact end 16 to develop maximum or near-maximum velocity) which produces a maximum or near-maximum driving force applied to the driver 20. Because the driving force applied to the driver 20 is a maximum or near-maximum, the recoil force applied to the housing 80 (and to the user holding the tool 10) is at a minimum or near-minimum. For example, the hydraulic cylinder 33 may generate approximately 2500 N of force on the main drive rod 14 and approximately 2150 N of the 2500 N is applied to the rivets 34. The driver spacer wall 222 thereby maximizes the driving force applied to the driver 20 which permits the driver 20 to rapidly drive multiple rivets out of the guide block bores 30 while minimizing the recoil which makes the tool 10 easier to handle during operation.

In other embodiments of the tool 10, different approaches for establishing the axial spacing 284 between the retracted main drive rod impact end 16 and the driver impact surface 31 may be used. For example, the tool may have a driver 20A (see FIG. 8A) with a flat, disc-shaped proximal end 21A. The tool shaft surface 104A may seat against an outer portion 21B of the driver 20A and the main drive rod impact end 16A may strike an inner impact surface 31A of the driver 20A. However, the main drive rod impact end 16A has a retracted position located a distance 276A (see FIG. 8A) deeper within the tool shaft 100A than the retracted position of the impact end 16 shown in FIG. 10. Thus, when the tool shaft surface 104A seats against the driver outer portion 21B, the tool shaft 100A establishes the axial distance 284A that the impact end 16 would need to travel (and develop maximum or near-maximum velocity before striking the impact surface 31A of the driver 20A.

The mass of the main drive rod 14 and the driver 20 may also be selected to optimize energy transfer from the main drive rod 14 into the rivets 34. In one form, the main drive rod 14 and driver 20 are selected so that a ratio of the mass of the main drive rod 14 to the mass of the driver 20 may be in a predetermined range that provides maximum kinetic energy transfer and minimum recoil of the tool 10. The ratio may be in a range of approximately 0.7 to approximately 1.7, in a range of approximately 0.9 to approximately 1.4, and in a range of approximately 1 to approximately 1.2. For example, the ratio of the mass of the main drive rod 14 to the mass of the driver 20 may be approximately 1.1.

Figure 2A:
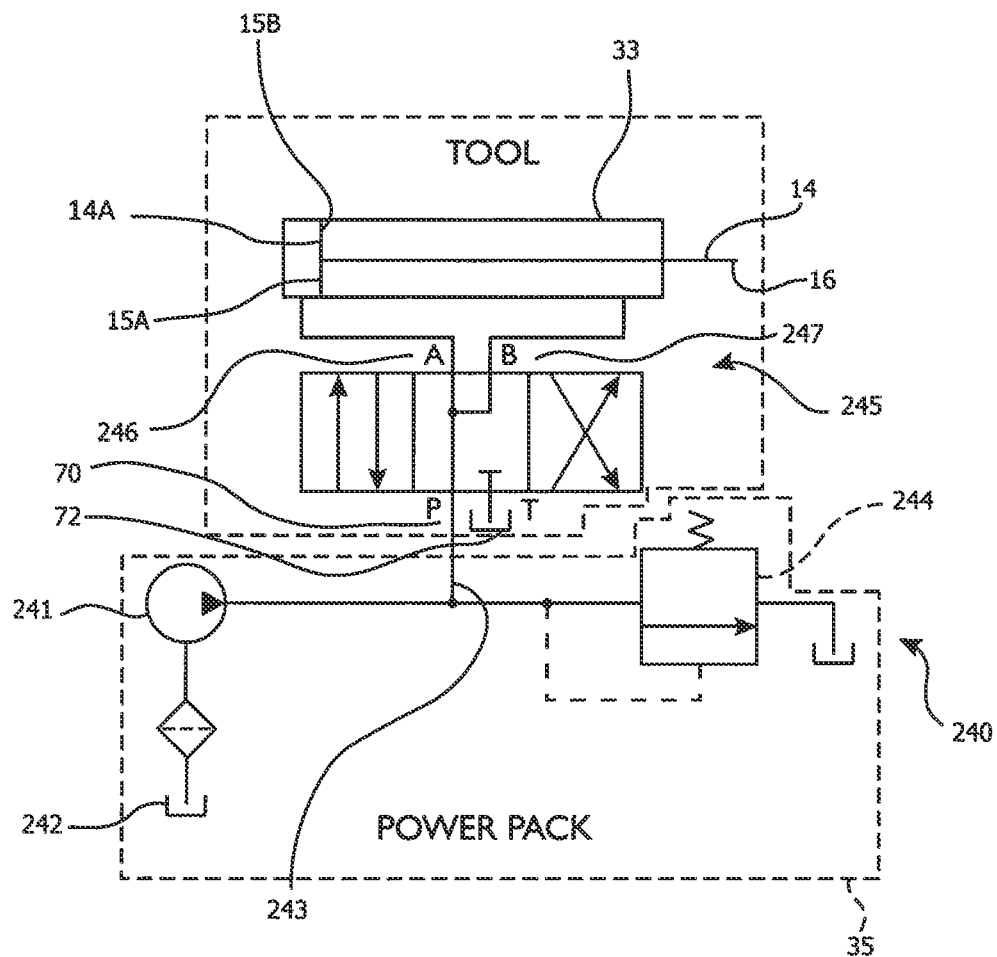
FIG. 2A is a schematic view of a hydraulic circuit of the tool and a hydraulic power pack.

With reference to FIGS. 2 and 2A, the tool 10 has a power assembly 50 that includes the hydraulic cylinder 33 and the main drive rod 14. The power tool 50 can be in the form of a modified BH112 model tool sold by Maruzen Kogyo Co. Ltd. The tool 10 has a handle 60 and a trigger assembly 62 with a trigger 64 and a linkage 66 for activating the hydraulic cylinder 33 and reciprocating the main drive rod impact end 16 between the retracted and extended positions. The power assembly 50 has a supply connection 70 for being coupled to the hydraulic power pack 35 that supplies pressurized hydraulic fluid to the power assembly 50. The power assembly 50 further has a return connection 72 for returning hydraulic fluid to the hydraulic power pack 35. In one approach, the tool 10 has an automatic operation in that a user grasps the handle 60, pulls the trigger 64, and the power assembly 50 causes the main drive rod 14 to rapidly reciprocate between retracted and extended positions and repeatedly strike the driver 20 for as long as the user continues to pull the trigger 64. In another approach, the tool 10 may have an automatic operation wherein the power assembly 50 reciprocates the main drive rod 14 in bursts of a predetermined number of cycles, such as three, five, or seven cycles as long as the trigger 64 remains pulled. Once the power assembly 50 reaches the end of the predetermined number of cycles, the user would release the trigger 64 and then pull the trigger 64 to again reciprocate the main drive rod 14 the predetermined number of cycles. In yet another form, the tool 10 has a semi-automatic operation wherein one pull of the trigger 64 produces one cycle of the main drive rod 14.

With reference to FIG. 2, the vibratory tool 10 has a nose stabilizing member, such as tube 82, connected to the housing 80 at a slide connection 84 and a biasing member, such as a spring 120 (see FIG. 3), biasing the tube 82 away from the housing 80. The tube 82 has a distal end 86 that engages an upper surface 88 of the guide block 32 as the tool 10 drives the rivets 34 out of the guide block bores 30. The engagement of the tube distal end 86 with the guide block upper surface 88 causes the tube 82 to hold the guide block 32 down against the fasteners 44 (see FIGS. 1 and 12) and inhibits movement, including vibrations, of the guide block 32 as the main drive rod impact end 16 repeatedly strikes the driver 20. By reducing movement of the guide block 32 during operation of the tool 10, the tube 82 also reduces movement of the rivets 34 positioned in other groupings of the guide block bores 30 and reduces the likelihood that rivets 34 in the other groupings of guide block bores 30 will jump out of the bores 30 during operation of the tool 10.

During operation of the tool 10, a user preferably presses the handle 60 in direction 212 (see FIG. 1) toward the guide block 32 to seat the shaft 100 against the driver spacer wall 222 and establish the predetermined axial distance 284 during operation of the tool 10, as discussed in greater detail below. In addition to establishing the axial distance 284, pressing the handle 60 toward the guide block 32 (and the weight of the tool 10) also presses the tube distal end 86 against the guide block upper surface 88 which holds the guide block 32 down against the fasteners 44 and limits movement of the guide block 32 (and movement of the other rivets 34 in the other groups of guide block bores 30). Further, with the tube distal end 86 engaged with the guide block upper surface 88, the slide connection 84 permits the housing 80 to slide along the tube 82 in response to the user pressing the handle 60 in direction 212 toward the guide block 32 (see FIGS. 12 and 13). The sliding movement of the housing 80 along the tube 82 compresses the spring 120 which produces a biasing force biasing the tube 82 against the guide block 32. This biasing force urges the tube distal end 86 against the guide block upper surface 88 and further inhibits movement of the guide block 32 and corresponding movement of the rivets 34 positioned in the other groupings of guide block bores 30.

Figure 14:
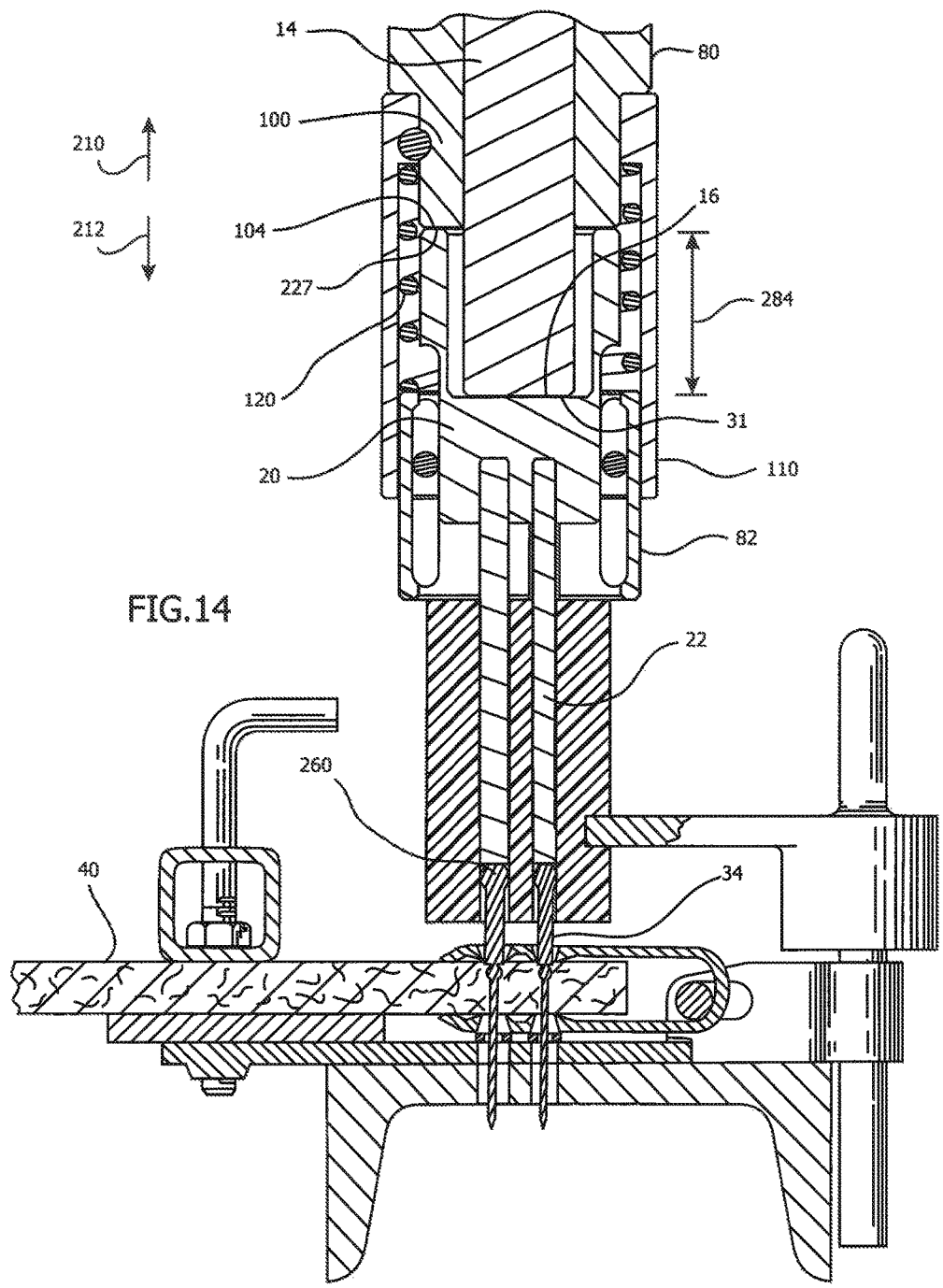
Figure 15:
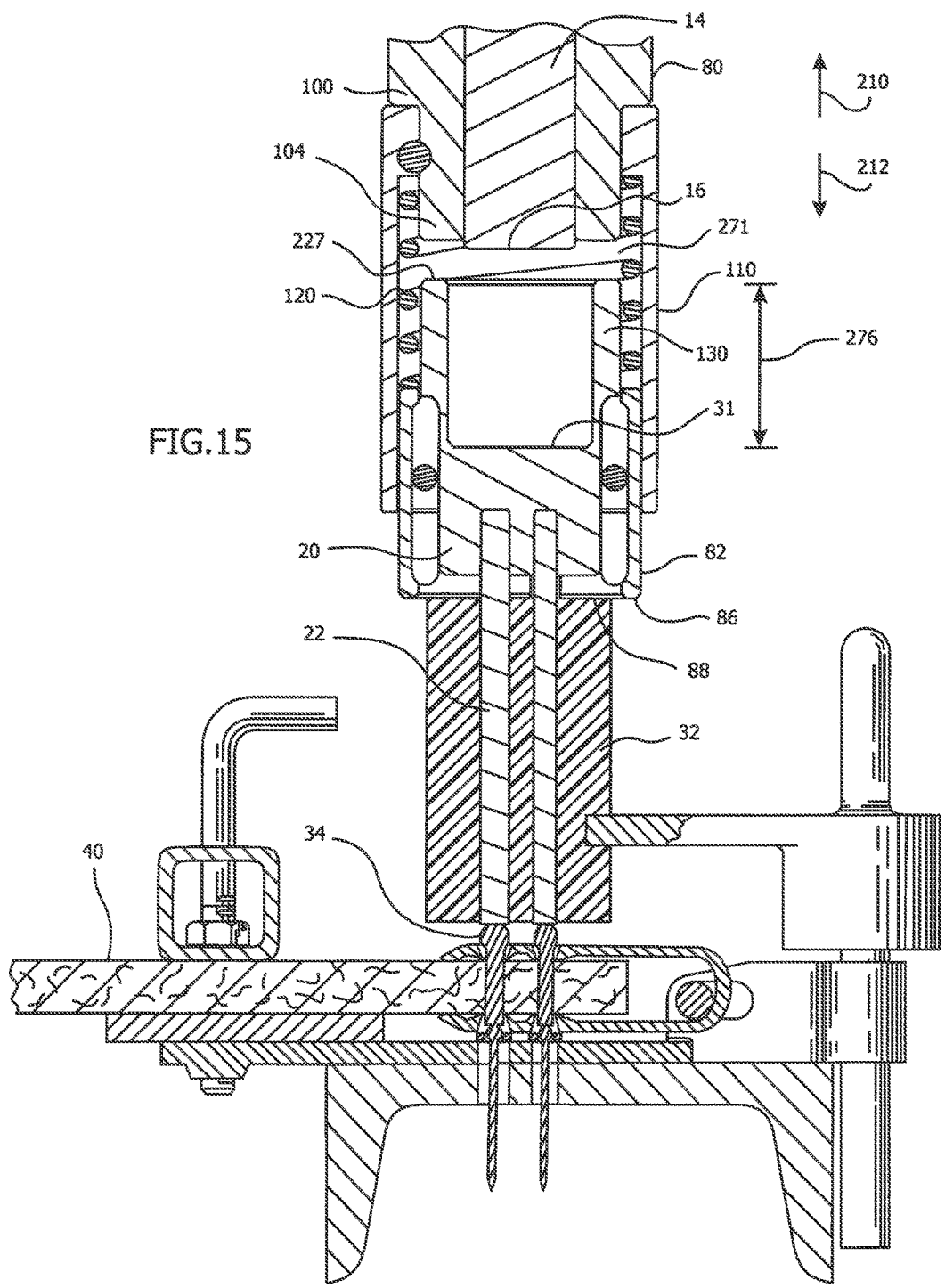

With reference to FIGS. 14 and 15, the impact of the main drive rod impact end 16 striking the driver 20 produces recoil forces that cause the housing 80 to shift in direction 210 away from the guide block 32. The slide connection 84 between the housing 80 and the tube 82 permits the housing 80 to shift in direction 210 while the tube distal end 86 remains engaged with the guide block upper surface 88. With reference to FIG. 15, the spring 120 is still compressed after the main drive rod impact end 16 strikes the driver 20. Because the spring 120 is still compressed, the spring 120 continues to apply a biasing force against the tube 82 that urges the tube distal end 86 against the guide block upper surface 88. In this manner, the tube 82 continues to restrict movement of the guide block 32 even as the housing 80 travels in direction 210 away from the guide block 32 due to recoil from the main drive rod impact end 16 striking the driver impact surface 31. The tool 10 thereby reduces movement of the guide block 32 and limits vibrations to the rivets 34 in the other guide block bores 30 before, during, and after each strike of the main drive rod impact end 16 against the driver impact surface 31.

With reference to FIG. 3, various components of the tool 10 will now be discussed in greater detail. The power assembly 50 has a shaft 100 with a bore 102 in which the hydraulically actuated piston 14 is received. The shaft 100 has a surface 104 extending about the main drive rod impact end 16 that seats against the driver 20, as discussed in greater detail below. In one form, the shaft surface 104 has a generally flat, annular surface with an outer beveled edge and a thickness dimension 105 extending outward from the main drive rod 14. With reference to FIG. 5, the spacer wall 222 of the driver 20 has a rim 226 with a generally flat, annular surface 227 with beveled inner and outer edges and a thickness dimension 107 smaller than the thickness dimension 105 of the shaft surface 104. By utilizing a wider surface 104 of the shaft 100, the shaft surface 104 can fully seat against the driver surface 227 even if some slight lateral misalignment of the shaft 100 and driver 20 occurs during operation of the tool 10.

Figure 6:
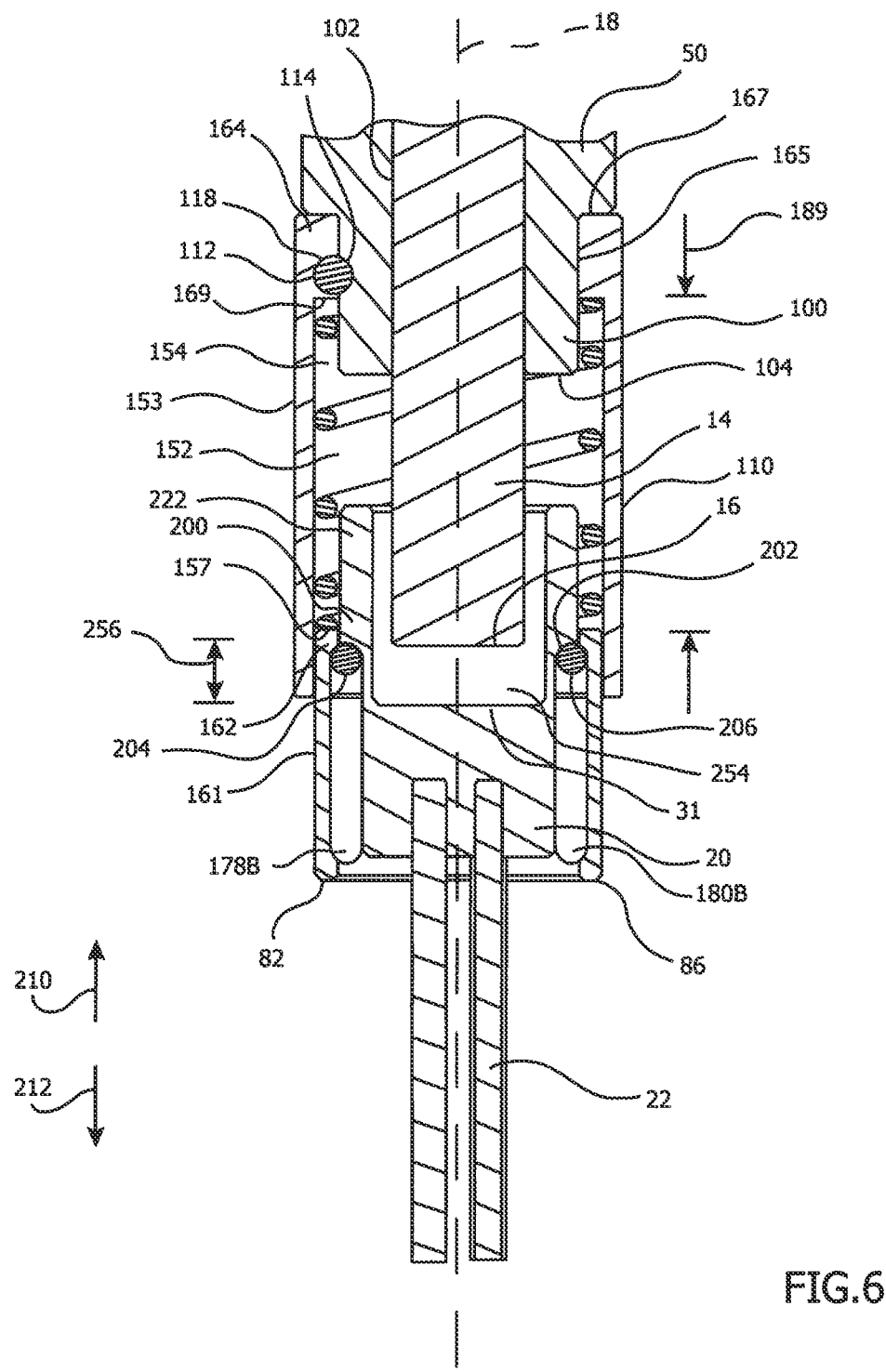
FIG. 6 is a cross-sectional view of the tool of FIG. 1 showing an impact end of the main drive rod in an extended position and the driver in a distal position spaced from the main drive rod impact end.

With reference to FIG. 3, the tool housing 80 includes a sleeve 110 for being connected to the shaft 100. The sleeve 110 has an interior void 152 sized to receive at least a portion of the driver 20, the tube 82, and the spring 120, as shown in FIG. 6. More specifically, the sleeve 110 has a wall 153 (see FIG. 6) with an inner surface 154 that covers and protects the main drive rod 14, the spring 120, and a body 130 (see FIG. 4) of the driver 20. The wall 153 thereby inhibits debris from jamming or interfering with the movement of the main drive rod 14, spring 120, and driver 20 as the main drive rod impact end 16 rapidly strikes the driver 20 and the shaft 100 moves toward and away from the driver 20. The sleeve 110 also has a collar 164 (see FIG. 6) defining an opening 165 sized to fit onto the shaft 100 and permit the collar 164 to abut a shoulder 167 of the power assembly 50. In addition to engaging the shaft 100, the collar 164 has a seat, such as surface 169, which supports an end 158 (see FIG. 3) of the spring 120. When a user presses the handle 60 toward the guide block 32 during operation of the tool 10 and compresses the spring 120, the abutting collar 164 and shoulder 167 resists movement of the sleeve in direction 210 (see FIG. 6) from biasing force from the compressed spring 120.

As shown in FIGS. 3 and 6, the sleeve 110 has a through opening 118 sized to receive a bolt 112 after the collar 164 has been fit onto the shaft 100. The shaft 100 has a groove 114 on one side of the shaft 100 and the bolt 112 has a shank 113 that extends laterally into the collar opening 165 and rests in the groove 114 when the sleeve collar 164 is mounted on the shaft 100, as shown in FIG. 6. The engagement of the bolt shank 113 in the shaft groove 114 resists movement of the sleeve 110 along the shaft 100 in a distal direction 212, such as when the main drive rod impact end 16 strikes the driver 20 and the recoil forces drive the shaft 100 proximally in direction 210. The engagement of the bolt shank 113 in the shaft groove 114 also resists turning of the sleeve 110 about the shaft 100. With reference to FIG. 3, a nut 116 (FIG. 3) is threaded onto a threaded portion 115 of the bolt shank 113 to secure the bolt 112 in the through opening 118 of the sleeve 110 and in the groove 114 of the shaft 100. The fit of the collar 164 on the shaft 100 as well as the bolt 112 and nut 116 thereby securely mount the sleeve 110 (and the driver 20, tube 82, and spring 120 coupled therewith) to the shaft 100 of the power assembly 50. It will be appreciated that the sleeve 110 may be connected to shaft 100 in a number of permanent or non-permanent approaches. For example, the sleeve collar 164 and shaft 100 may have cooperating threads and/or a detent mechanism for releasably securing the sleeve 110 to the shaft 100. In other approaches, the sleeve 100 may be welded onto the shaft 100 or may be formed integrally with the shaft 100. As yet another example, the shaft 104 may have two grooves 114 on diametrically opposed sides of the shaft 100 and a pair of bolts 112 and nuts 116 used to secure the sleeve 110 on the shaft 100.

An advantage of using the bolt 112 and nut 116 to connect the sleeve 110 to the shaft 100 is that the sleeve 110 and the driver 20, tube 82, and spring 120 mounted thereto may be readily disconnected from the shaft 100 by removing the nut 116 from the bolt 112, withdrawing the bolt shank 113 from the sleeve opening 118, and moving the sleeve 110 in distal direction 212 (see FIG. 6). The driver 20, tube 82, and spring 120 may then be disassembled from the sleeve 110. With reference to FIG. 3, after the sleeve 110 has been removed from the shaft 100, the driver 20 may be removed from the sleeve 110 and replaced with a different driver 20. The new driver 20 may have a different configuration of drive rods, such as a different number or pattern of driver rods 22. The modular nature of the sleeve 110, driver 20, tube 82, and spring 120 permits the driver 22 to be easily swapped out so that a user may quickly prepare the tool 10 for use with a particular guide block 32 and rivets 34.

With reference to FIG. 6, there is a slight gap 254 between the main drive rod impact end 16 and the driver impact surface 31 when the tool 10 is connected to the hydraulic power pack 35 and the hydraulic main drive rod 14 is in an extended position, but the drive rods 22 are not engaged with the rivets 34 within the guide block bores 30. This configuration may occur after the tool 10 has been connected to the hydraulic power pack 35 and the tool 10 is held in a vertical orientation such that gravity pulls the driver 20 to the distal position shown in FIG. 6. The gap 254 provides sufficient clearance between the main drive rod impact end 16 and the driver 20 such that the driver 20, tube 82, and sleeve 110 are not placed in tension by the extended main drive rod 14. This limits wear and tear on these components during repeated shifting of the main drive rod impact end 16 between extended and retracted positions during use. Further, the gap 154 permits the sleeve 110 (and driver 20, tube 82, and spring 120) to be disconnected from the shaft 100 by removing the bolt 112, even when the tool 10 is connected to the power pack 35 and receiving pressurized hydraulic fluid at the supply port 70. In this manner, the sleeve 110, driver 20, tube 82, and spring 120 may be removed from the shaft 100 and a new driver 20 connected to the tool 10 without having to disconnect the tool 10 from the hydraulic power pack 35. This improves the ease and speed with which the driver 20 may be replaced with a new driver 20.

With reference to FIGS. 3 and 6, the tube 82 has a proximal end 160 sized to fit within the void 152 of the sleeve 110 and the tube 82 has an outer surface 161 configured to slide along the inner surface 154 of the sleeve 110. The sliding engagement of the tube outer surface 161 and the sleeve inner surface 154 guides the tube 82 as it moves in directions 210, 212 along the driving axis 18 between a distal position relative to the shaft 100 (see FIG. 6) and a proximal position relative to the shaft 100 (see FIG. 13).

With reference to FIG. 3, the tool 10 has a retainer device 140 with one or more members, such as bolts 142, 144 and nuts 143, 145, for securing the driver 20, the tube 82, and the spring 120 to the sleeve 110. The bolts 142, 144 are advanced through openings 174, 176 of the sleeve 110 and through elongated through slots 178, 180 of the tube 82 such that shanks 204, 206 of the bolts 142, 144 extend across the inner void 152 of the sleeve 110 and across an interior void 170 of the tube 82. The through slot 178 includes two slots 178A, 178B formed in a wall 83 of the tube 82 across the tube opening 170 from one another. Similarly, the through slot 180 includes two slots 180A, 180B formed in the wall 83 of the tube 82 across the tube opening 170 from one another.

Figure 8:
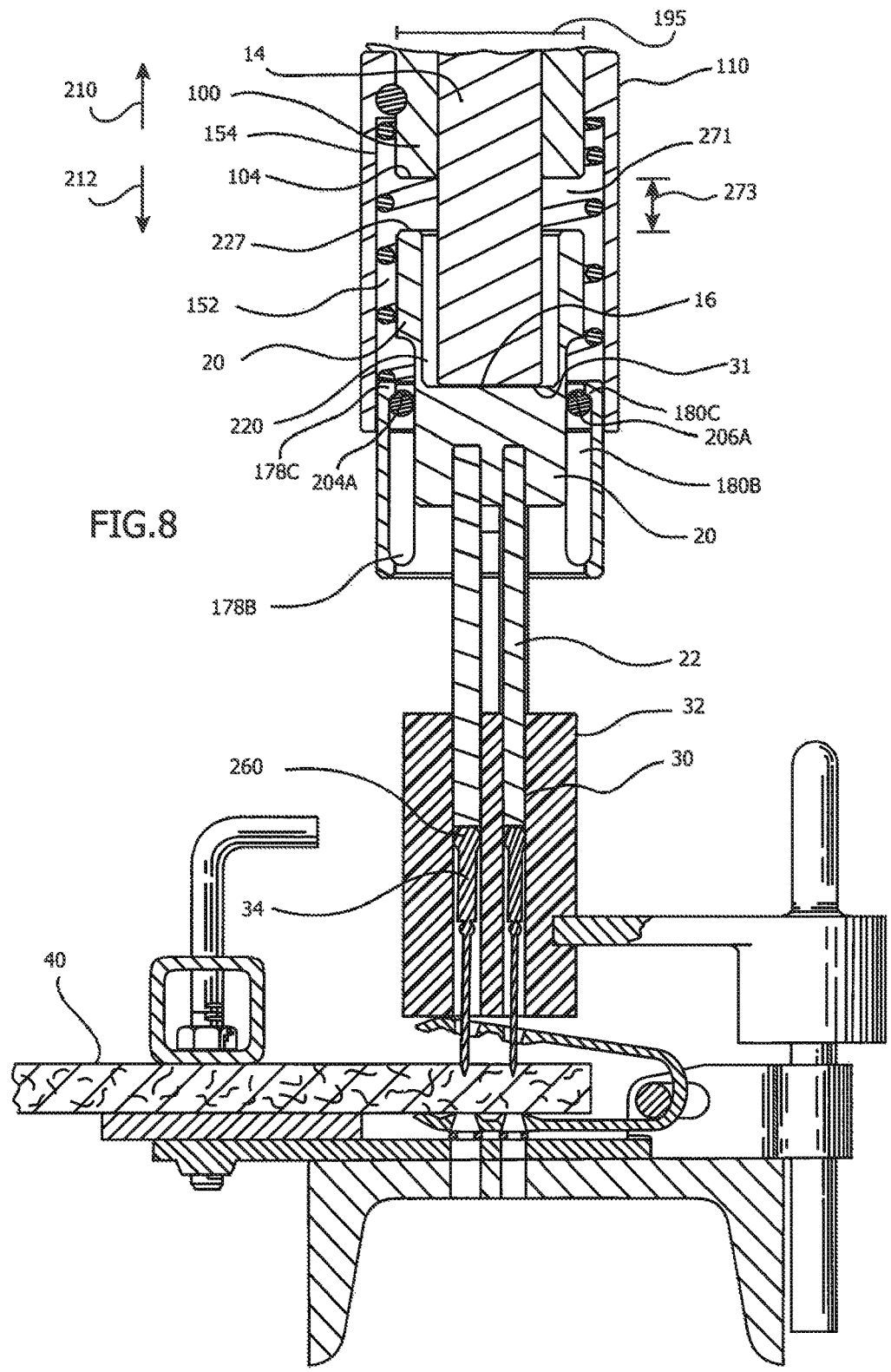
FIG. 8 is a partial cross-sectional view of the tool and fixture similar to FIGS. 6 and 7 showing the driver drive rods engaged with the rivets received in the guide block bores.
Figure 8A:
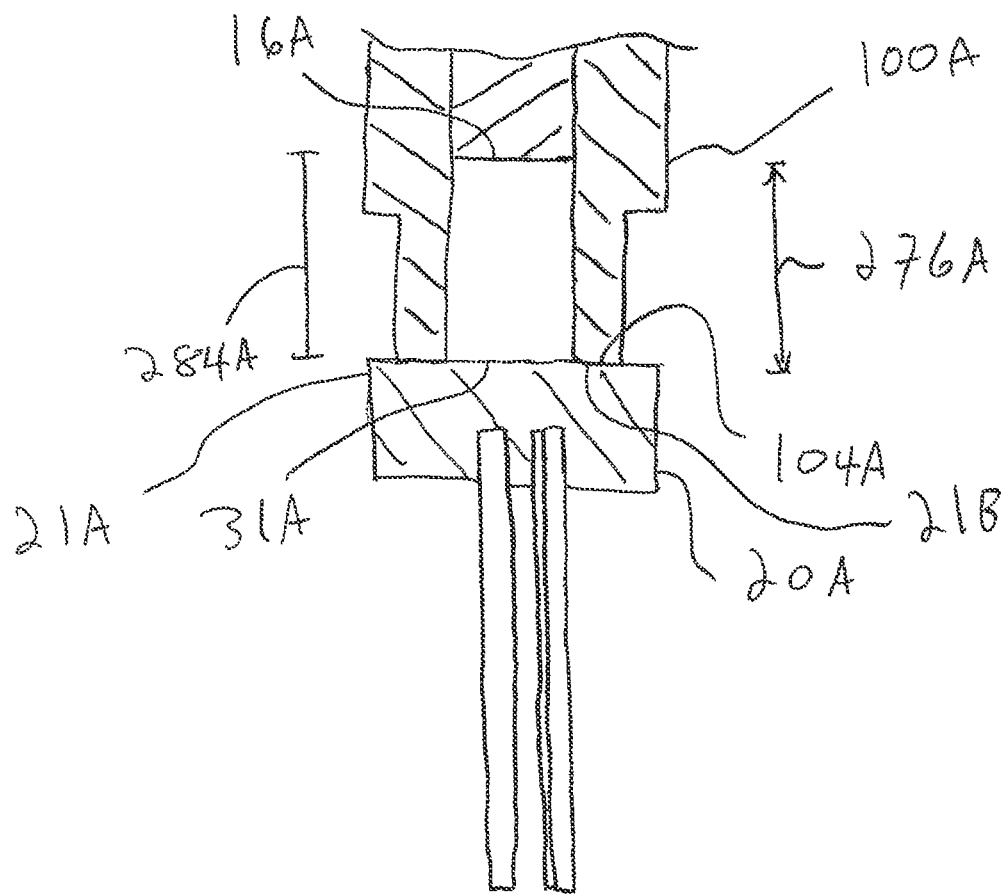
FIG. 8A is a schematic view of another tool shaft, main drive rod, and driver for use in driving rivets out of bores of a guide block.

As shown in FIG. 6, the through slots 178, 180 of the tube 82 are elongated along the driving axis 18 (slots 178B and 180B of through slots 178, 180 are shown). Because the bolt shanks 204, 206 extend through the slots 178, 180, the tube 82 is restricted to sliding movement along the driving axis 18 between a distal position (see FIG. 8) where ends 178C, 180C of the slots 178, 180 abut sides 204A, 206A of the bolt shanks 204, 206 and a proximal position where ends 178D, 180D (see FIG. 13) of the slots 178, 180 abut opposite sides 204B, 206B of the bolt shanks 204, 206. In one form, the spring 120 limits proximal movement of the tube 82 to a proximal position shown in FIG. 13 during operation of the tool 10 such that the ends 178C, 180C of the slots 178, 180 generally do not abut the bolt sides 204B, 206B during normal operation of the tool 10. Since FIG. 8 is a cross-sectional view, only the slots 178B, 180B are shown in FIG. 8 but the bolt shanks 204, 206 extend through the slots 178A, 180B in a similar manner.

Figure 9:
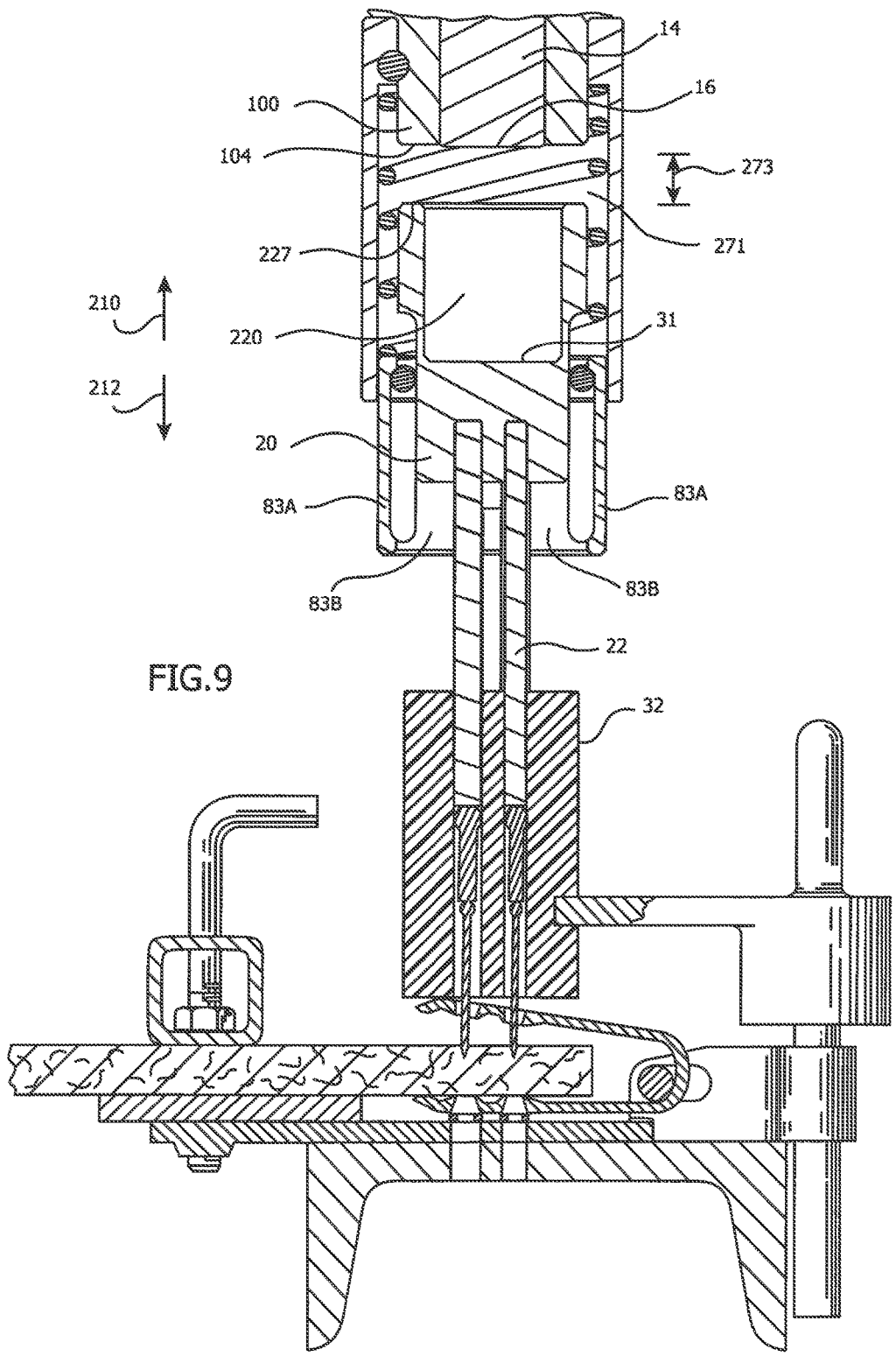

With reference to FIG. 9, The tube wall 83 has wall portions 83A, 83B on opposite sides of each of the slots 178A, 178B, 180A, 180B that define a width of the slots 178A, 178B, 180A, 180B that is slightly larger than the diameter of the bolt shanks 204, 206. The wall portions 83A, 83B are configured to abut the bolt shanks 204, 206 and restrict turning of the tube 82 about the driving axis 18. The tube 82 may therefore shift along the driving axis 18 because the through slots 178, 180 (and slots 178A, 178B, 180A, 180B thereof) are elongated along the driving axis 18 but the tube 82 is restricted from turning about the driving axis 18 because the width of the slots 178A, 178B, 180A, 180B is only slightly larger than the diameter of the bolt shanks 204, 206.

With reference to FIGS. 3 and 6, the end 158 of the spring 120 rests against a seat, such as seating surface 169, of the sleeve collar 164 when the driver 20, tube 82, sleeve 110, and spring 120 have been assembled onto the shaft 100. At an opposite end of the spring 120, the spring 120 has an end 156 (see FIG. 3) that rests against a seat, such as seating surface 157, of the end portion 160 of the tube 82. The spring 120 has a length 187 (see FIG. 3) that is greater than an axial distance 189 (see FIG. 6) between the collar seating surface 169 and the tube seating surface 157 when the tube 82 is in its distal position with the slot ends 178C, 180C (see FIG. 8) abutting the bolt shanks 204, 206. This causes the spring 120 to be partially compressed once the driver 20, tube 82, sleeve 110, and spring 120 are secured to the shaft 100. The partially compressed spring 120 generates a biasing force against the tube 82 which keeps the tube 82 in the distal position as shown in FIG. 6. Further, shifting the tube 82 in direction 210 toward the shaft 100 (such as when the tube distal end 86 abuts the guide block upper surface 88 and a user presses down on handle 60) decreases the distance 189 and further compresses the spring 120. In response to being compressed, the spring 120 produces a greater biasing force against the tube 82 which tightly engages the tube distal end 86 with the guide block upper surface 88.

The collar seating surface 169 and the tube seating surface 157 may be generally flat, annular surfaces and the spring ends 156, 158 may be configured to squarely engage the seating surfaces 157, 169. For example, coils 171 of the spring 120 at the ends 156, 158 may be cut or ground so that the end coils 171 present a generally flat surface 173 (see FIG. 3) for engaging the seating surfaces 157, 169. In another approach, the coils 171 at the spring ends 156, 158 are arranged to wrap around the driving axis 18 generally parallel to the seating surfaces 157, 169 so that the end coils 171 extend along and contact substantially the entire seating surfaces 157, 159.

With reference to FIG. 3, the spring 120 has an outer diameter 193 sized to fit within the interior void 152 of the sleeve 110 so that one or more of the spring coils 171 may move along the sleeve inner surface 154 as the spring 120 compresses and expands during operation of the tool 10, as discussed in greater detail below. The spring 120 also has an inner void 132 (see FIG. 3) with an inner diameter 195 (see FIG. 8) larger than an outer diameter 197 (see FIG. 4) of the driver spacer wall 222 and an outer diameter of the main drive rod impact end 16. The spring inner void 132 permits the driver 20 and spacer wall 222 thereof to shift along the driving axis 18 between the distal and proximal positions of the driver 20 during operation of the tool 10 without interference from the spring 120. Further, the spring inner void 132 permits the main drive rod impact end 16 to repeatedly travel through the spring inner void 132 and strike the driver impact surface 31 without interference from the spring 120. The spring 120 thereby simultaneously provides a biasing force that shifts the tube 82 toward a distal position thereof while permitting axial movement of the main drive rod impact end 16 and the driver 20 within tube 82 and sleeve 110.

With reference to FIGS. 3 and 6, the bolts 142, 144 provide slide connections between the tube 82 and the sleeve 110 as well as a sliding connection between driver 20 and the sleeve 110. These slide connections restrict movement of the tube 82 and the driver 20 to shifting along the driving axis 18. Further, these slide connections permit the tube 82 and the driver 20 to move independently of one another along the driving axis 18 relative to the sleeve 110.

With respect to the tube 82, the bolts 142, 144 extend through the elongated through slots 178, 180 of the tube 82 and restrict the tube 82 to sliding movement along the driving axis 18 between a proximal position where the slot ends 178D, 180D (see FIG. 13) of the tube 82 abut the bolts 142, 144 and a distal position where the slot ends 178C, 178C of the tube 82 abut the bolts 142, 144. During normal operation, the tube slot ends 178D, 180 D may not abut the bolts 142, 144 due to resistance from the spring 120 as discussed above.

Figure 4:
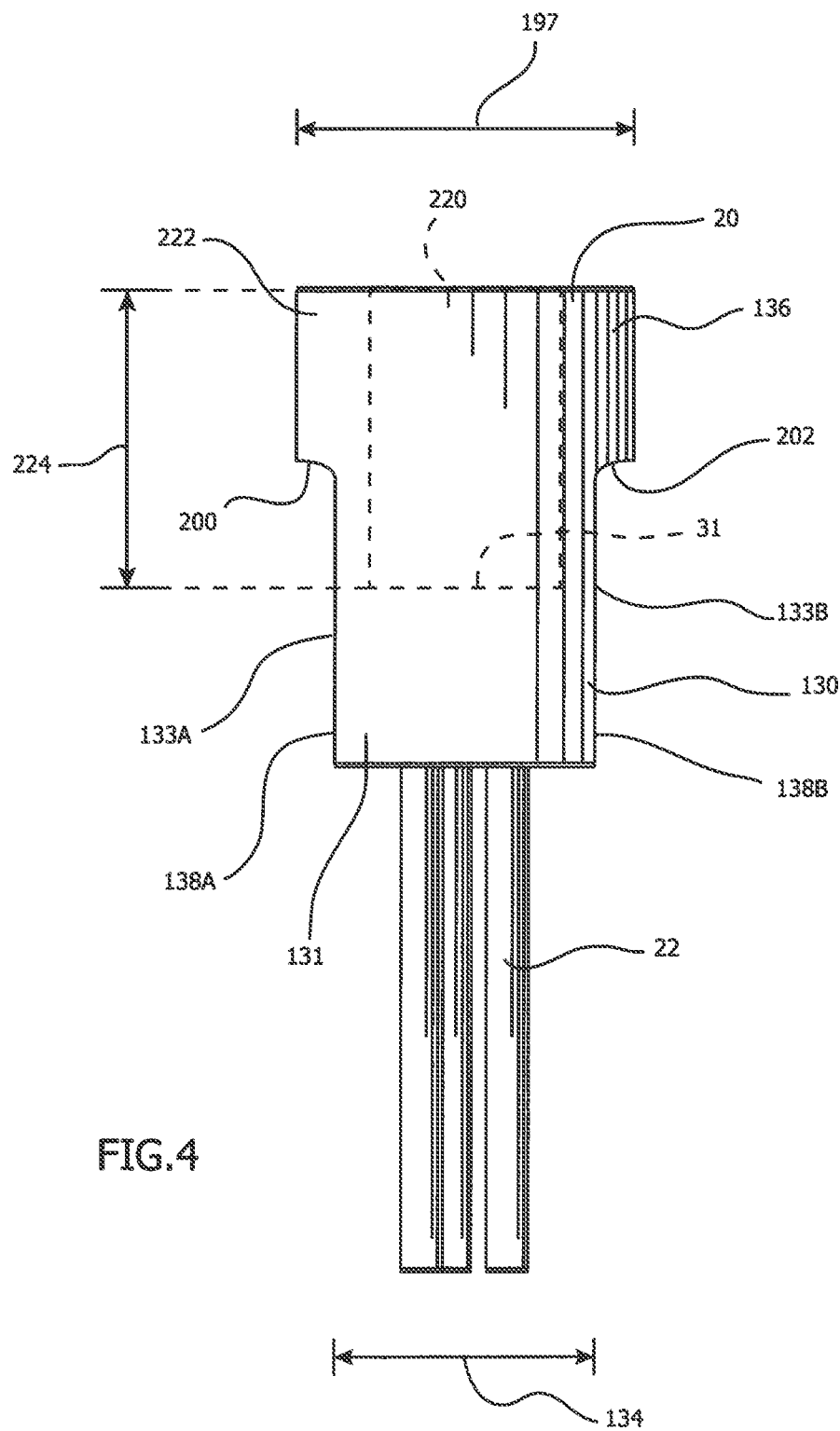
FIG. 4 is an elevational view of the driver of FIG. 3.

With reference to FIG. 4, the body 130 of the driver 20 includes a nose portion 131 with sides 133A, 133B and a distance 134 between the sides 133A, 133B that is smaller than a distance 135 (see FIG. 10) between the shanks 204, 206 of the bolts 142, 144 such that the nose portion 131 may travel along the driving axis 18 between the bolt shanks 204, 206. In one form, the sides 133A, 133B have planar side surfaces 138A, 138B that may slide along outer surfaces of the shanks 204, 206 of the bolts 142, 144 and form line contacts with the bolt shanks 204, 206 that extend generally parallel to longitudinal axis of the respective bolt 142, 144. Contact between the driver side surfaces 138A, 138B and the bolt shanks 204, 206 inhibits turning of the driver 20 about the driving axis 18 as well as lateral movement of the driver 20 during operation of the tool 10. The sliding engagement between the driver side surfaces 138A, 138B and the bolt shanks 204, 206 thereby restricts movement of the driver 20 to a linear movement along the driving axis 18.

With respect to FIG. 6, the driver 20, tube 82, and sleeve 110 are positioned somewhat concentrically with the driver 20 being disposed inwardly of the tube 82 which is disposed inwardly of the sleeve 110. The driver 20 is shiftable along the driving axis 18 relative to the outer sleeve 110 and the tube 82 is shiftable along the driving axis 18 relative to the sleeve 110. The driver 20 and the tube 82 may not inhibit the sliding movement of each other along the driving axis 18. Thus, the driver 20 and the tube 82 may move independently of each other between respective proximal and distal positions along the driving axis 18 during use of the tool 10.

With reference to FIG. 4, the driver body 130 also has a base portion 136 with an outer diameter 197 greater than the distance 135 (see FIG. 10) and shoulders 200, 202 that taper laterally outward from the nose portion 131 to the base portion 136. In one form, the driver shoulders 200, 202 have curvatures complimentary to the outer surface of the bolt shanks 204, 206. As shown in FIG. 6, the driver shoulders 200, 202 are configured to abut the bolt shanks 204, 206 and restrict distal movement of the driver 20 along the driving axis 18. The driver 20 may therefore slide in directions 210, 212 within the spring void 132 from a proximal position where the driver rim 222 abuts the shaft 100 to a distal position where the shoulders 200, 202 of the driver 20 abut the bolt shanks 202, 204. Further, the outer diameter 197 (see FIG. 4) of the driver base 136 is sized so that the driver 20 may travel freely within the inner void 132 of the spring 120 as well as within the inner void 170 (see FIG. 3) of the tube 82 without interfering with the compression and expansion of the spring 120 or the sliding movement of the tube 82 along the sleeve 110.

With reference to FIG. 3, the process of assembling the sleeve 110, the spring 120, the tube 82, and the driver 20 onto the shaft 100 of the power assembly 50 will be discussed in greater detail. First, the sleeve 110 is connected to the shaft 100 using the bolt 112 and nut 116. Next, the spring 120 is advanced in direction 150 into the interior void 152 of the sleeve 110 until the spring end 158 contacts the sleeve seating surface 169 (see FIG. 6). The tube 82 is coaxially aligned with the sleeve 110 and advanced in direction 150 until the tube seating surface 157 contacts the spring end 156. The end portion 160 of tube 82 is advanced into the interior void 152 of the sleeve 110, which moves the tube seating surface 157 toward the sleeve seating surface 169 and compresses the spring 120 therebetween (see FIG. 6).

Next, the spacer wall 222 of the driver 20 is advanced in direction 150 into the inner void 170 of the tube 82, into the inner void 132 of the spring 120, and into abutting contact with the shaft 100. To capture the driver 20, tube 82, and spring 120 on the sleeve 110, the tube 82 is turned about the driving axis 18 as needed to align the throughbores 178, 180 of the tube 82 with the openings 174, 176 of the sleeve 110. The driver 20 may also be turned about the driving axis 18 as needed to orient the driver 20 so that the driver side surfaces 138A, 138B are aligned with the openings 174, 176 and provide clearance for the bolts 142, 144. The bolts 142, 144 are then advanced into the openings 174, 176, through the slots 178A, 180A of the tube 82, along the side surfaces 138A, 138B of the driver 20, through the slots 178B, 180B of the tube 82, and out through openings 174, 176 on an opposite side of the sleeve 110. Because inserting the tube end portion 160 into the sleeve interior void 152 compresses the spring 120, the person or machine performing the assembly operation should continue to press the tube 82 in direction 150 to resist the biasing force from the spring 120 and keep the through openings 178, 180 of the tube 82 aligned with the openings 174, 176 of the sleeve 110 while advancing the bolts 142, 144. Nuts 143, 145 are threaded onto the bolts 142, 144 to secure the bolts 142, 144 on the sleeve 110, which captures the driver 20, tube 82, and the spring 120 on the sleeve 110. The person or machine performing the operation may then cease pressing on the tube 82 in direction 150, which permits the spring 120 to expand and shift the tube 82 distally until the slot ends 178C, 180D (see FIG. 8) abut the bolt shanks 204, 206. The tool 10 is now ready to be connected to the hydraulic power pack 35 and used to drive rivets 34 out of the guide block bores 30 and into the conveyor belt end 40.

With reference to FIG. 2A, the tool 10 and hydraulic power pack 35 include a hydraulic regenerative circuit 240 that causes the main drive rod 14 to rapidly shift between retracted and extended positions and strike the driver 20. The hydraulic power pack 35 has a pump 241 for pressurizing hydraulic fluid from a reservoir 242, a supply line 243 for delivering pressurized hydraulic fluid to the supply connection 70 of the tool 10, and a relief valve 244 for returning hydraulic fluid to the reservoir 242 during operation of the tool 10. The tool 10 has a control valve 245 coupled to the supply connection 70 and the return connection 72 of the tool 10. The control valve 245 is also coupled to ports 246 and 247 that are in communication with the cylinder 33. By varying the configuration of the control valve 245, the hydraulic regenerative circuit 240 changes the operation of the piston between the following four modes of operation:

Mode 1—The main drive rod impact end 16 slowly shifts from a retracted position, where the main drive rod impact end 16 returns when the tool 10 disconnected from the power pack 35, to an extended position of the main drive rod impact end 16. The main drive rod impact end 16 slowly contacts the driver impact surface 31 and pushes the driver 20 distally along the driving axis 18 as the main drive rod impact end 16 shifts to the extended position, as shown in FIG. 6. Mode 1 occurs in response to the tool 10 being connected to the hydraulic power pack 35 and receiving pressurized fluid.

Mode 2—The main drive rod impact end 16 remains in the extended position during this mode of operation. Mode 2 occurs in response to the tool 10 receiving pressurized fluid from the hydraulic power pack 35 but the trigger 64 has not yet been pulled.

Mode 3—The main drive rod impact end 16 rapidly shifts from the extended position to the retracted position. Mode 3 occurs, for example, in response to the trigger 64 being pulled for the first time after the tool 10 has been connected to the hydraulic power pack 35. Mode 3 also occurs in response to the main drive rod impact end 16 reaching the extended position while the user continues to pull the trigger 64.

Mode 4—The main drive rod impact end 16 rapidly shifts from the retracted position toward the extended position and strikes the driver 20. Mode 4 occurs in response to the main drive rod impact end 16 reaching the retracted position at the end of Mode 3.

The piston 14A may be a regenerative double acting piston with an upper surface 15A and a lower surface 15B, as shown in FIG. 2A. The port 246 permits fluid flow to and from the piston upper surface 15A and the port 247 permits fluid flow to and from the piston lower surface 15B. During Mode 4, the control valve 245 directs high-pressure hydraulic fluid against the piston upper surface 15A. As the main drive rod impact end 16 travels toward the extended position during Mode 4, the control valve 245 also directs hydraulic fluid from the piston lower surface 15B to the piston upper surface 15A. This effectively increases the flow rate to the piston upper surface 15A and accelerates shifting of the main drive rod impact end 16 toward the extended position.

During Mode 3, the control valve 245 directs high-pressure hydraulic fluid against the piston lower surface 15B. As the main drive rod impact end 16 travels toward the retracted position during Mode 3, the control valve 245 also directs hydraulic fluid from the piston upper surface 15A to the piston lower surface 15B. This effectively increases the flow rate to the piston lower end 15B and accelerates shifting of the main drive rod impact end 16 toward the retracted position. The regenerative circuit 240 utilizes hydraulic fluid to slow the main drive rod 14 as it travels to the extended and retracted positions which produces a piston velocity profile as in FIG. 20. The velocity provide is more curved with the velocity decreasing more gradually as the piston reaches the extended position than a velocity profile for some pneumatic cylinders. In another form, the piston 14A, main drive rod 14 cylinder 33, and control valve 245 are configured so that the piston 14A is a double acting piston without regenerative capability.

With reference to FIG. 3, the components of the tool 10 are made of materials sufficiently strong to resist the loading applied during operation of the tool 10. For example, the driver 20 and drive rods 22 may be made of high strength tool steel. The tube 82, the spring 120, the sleeve 110, and the associated bolts 112, 142, 144 may all be made of steel.

With reference to FIGS. 6-18, a method of driving rivets 34 out of guide block bores 30 and into an underlying conveyer belt end 40 is shown. Initially, a driver 20 having a number and arrangement of drive rods 22 that matches the patterns of the bores 30 on the guide block 32 is selected. The driver 20, tube 82, sleeve 100, and spring 120 are assembled onto the shaft 100 of the power assembly 50 as discussed above. If the driver 20, tube 82, sleeve 110, and spring 120 were previously assembled onto the shaft 100, the bolts 142, 144 may be removed from the sleeve openings 174, 176 and the driver 20 slid distally along the driving axis 18 until the driver 20 exits the tube interior void 170. The driver 20 may then be swapped out for another driver 20 if the original driver 20 has an inappropriate configuration of drive rods 22 for the guide block 30 (e.g., the driver 20 previously assembled onto the shaft 100 has eight drive rods 22 while the guide block 32 has groupings of five bores 30). If, on the other hand, the correct driver 20 is held by the tool 10, disassembly of the tube 82, sleeve 110, and spring 120 are not required and the tool 10 is ready for use.

Next, the tool 10 is connected to the hydraulic power pack 35. When the hydraulic power pack 35 provides pressurized hydraulic fluid to the tool 10, the control valve 245 (see FIG. 2A) operates in Mode 1 described above which causes a slow advance of the piston 16 to an extended position, as shown in FIG. 6. The main drive rod impact end 16 slowly contacts the driver impact surface 31 and shifts the driver 20 distally along the driving axis 18. Once the main drive rod impact end 16 reaches the extended position, the control valve 245 operates in Mode 2 which directs higher pressure hydraulic fluid to the piston upper surface 15B and maintains the main drive rod impact end 16 in the extended position. The extended main drive rod impact end 16 may abut the driver impact surface 31 and inhibit the driver 20 from shifting toward the proximal position in direction 210. This ensures that, once the tool 10 is coupled to the power pack 35, substantially the entire lengths of the drive rods 22 extend beyond the distal end 86 of the tube 82. By exposing substantially the entire lengths of the drive rods 22, the user may easily align the drive rods 22 with the guide block bores 30 and advance the drive rods 22 into the guide block bores 30.

With reference to FIG. 6, the tool 10 is shown in a vertical orientation and the drive rods 22 have not yet been advanced into the guide block bores 30. Gravity pulls the driver 20 in direction 212 away from the main drive rod impact end 16. The driver 20 preferably can shift far enough distally along the driving axis 18 to create a small gap 254 separating the main drive rod impact end 16 from the driver impact surface 31 by a distance 256, as shown in FIG. 6. In one form, the distance 256 is in the range of approximately 0.250 inches to approximately 0.750 inches. The gap 254 operates as a clearance to permit the main drive rod impact end 16 to shift to the extended position thereof (whether slowly in Mode 1 or rapidly in Mode 4) without forcing the driver shoulders 200, 202 against the bolts 142, 144. This approach is advantageous because the hydraulic cylinder 33 produces significant force against the piston 14A and the main drive rod 14 connected thereto such that the main drive rod impact end 16 could damage the bolts 142, 144 if the cylinder 33 fired while the main drive rod impact end 16 abutted the driver impact surface 31 and the driver shoulders 200, 202 abutted the bolts 142, 144.

Once the tool 10 has been coupled to the hydraulic power pack 35, the user may transport the tool 10 into position near the guide block 32 and advance the exposed drive rods 22 (due to the extended main drive rod impact end 16 maintaining the driver 20 in a distal position) into the guide block bores 30. In contrast to prior approaches, the user does not need to carry a separate driver and power tool to a work site, position drive rods of the driver into guide block bores, and then advance the driver power tool unto the driver so that the driver is received in a large bore of a nose assembly of the power tool. The power tool 10 thereby provides a more rapid and straightforward approach to positioning the tool 10 and drive rods 22 thereof on the guide block 32.

Figure 7:
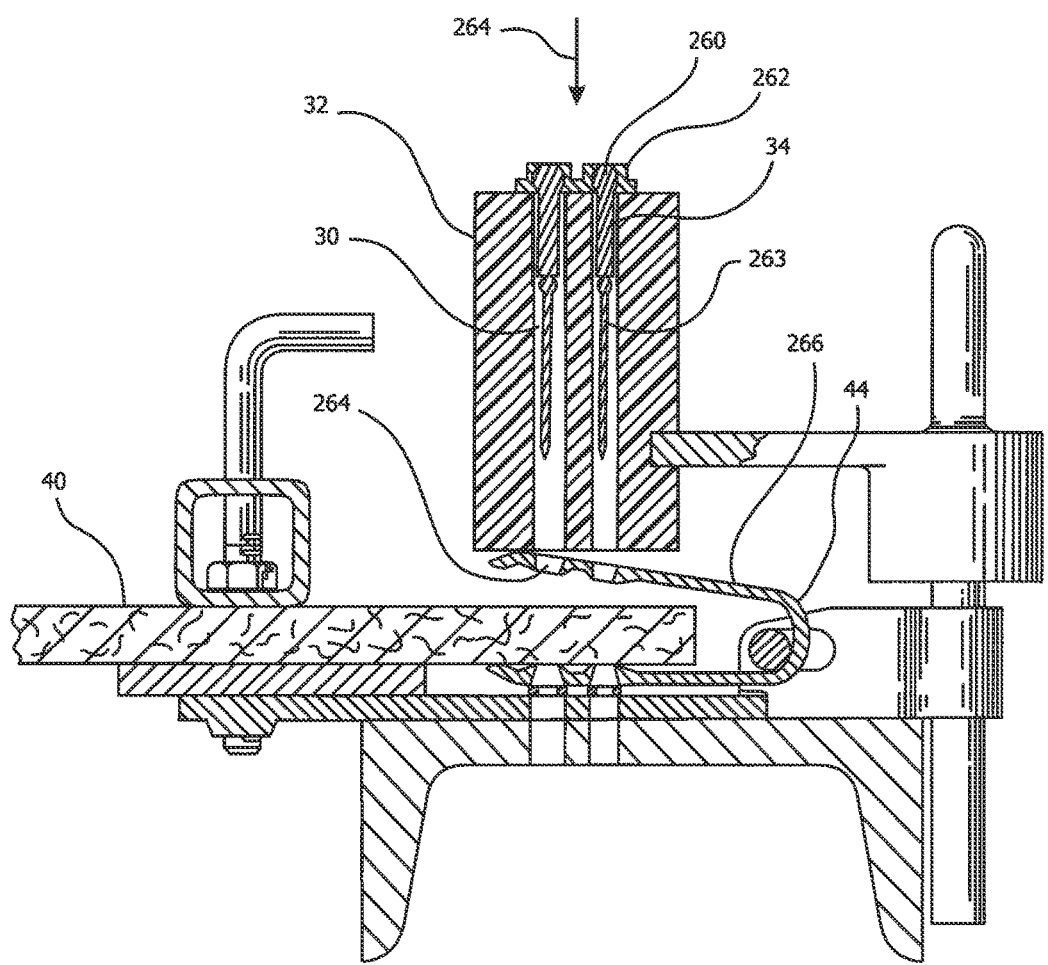
FIG. 7 is a partial cross-sectional view of the fixture and conveyor belt of FIG. 1 showing rivets releasably connected to a rivet holder strip prior to the rivets being disconnected from the strip and being loosely received in the guide block bores.

With reference to FIG. 7, the rivets 34 may have heads 260 temporarily held in a rivet holder strip 262 that holds rivets for several groupings of guide block bores 30. The rivets 34 include pilot nails 263 that are separably attached thereto. Accordingly, the term rivet herein is intended to encompass rivets having separably attached pilot nails 263. The user swings a hammer in direction 264 to knock the rivet heads 260 out of the rivet holder strip 262 such that the rivets 34 fall into the guide block bores 30 and the pilot nails 263 travel through openings 264 in an upper plate 266 of the fastener 44.

With reference to FIG. 8, the user positions the tool 10 above the guide block 32 and advances the drive rods 22 of the tool 10 in direction 212 into the guide block bores 30. The user presses downward on the tool handle 60 (see FIG. 1) in direction 212 to engage the extended main drive rod impact end 16 with the driver impact surface 31 and engage the drive rods 22 with the rivet heads 260. As shown by comparing FIGS. 6 and 8, pressing the tool handle 60 in direction 212 toward the guide block 32 causes the main drive rod impact end 16, tube 82, shaft 100, and sleeve 110 to shift toward the driver 20. Because the drive rods 22 are engaged with the rivet heads 260, the driver 20 remains relatively stationary in the vertical direction as the user pushes the tool handle 60 in direction 212. The movement of the main drive rod impact end 16 toward the driver 20 in direction 212 closes the gap 254 (as seen by comparing FIGS. 6 and 8). However, because the main drive rod impact end 16 is in the extended position abutting the driver impact surface 31, there is a gap 271 separating the driver rim surface 227 from the shaft surface 104, as shown in FIG. 8. Pushing the handle 60 in direction 212 may also cause the rivet nails 263 to partially penetrate the conveyor belt end 40, as shown in FIG. 8.

Figure 10:
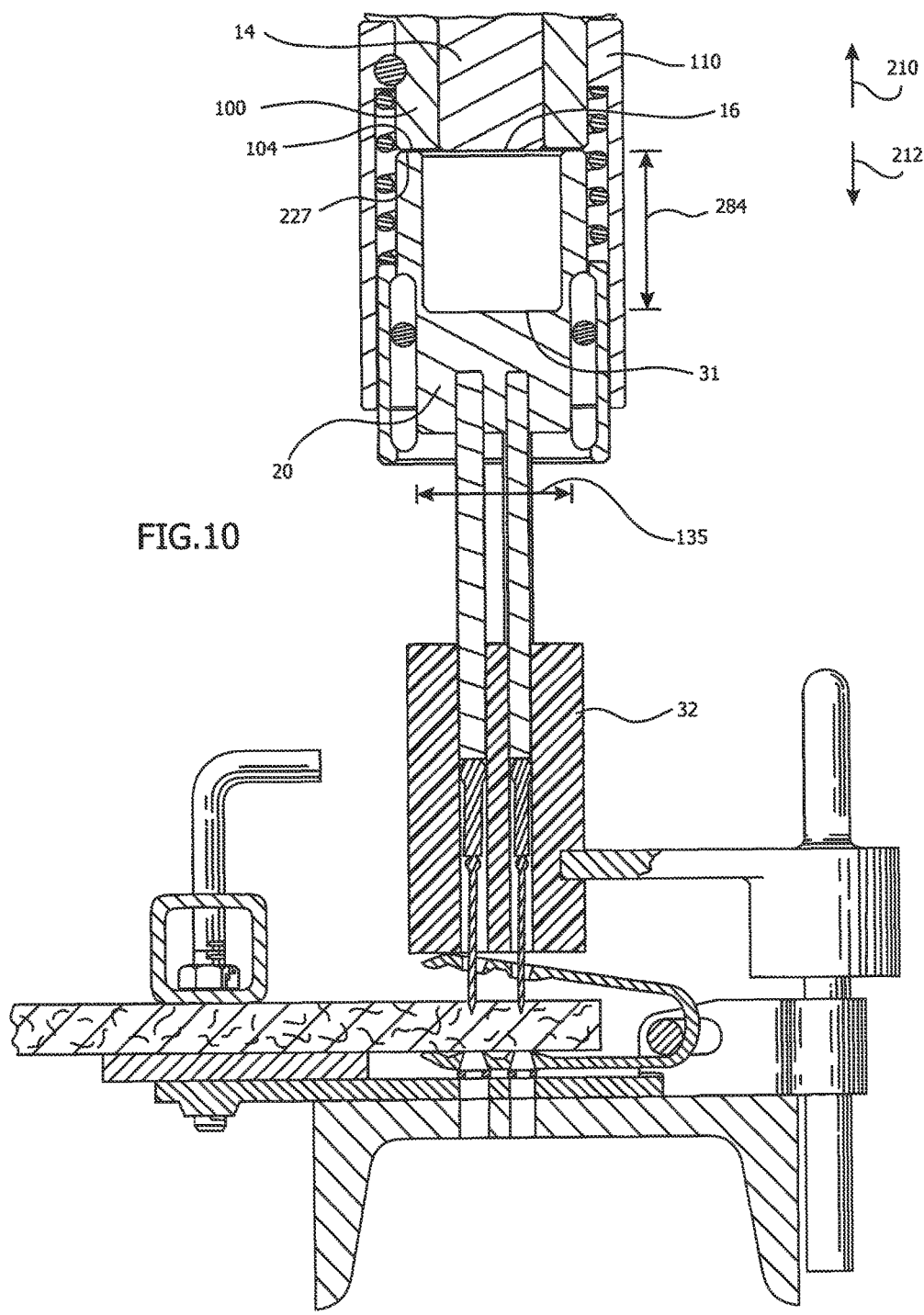

With reference to FIG. 9, the user next pulls the trigger 64 and the control valve 245 (see FIG. 2A) enters Mode 3 and causes the main drive rod impact end 16 to shift toward the retracted position thereof. Because the main drive rod impact end 16 no longer abuts the driver impact surface 31, but the user continues to press downward in direction 212 (in addition to the weight of the tool 10), the shaft 100 is free to shift toward the guide block 32 in direction 212. With reference to FIG. 10, the shaft 100 continues shifting toward the guide block 32 until the shaft surface 104 seats against the driver rim surface 227 and closes the gap 271. The driver spacer wall 222 separates the main drive rod impact end 16 from the driver impact surface 31 by an axial distance 284 as shown in FIG. 10. It is noted that shifting the main drive rod impact end 16 to the retracted position and the shaft surface 104 seating against the driver rim surface 227 as shown in FIGS. 9 and 10 may occur within a fraction of a second.

Figure 11:
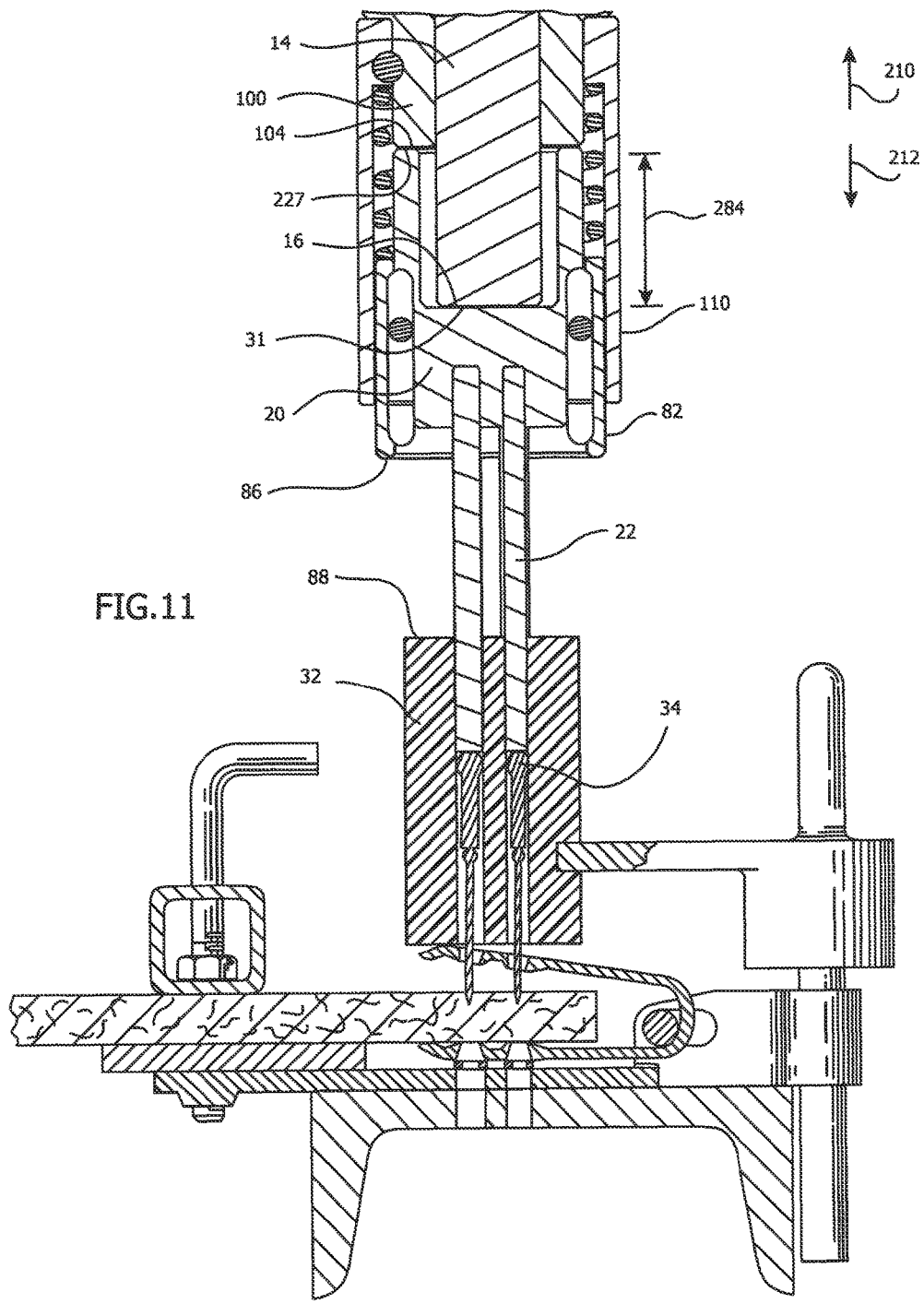

With reference to FIG. 11, the user continues to hold down the trigger 64 and the valve 245 enters Mode 4. The cylinder 33 causes the piston 14A and main drive rod 14 mounted thereto to shift in direction 212 towards its extended position. Because the shaft surface 104 is seated against the driver rim surface 227, the main drive rod impact end 16 must travel at least the axial distance 284 before striking the impact surface 31. The axial distance 284 is sized to permit the main drive rod impact end 16 to develop maximum or near-maximum velocity in response to the pressurized hydraulic fluid flowing into the cylinder 33 at the cylinder head surface 15A. In this manner, the main drive rod impact end 16 develops a maximum or near-maximum velocity and maximum or near-maximum kinetic energy immediately before striking the impact surface 31. Because the hydraulic cylinder 33 generates a set amount of force on the main drive rod 14, the driver spacer wall 222 maximizes the kinetic force of the main drive rod 14 which correspondingly minimizes the remaining force from the cylinder 33 that is converted to recoil of the tool shaft 100. FIG. 11 shows the moment that the main drive rod impact end 16 strikes the driver impact surface 31. The drive rods 22 transfer the energy from the impact of the main drive rod impact end 16 against the driver impact surface 31 into the rivets 34 which drives the rivets 34 farther outward from the guide block bores 30 and into the conveyor belt end 40, as shown in FIG. 12.

Figure 12:
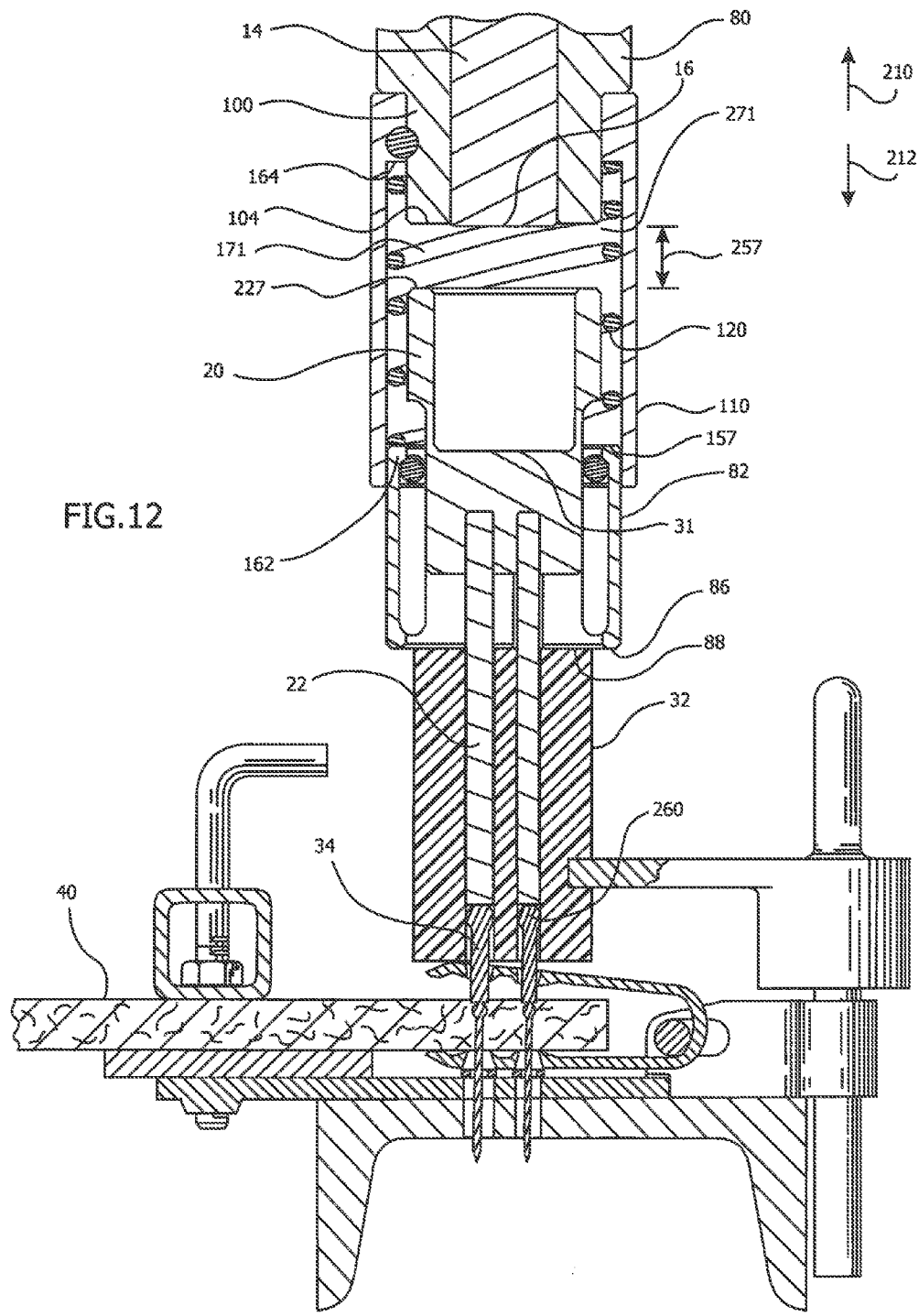

The impact of the piston end 16 against the driver impact surface 31 causes the shaft 100 (and main drive rod 14 and sleeve 110 mounted thereto) to recoil in direction 210 away from the guide block 32 as the drive rods 22 drive the rivets 34 into the conveyor belt end 40 as shown in FIG. 12. The user preferably continues to grasp the tool handle 60 and press the handle 60 in direction 212 toward the guide block 32 which resists the recoil in direction 210 and urges the shaft 100 back toward the guide block 32 (gravity may also aid the user in urging the shaft 100 toward the guide block 32). As shown in FIG. 12, the first impact of the main drive rod impact end 16 against the driver impact surface 31 advanced the rivets 34 sufficiently far enough into the conveyor belt end 40 so that the tube end portion 86 now engages the guide block upper surface 88. The user continues to push the handle 60 direction 212 which shifts the shaft 100 and sleeve 110 mounted thereto in direction 212 toward the guide block 32. However, the tube 82 generally does not move any farther in direction 212 despite the user's pressing of the handle 60 in direction 212 due to the engagement of the tube end portion 86 with the guide block upper surface 88. Further, the driver 20 generally does not move any farther in direction 212 despite the user's pressing of the handle 60 because the main drive rod impact end 16 is spaced from the driver impact surface 31 (see FIG. 12) and the shaft surface 104 is spaced from the driver rim 226 by the gap 271 produced by the recoil of the shaft 100 in direction 210.

Figure 13:
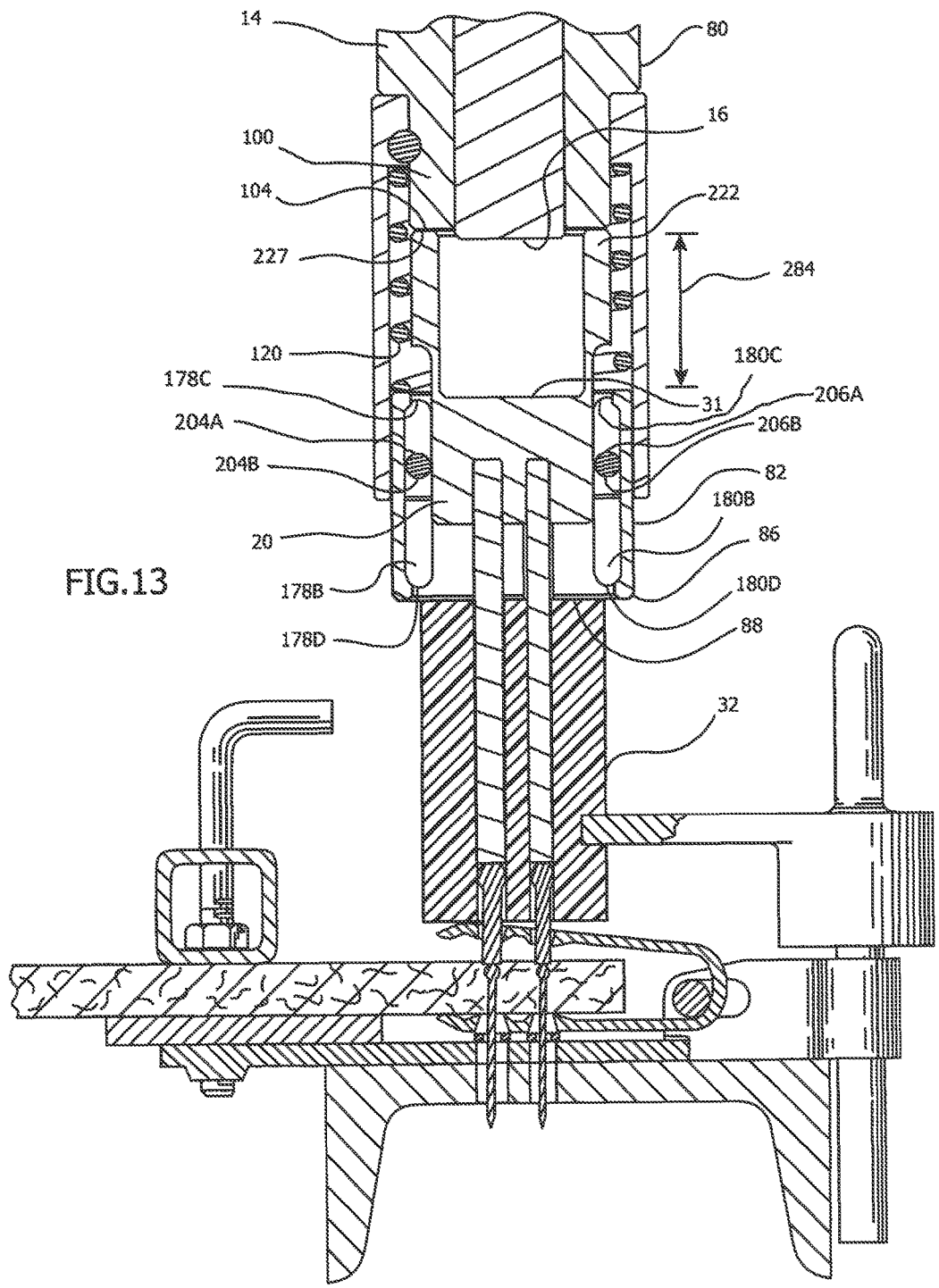

With reference to FIGS. 12 and 13, the user continues to push the handle 60 in direction 212 which shifts the shaft 100 and sleeve in direction 212 while the tube 82 remains engaged with the guide block 32. This shifting of the shaft 100 in direction 212 draws the sleeve seating surface 169 toward the tube seating surface 157 which compresses the spring 120 and draws the coils 171 of the spring 120 closer to one another. Compressing the spring 120 causes the spring 120 to bias against the tube 82 and tightly engage the tube end portion 86 against the guide block upper surface 88. In this manner, the spring 120 maintains the tube end portion 86 in engagement with the guide block 32 despite vibration and the movement of the shaft 100 toward and away from the guide block 32 as the main drive rod impact end 16 repeatedly strikes the driver impact surface 31. Engagement of the tube 82 with the guide block 32 stabilizes the guide block 32 and inhibits vibrations of the guide block 32 that may cause rivets 34 in nearby groupings of bores 30 from hopping out of the guide block 32.

As shown in FIG. 13, the user's continued pushing of the handle 60 in direction 212 seats the shaft surface 104 against the driver rim surface 227 and closes the gap 271 therebetween (gravity pulling the tool 10 toward the block 32 may also aid this operation). At this point, the driver spacer wall 222 again separates the main drive rod impact end 16 from the driver impact surface 31 by the axial distance 284. With the user continuing to hold down the trigger 64 and the main drive rod impact end 16 in the retracted position, the control valve 245 enters Mode 4 and causes the main drive rod impact end 16 to shift toward its extended position and strike the driver impact surface 31 for the second time. Because the driver spacer wall 222 separates the main drive rod impact end 16 from the driver impact surface 31 by the distance 284, the main drive rod impact end 16 again must travel at least the distance 284 before striking the driver impact surface 31. In this manner, the main drive rod impact end 16 again develops maximum or near-maximum velocity and associated maximum or near-maximum kinetic energy immediately before striking the driver 20. With reference to FIG. 14, the main drive rod impact end 16 is shown at the moment the main drive rod impact end 16 strikes the driver impact surface 31. The drive rods 22 transfer the energy from the main drive rod impact end 16 striking the driver 20 into the rivet heads 260 and further advance the rivets 34 out of the guide block bores 30 and into the conveyor belt end 40 (see FIG. 15).

With reference to FIG. 15, the impact from the main drive rod impact end 16 striking the driver impact surface 31 moves the driver 20 farther in direction 212 toward the guide block 32 and advances the drive rods 22 farther along the guide block bores 30. The impact from the main drive rod impact end 16 striking the driver impact surface 31 also causes the shaft 100 and sleeve 110 mounted thereon to recoil away from the guide block 32 in direction 210. In response to the driver impact end 16 reaching the extended position and the user continuing to pull the trigger 64, the control valve 245 enters Mode 3 and causes the main drive rod impact end 16 to shift toward its retracted position as the shaft 100 and sleeve 110 recoil away from the guide block 32.

With reference to FIG. 15, the spring 120 is still compressed (compare FIGS. 6 and 15) and continues to apply a biasing force against the tube 82 in direction 212 despite the shaft 100 recoiling away from the guide block 32 in direction 210 after the main drive rod impact end 16 strikes the driver impact surface 31. The spring 120 therefore continues to maintain the tube distal end 86 in tight engagement with the guide block upper surface 88 despite the recoil of the shaft 100 and the sleeve 110. Thus, the tube 82 remains at generally the same position along the driving axis 18 (i.e., engaged with the guide block 32) despite the driver moving in direction 212 and the shaft 100 and sleeve 110 moving in direction 210 in response to the impact of the main drive rod impact end 16 striking the driver impact surface 31.

Figure 16:
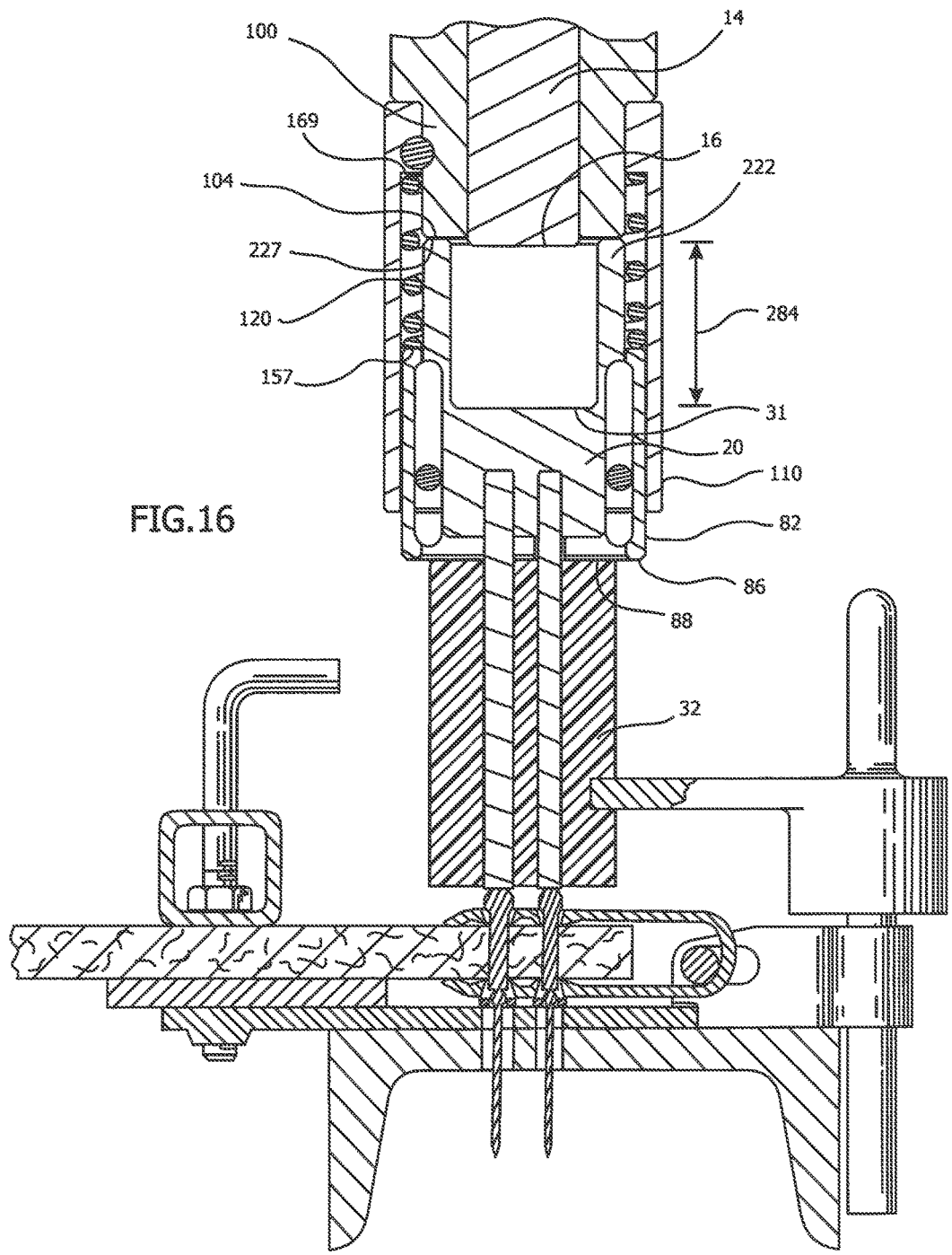

With reference to FIGS. 15 and 16, the user continues to pull the trigger 64 and push the handle 60 (see FIG. 1) in direction 212 toward the guide block 32 as the shaft 100 recoils. The user pushing in direction 212 again seats the shaft surface 104 against the driver rim 226 and closes the gap 271 (gravity pulling the tool 10 toward the block 32 may also aid this operation). Seating the shaft surface 104 against the driver rim surface 227 causes the driver spacer wall 222 to again separate the main drive rod impact end 16 from the driver impact surface 31 by the axial distance 284. Seating the shaft surface 104 against the driver rim surface 227 also draws the collar seating surface 169 toward the tube seating surface 157 and further compresses the spring 120. The further-compressed spring 120 applies a larger biasing force against the tube seating surface 157 and more tightly engages the tube end portion 86 with the guide block upper surface 88.

Figure 17:
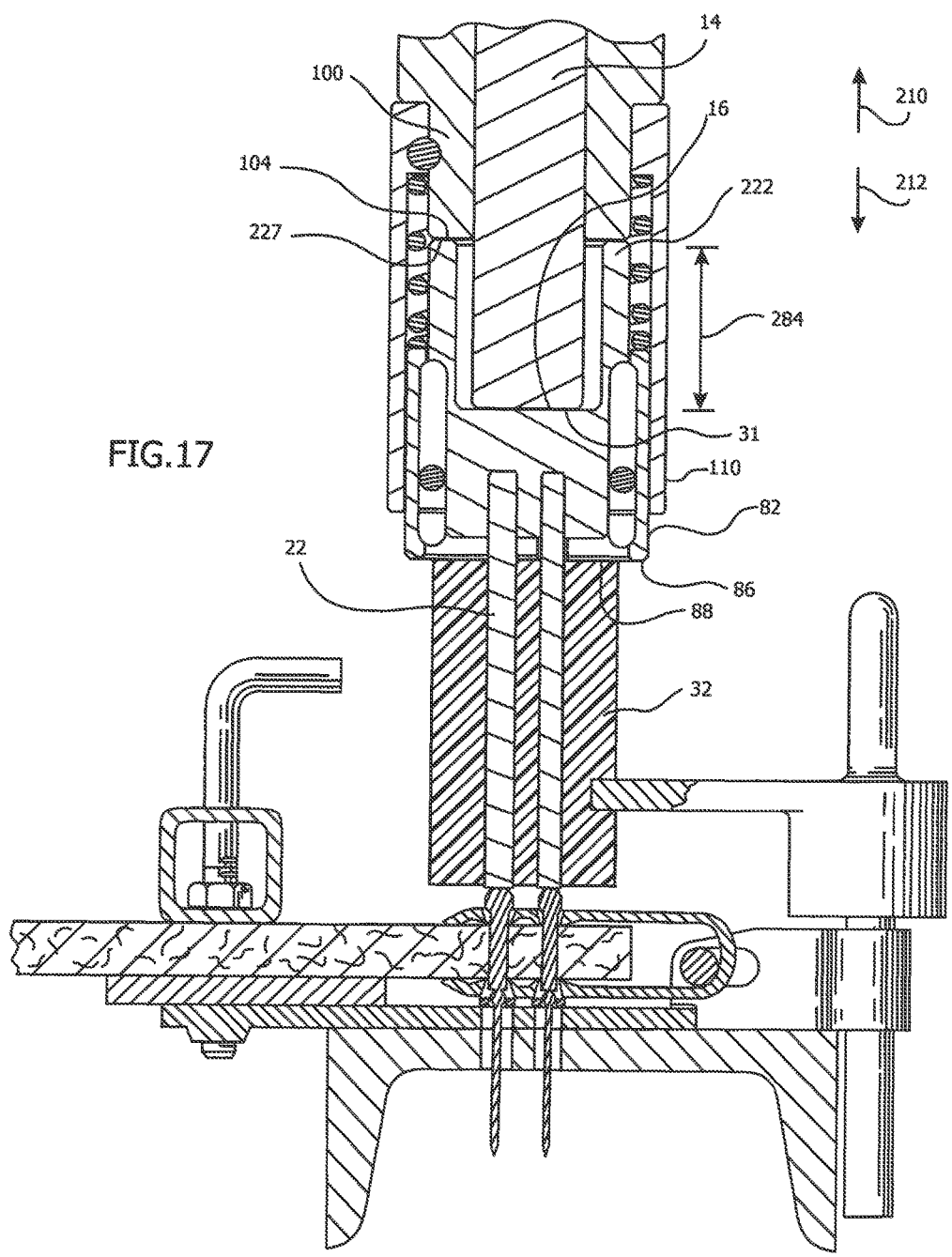

In response to the driver impact end 16 reaching retracted position (see FIG. 16) and the user continuing to pull the trigger 64, the control valve 245 enters Mode 4 and causes the main drive rod impact end 16 to shift toward the extended position and strike the driver impact surface 31 for a third time as shown in FIG. 17. Because the shaft surface 104 is seated against the driver rim surface 227, the driver spacer wall 222 again ensures that the main drive rod impact end 16 travels at least the axial distance 284 and develop maximum or near-maximum velocity before striking the driver impact surface 31. The main drive rod impact end 16 is shown in FIG. 17 at the moment the driver impact end 16 strikes the driver impact surface 31.

Figure 18:
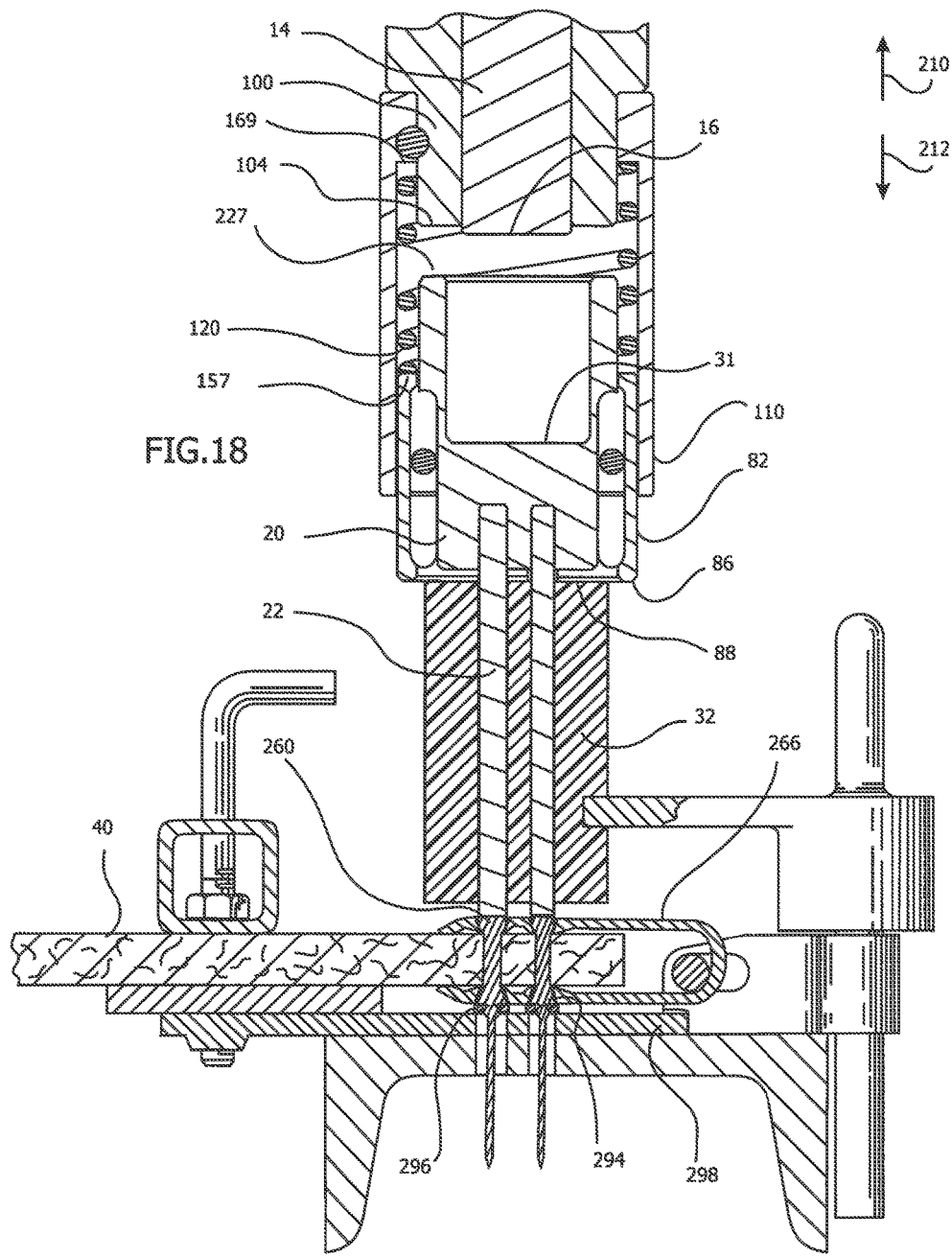

With reference to FIG. 18, the third impact of the main drive rod impact end 16 against the driver impact surface 31 was sufficient to drive the rivets 34 fully outward from the guide block bores 30 and seat the rivet heads 260 against the fastener upper plate 266, deform leading end portions 294 of the rivets on bushings 296 of an anvil plate 298 of the fixture 42, and fully secure the fastener 44 to the conveyer belt end 40. As shown in FIG. 18, the main drive rod impact end 16 striking the driver impact surface 31 for the third time causes the shaft 100 and sleeve 110 to recoil in direction 210 away from the guide block 32. However, the spring 120 remains compressed between the collar seating surface 169 and the tube seating surface 157 such that the spring 120 applies a biasing force against the tube seating surface 157. The spring 120 thereby maintains the tube distal end 86 tightly engaged with the guide block upper surface 88 and stabilizes the guide block 32 against vibration which reduces the likelihood of rivets 34 jumping out of nearby bores 30.

The foregoing figures show three impacts of the main drive rod impact end 16 against the driver 31 to drive the rivets 34 fully into the conveyor belt end 40. However, it will be appreciated that the number of impacts of the main drive rod impact end 16 against the driver impact surface 31 to fully drive the rivets 34 or other members will vary for particular circumstances. For example, it has been found that in some approaches, the vibratory tool 10 can drive five rivets 34 out of guide block bores 32 and into a conveyor belt end 40 with in about four to about eight seconds with approximately 18 to approximately 37 impacts of the impact end 16 against the driver impact surface 31.

The tool 10 permits a user to drive rivets 34 out of guide block bores 32 with repeated impacts of the main drive rod impact end 16 against the driver impact surface 31. Due to the frequency and force of the main drive rod impact end 16 striking the driver impact surface 31, the tool shaft surface 104 may not seat against the driver rim surface 227 every time the main drive rod impact end 16 shifts from the retracted position toward the extended position to strike the driver impact surface 31. Stated differently, the shaft surface 104 may be spaced along the driving axis 18 from the driver rim surface 227 by the gap 271 as the main drive rod impact end 16 shifts from the retracted position toward the extended position. Even in this situation the driver spacer wall 222 ensures that the main drive rod impact end 16 travels at least the axial distance 284 before striking the driver impact surface 31. Specifically, the main drive rod impact end 16 must travel farther than the axial distance 284, i.e, the main drive rod impact end 16 must travel the axial distance 276 formed by the driver spacer wall 222 plus the axial distance of the gap 271 (see FIG. 15).

With reference to FIG. 19, the velocity of the main drive rod 14 versus time during firing of the tool 10 as shown. The tool used to produce this graph is similar to the tool 10 discussed above and includes a driver 20 configured to establish an axial distance 284 of 1.4 inches. Further, the tool used to produce this graph has an integral piston 14A and main drive rod 14 with a weight of one pound, six ounces. With reference to FIG. 19, the driver spacer wall 222 is preferably sized to provide an axial distance 284 that permits the main drive rod impact end 16 to develop a velocity between points 320, 322. More specifically, if the shaft surface 104 is seated against the driver rim surface 227 as the impact end 16 shifts from the retracted to the extended position, the driver impact end 16 travels distance 284 and develops a velocity at point 320 before striking the driver impact surface 31. If, however, the shaft surface 104 is spaced from the driver rim surface 227 as the impact end 16 travels from the retracted position to the extended position, the main drive rod impact end 16 travels farther (i.e., distance 284 plus the axial distance of the gap 271) before striking the driver impact surface 31. Because the main drive rod impact end 16 travels farther, the velocity of the main drive rod impact end 16 may be closer toward the velocity at point 322.

By ensuring that the main drive rod impact end 16 achieves a velocity between points 320, 322 immediately before striking the driver 20, the velocity and the resulting kinetic energy of the driver 20 is within a sweet spot where the main drive rod 14 has a maximum or near-maximum velocity and kinetic energy. This maximum velocity and kinetic energy is transferred to the rivets 34 by the driver 20 so that a minimal amount of recoil is transmitted to the shaft 100 and components connected thereto.

Figure 20:
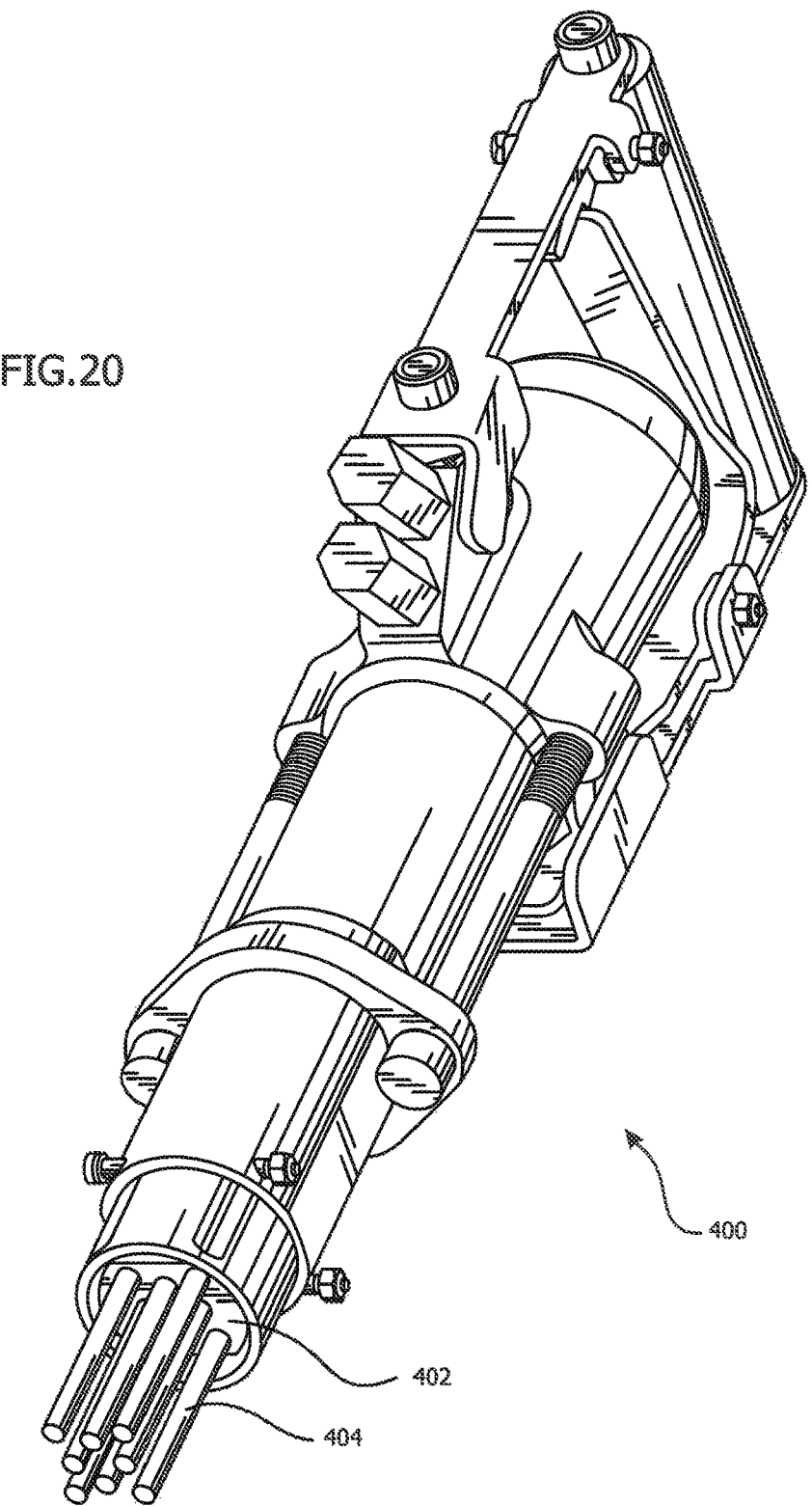
FIG. 20 is a perspective view of another hydraulic vibratory tool showing a driver of the tool having eight drive rods.

With reference to FIG. 20, another hydraulic vibratory tool 400 is shown. The tool 400 is similar to the tool 100 in many respects such that differences between the tools 400 will be highlighted. One difference between the tools 10, 400 is that the 400 has a driver 402 with eight drive rods 404. The tool 400 may thereby drive eight rivets 34 out of guide block bores at a time. The tool 400 may also have a heavier piston which develops greater kinetic energy during operation than the main drive rod 14. The piston of the tool 400 may have approximately thirty percent greater mass than the main drive rod 14, although the ratio of the mass of the piston of the tool 400 to the mass of the driver 402 may also be in a range of approximately 0.7 to approximately 1.7, in a range of approximately 0.9 to approximately 1.4, and in a range of approximately 1 to approximately 1.2. For example, the ratio may be approximately 1.1. The greater kinetic energy of the heavier piston of the tool 400 provides larger impact forces to drive the larger number of rivets out of the eight guide block bores and into an underlying conveyor belt. Further, the piston of the tool 400 may reciprocate with a frequency of approximately 17 to approximately 18 cycles per second, which is slower than the tool 10, due to the heavier piston of the tool 400.

With reference to FIGS. 21-25, another embodiment of a power pack 1000 for use with the tool 10 is shown. For example, it was found that with a hydraulically powered rivet driver, handheld tool that operates at 1650 psi and which has a flow rate of 6½ gallons per minute, the power pack weighed 800 pounds primarily due to the 20 gallon size needed for the reservoir for the hydraulic fluid. In an application where portability of the tool and thus the power pack therefor is important, such as in splicing operations for conveyor belts using rivet belt fasteners, such an 800 pound hydraulic power pack is impractical.

Herein, for the same hydraulic rivet driver tool operating at 1650 psi with a hydraulic fluid flow rate of 6½ gallons per minute, the hydraulic power pack is reduced in size to have a weight in the range of approximately 260 pounds to approximately 290 pounds depending on the specific hydraulic fluid employed. For this purpose, a much smaller hydraulic fluid reservoir is employed, such as a reservoir that holds approximately five gallons of hydraulic fluid. This, in turn, allows the power pack to have a much more compact form over one with the larger 20 gallon reservoir so that power pack reservoir herein is approximately 20 percent the size of the larger 20 gallon reservoir.

To address potential overheating of the hydraulic fluid in the relatively small reservoir, the hydraulic power pack employs a heat exchange device through which the hydraulic fluid is directed for cooling thereof. In one form, the heat exchange device includes a fan and a radiator that is configured to keep the hydraulic fluid within a predetermined temperature differential above ambient temperatures, such as no more than 30° Fahrenheit above ambient temperatures.

Another constraint on the power pack relates to its use as supplying a hydraulic fluid under pressure to a hydraulic hand-held, conveyor belt fastener rivet applicator tool. In these applications, the power pack is required to have electronic components that are explosion proof generally due to the combustible small particle, airborne debris often present in areas of conveyor belt operations. Explosion proofing of the electronic components generally requires that they be contained in robust, heavy metallic housings. As is apparent, explosion proofing undesirably adds weight to the power pack.

Hence, the preferred light weight, hydraulic power pack 1000 utilizes a single electric motor to provide power to both a pump that supplies the high pressure hydraulic fluid to the conveyor belt fastener applicator tool as well another pump that is operable to drive the fan of the heat exchange device. Thus, both hydraulic pumps are driven off of the common output shaft of the single electric motor.

Figure 21:
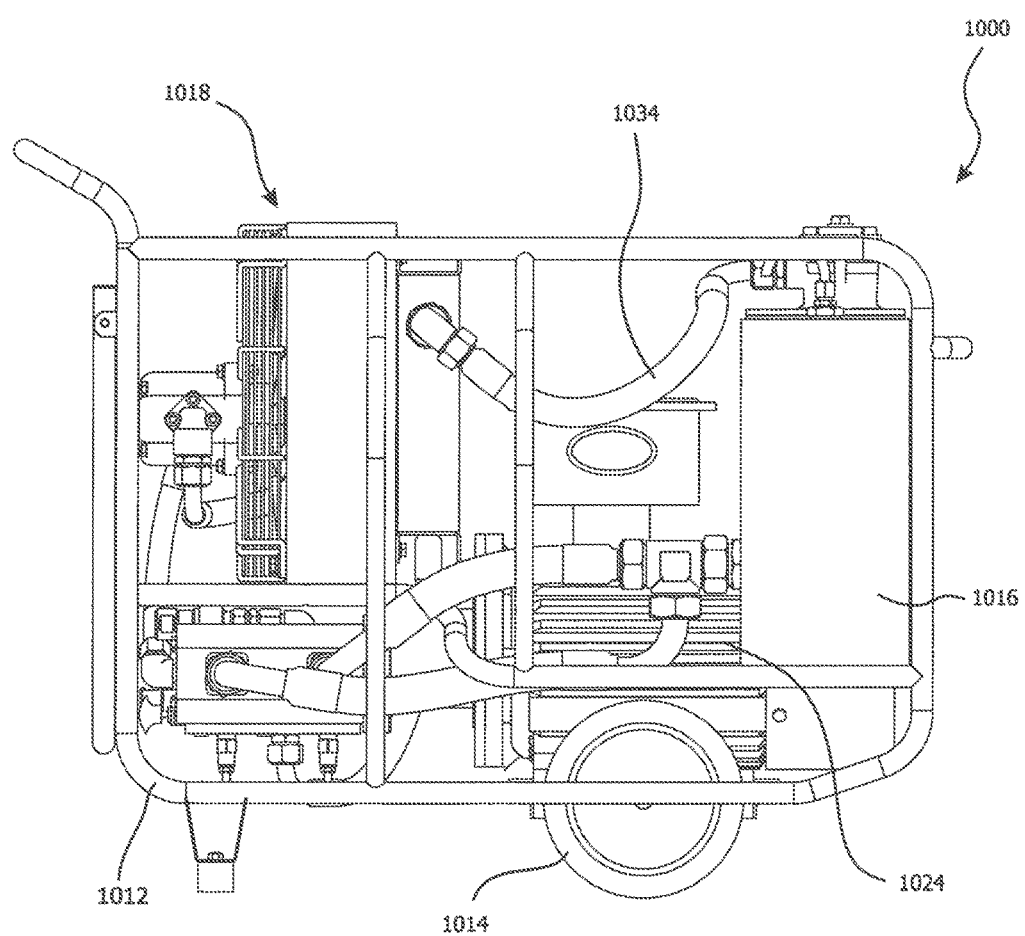
FIGS. 21-25 are various views of a power pack for use with, for example, the tool of FIG. 1.
Figure 22:
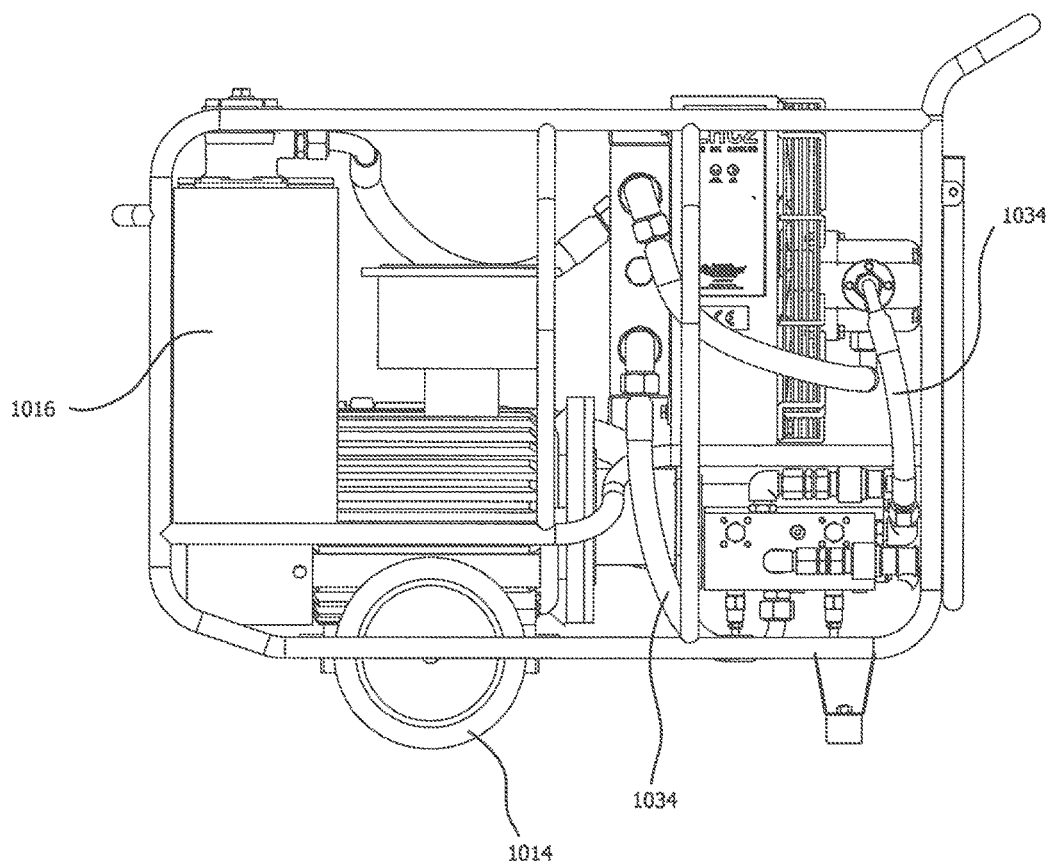
Figure 23:
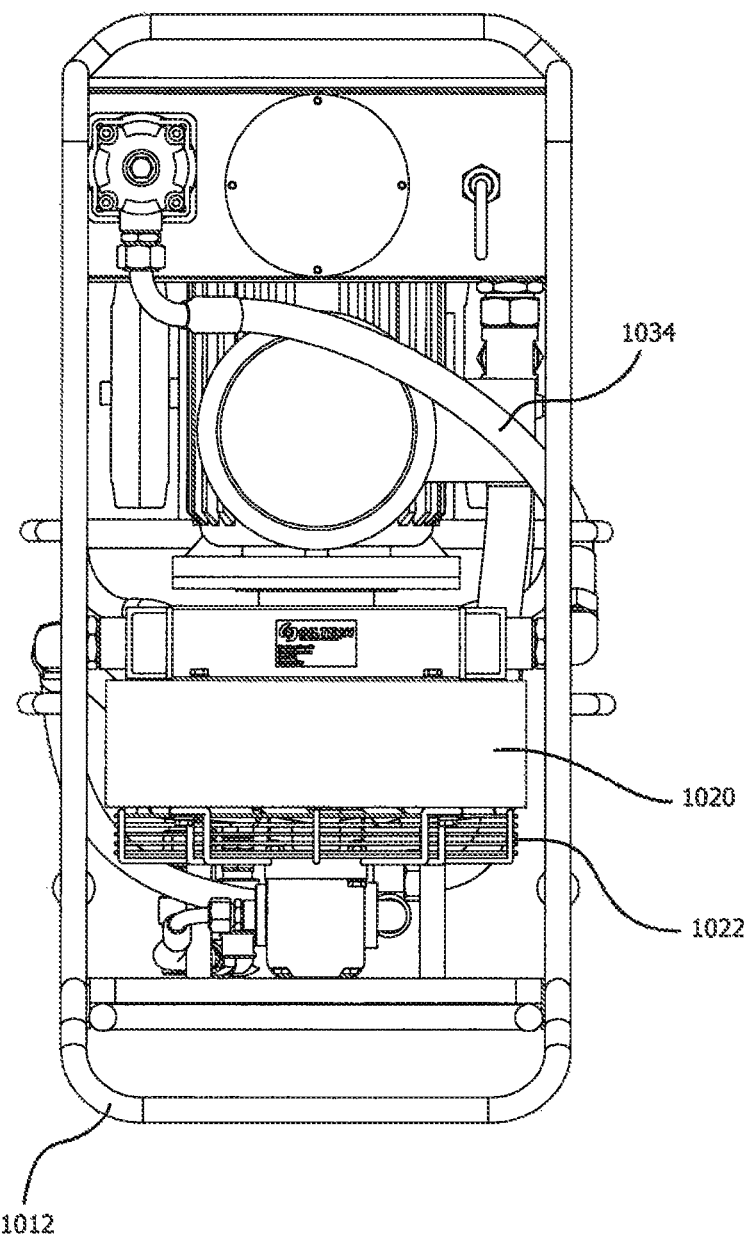
Figure 24:
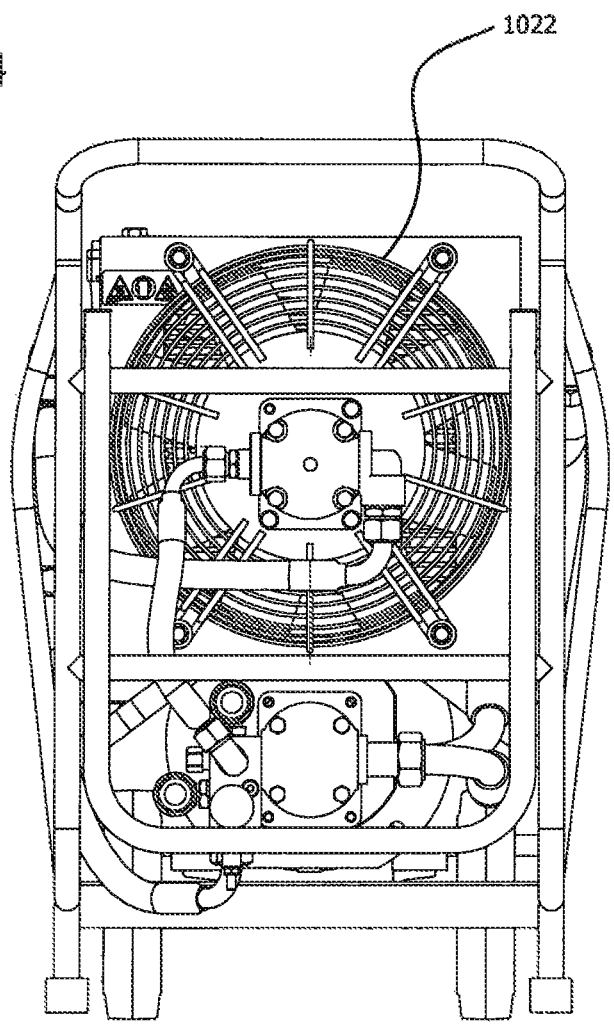
Figure 25:
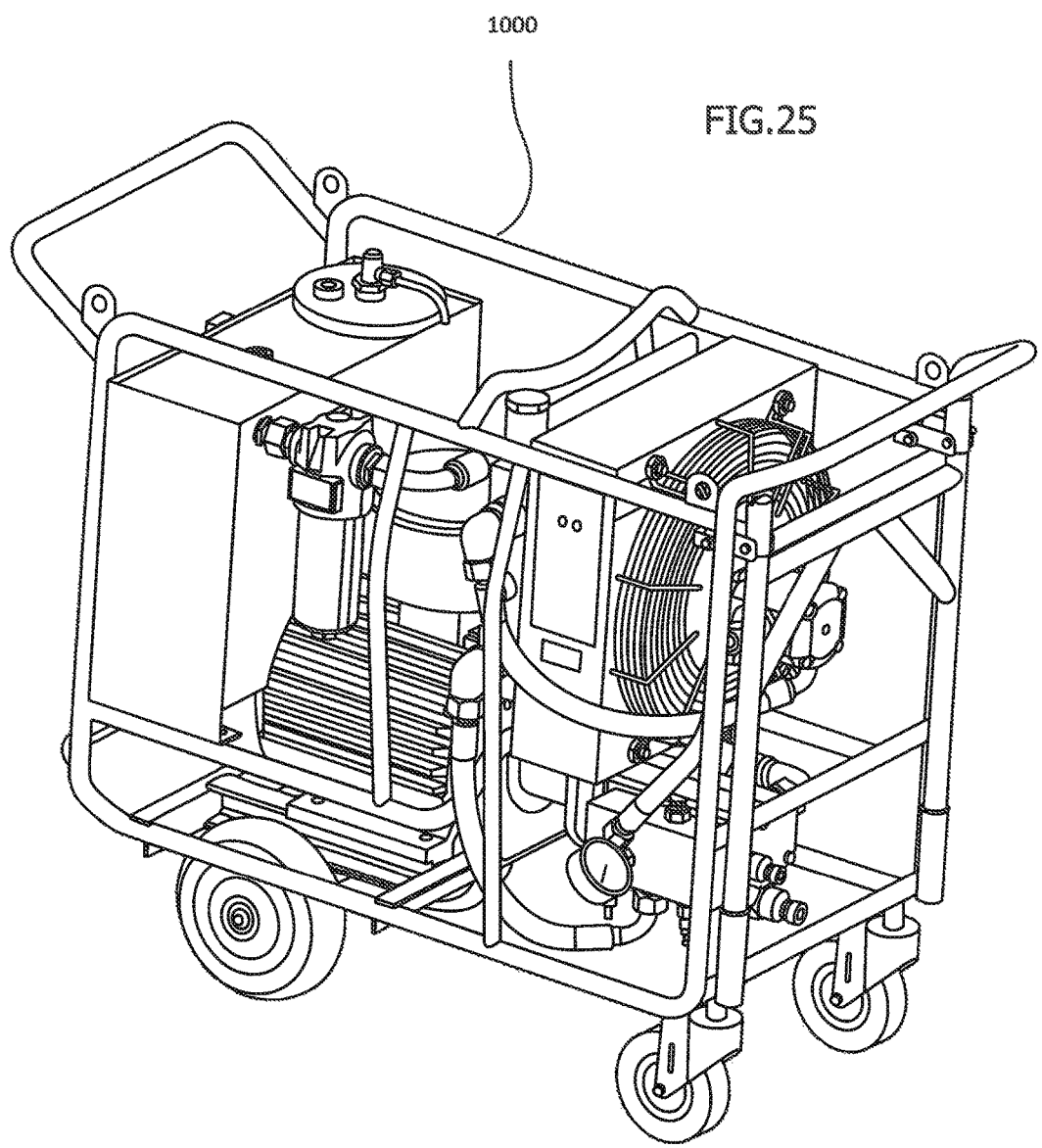

Turning to the figures, FIGS. 21-25 show the hydraulic power pack 1000 in accordance with the present invention, and FIG. 21A is a schematic diagram of the hydraulic fluid flow for the hydraulic power pack of FIGS. 21-25.

As shown, the light weight, hydraulic power pack 1000 is mounted for portability on a rolling cart structure including tubular framing members 1012 and wheels 1014. The rolling cart power pack 1000 includes a relatively small hydraulic fluid reservoir 1016 mounted to the cart frame 1012. The reservoir 1016 is sized to hold approximately five gallons of hydraulic fluid. Because of its relatively small size, the hydraulic fluid exiting a hydraulic rivet driving tool 1017, which may be identical to the tool 10 discussed above, is fed to a heat exchange device 1018 mounted to the frame 1012 before being returned to the reservoir 1016. The heat exchange device 1018 includes radiator 1020 having tubes through which the hydraulic fluid flows and a fan 1022 for generating air flow across the tubes of the radiator 1020 and thereby cooling the hydraulic fluid therein prior to the hydraulic fluid returning to the reservoir 1016.

To keep the weight of the power pack 1000 to a minimum, a single electric motor 1024 is utilized that drives a pair of pumps 1026 and 1028 with the motor 1024 and pumps 1026 and 1028 being mounted to the frame 1012. In this manner, the weight of the rolling cart power pack 1000 is kept to a minimum since the only component of the power pack 1000 that needs to be made explosion proof is the single motor 1024. As can be seen in FIG. 21A, both pumps 1026 and 1028 are driven off the common output shaft 1030 of the motor 1024 with pump 1026 operable to supply high pressure fluid, e.g. at 1650 psi, to the rivet driver hand-held 1017 tool while the pump 1028 is operable to provide pressurized hydraulic fluid for another motor 32 that is operable to drive the fan 1022. Hydraulic fluid lines in the form of hoses 1034 are provided for flow of hydraulic fluid therein to, from, and between the various components described herein. In this regard, it should be noted that the hydraulic fluid circuit shown in FIG. 21A is configured so that even when the rivet driver hand-held tool 1017 is not being operated, the pump 1026 will continue to be operable to keep hydraulic fluid circulating through the tool at a lower pressure, such at approximately 500 psi lower than the operating pressure of the tool 1017. In this manner, the hydraulic fluid is always being cooled since it flows through the heat exchange device 1018 even when the tool 1017 is not being used.

Figure 26:
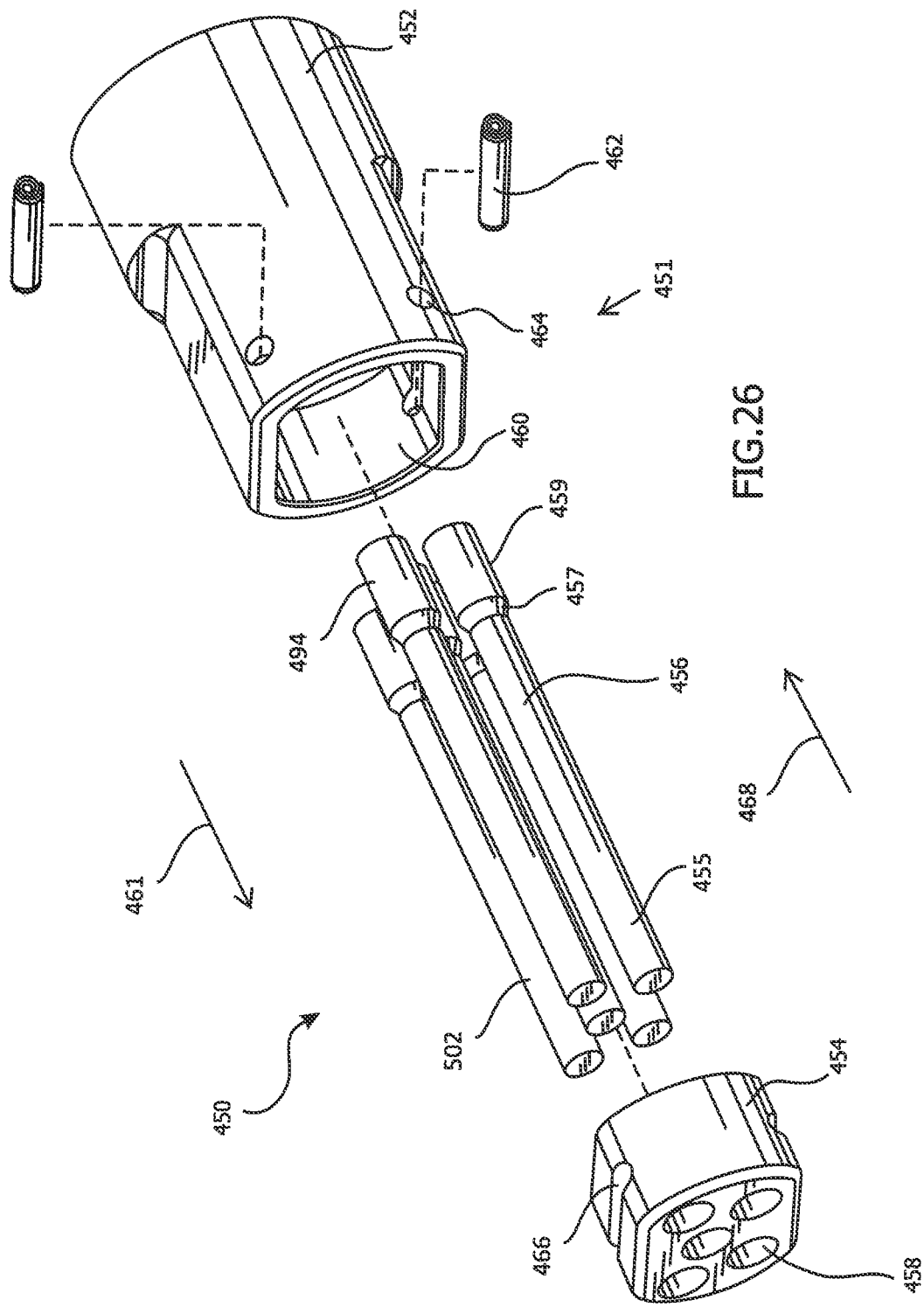
FIG. 26 is an exploded view of another driver for the tool of FIG. 1.
Figure 28:
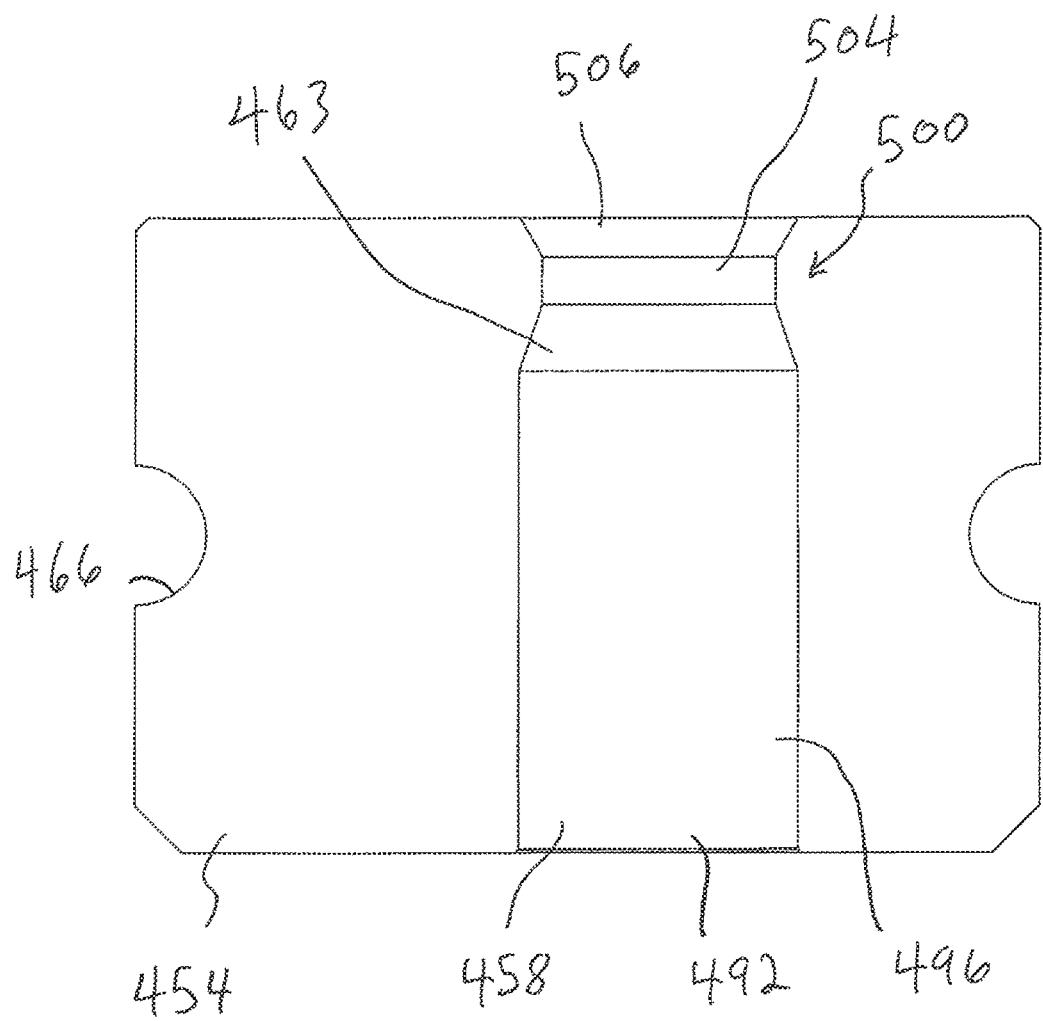
FIG. 28 is a cross-sectional view of a mounting base of the driver of FIG. 26.

With reference to FIG. 26, another driver 450 for use with the hydraulic vibratory tool 10 is shown. The driver 450 includes a locking mechanism 451 for securing drive rods 456 to a body 452 of the driver 450 in a manner that provides a long service life of the driver 450. More specifically, the locking mechanism 451 includes a mounting base 454 having multiple through bores 458 for receiving drive rods 456. The drive rods 456 each have a distal tip 455, a tapered neck 457, and an enlarged head 459. The through bores 458 are sized to permit the drive rod distal tips 455 to be advanced in direction 461 into a respective bore 458 until the drive rid tapered neck 457 engages a stop surface 463 (see FIGS. 28 and 29) of the mounting base 454.

The locking mechanism 451 further includes a socket 460 of the body 453. Once the drive rods heads 459 have been received in the throughbores 458, the mounting base 454 is press fit in direction 468 (see FIG. 27) into the socket 460. Next, spring pins 462 are radially compressed and advanced through openings 464 in the body 452, as shown in FIG. 26. The spring pins 462 extend laterally across the socket 460 and engage grooves 466 of the mounting base 454. The spring pins 462 are released and bias radially outwardly within the body openings 464 and the mounting base groove 464 and firmly engage the surrounding portions of the body 452 and the mounting base 454.

Figure 27:
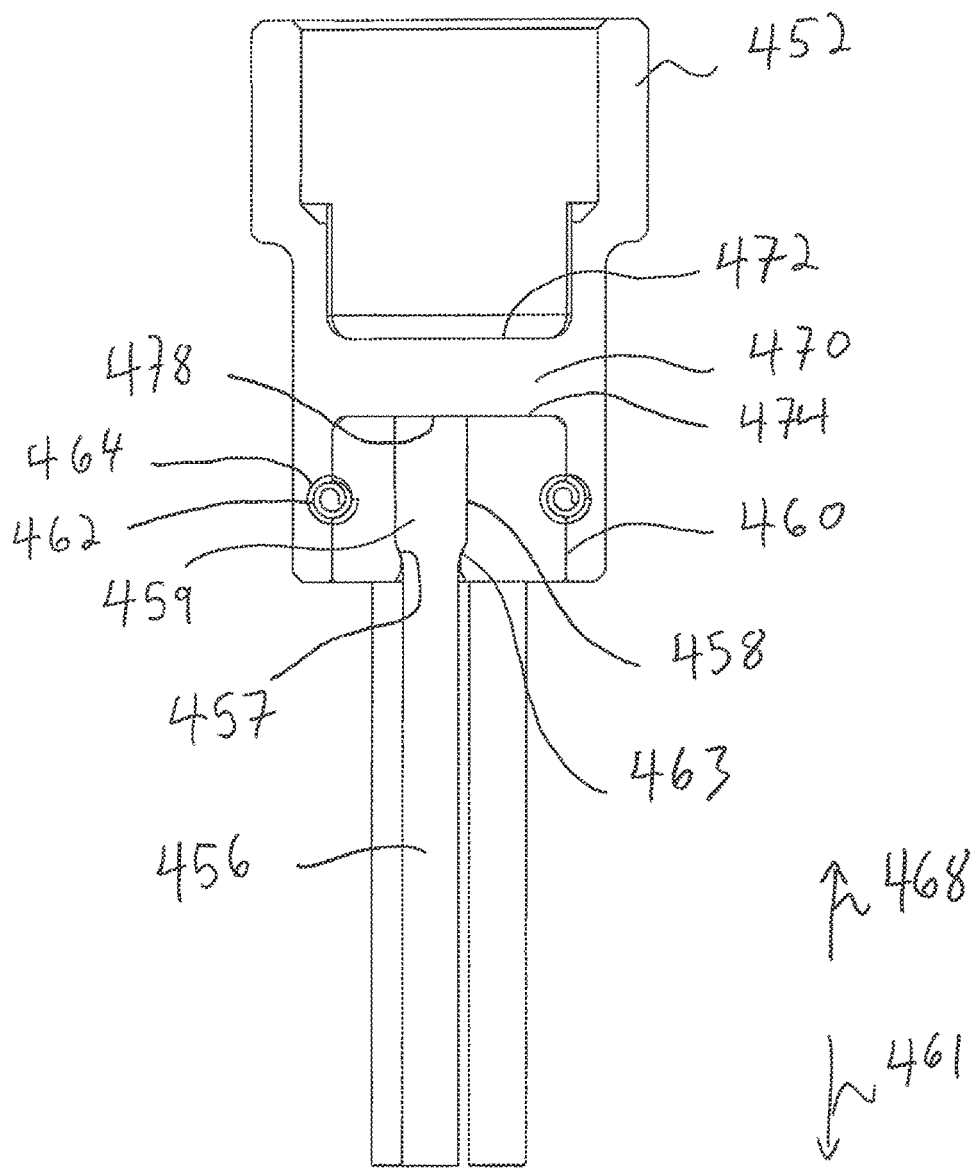
FIG. 27 is a cross-sectional view of the driver of FIG. 26.

With reference to FIG. 27, the engagement between the drive rod tapered neck 457 and the mounting base stop surface 463 inhibits movement of the drive rods 456 in direction 461 and the spring pins 462 in turn inhibit movement of the mounting base 454 (with the drive rods 456 therein) in direction 461. The driver socket 460 includes a load transfer member 470 having an impact surface 472 thereon for receiving impacts from the main drive rod impact end 16. Opposite the impact surface 472, the mounting base 454 has a support surface 474 that engages an end 478 (see FIG. 27) of the drive rod head 459 and transfers energy from the main drive rod impact end 16 to the driver head end 478. The driver socket support surface 474 abuts and restricts movement of the head ends 478 of the drive rods 456 and the mounting base 454 in direction 468. Thus, the mounting base stop surface 463 and the driver socket support surface 474 capture the drive rod head 459 within the throughbores 458 of the mounting base 454.

Figure 29:
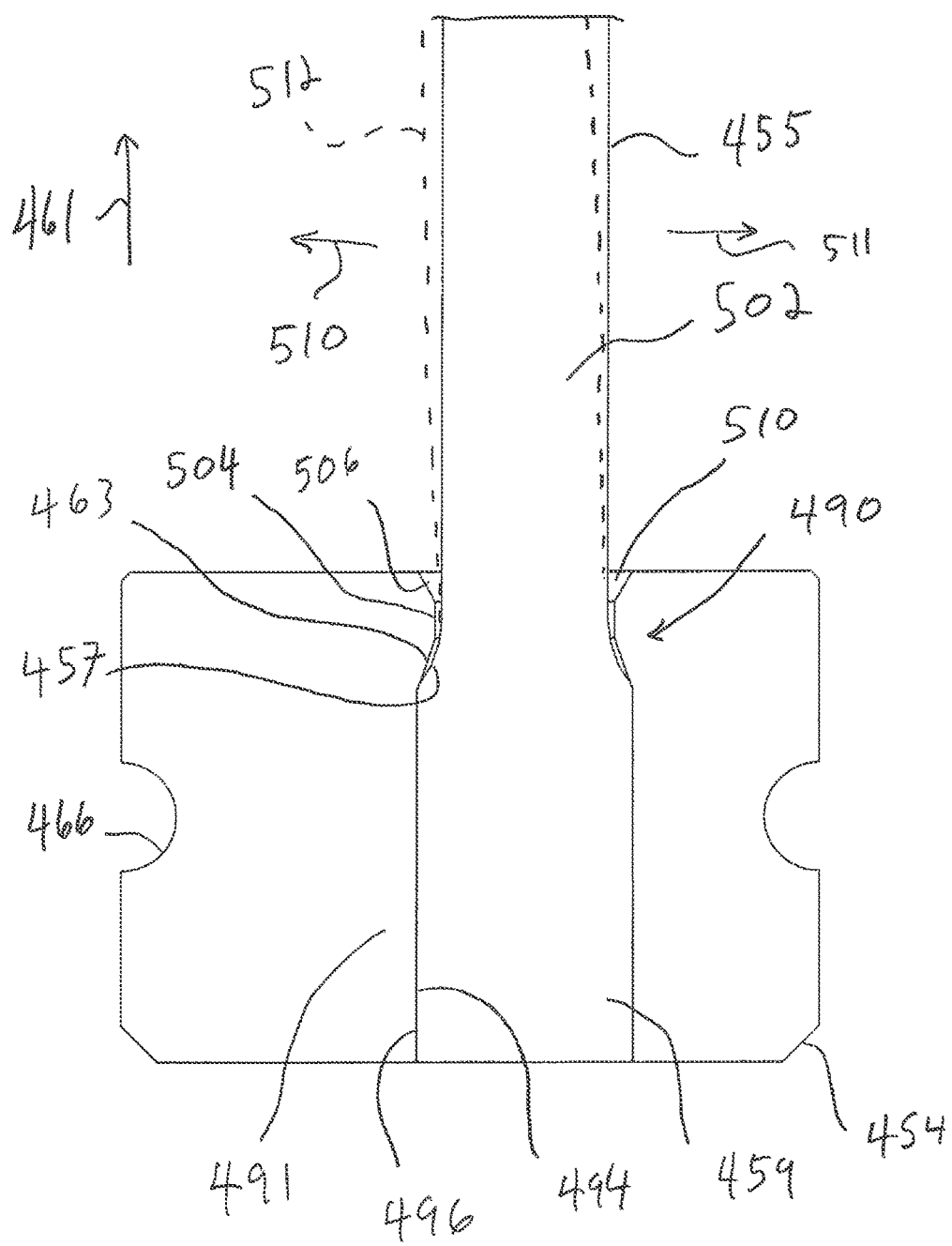
FIG. 29 is a cross-sectional view similar to FIG. 28 showing a drive rod received in a throughbore of the mounting base and a shaft of the drive rod bending during a rivet driving operation.

With reference to FIG. 29, the mounting base 454 has clearance collars 490 for minimizing stress risers on the drive rods 456 and increasing the durability of the driver 450. The mounting base 454 also has a head engaging portion 491 configured to secure the drive rod heads 459, which have the largest cross-section, to the mounting base 454. This provides a more robust connection between the mounting base 454 and the drive rods 456 because the connection occurs at the drive rod head 459, which is the strongest (i.e., largest cross-section) segment of the drive rod 456. For example, the tip 455 of the drive rods 456 are advanced in direction 461 through an open end 492 (see FIG. 28) until the drive rod tapered necks 457 engage the mounting base stop surfaces 463. Further, the drive rod heads 459 may have outer surfaces 494 sized to form a press fit engagement with inner surfaces 496 of the through bores 458. Thus, although the press fit initially secures the drive rod heads 459 within the mounting base through bores 458, the mounting base stop surface 463 and the driver load transfer member 470 (see FIG. 27) keep the drive rods 456 from falling out of the driver body 452 in the event of failure of the press fit connection.

Returning to FIG. 29, the mounting base clearance collars 490 permit flexing of shafts 502 of the drive rods 456 as the drive rods 456 drive the rivets 34. The clearance collars 490 include a spaced surface 504 and a beveled surface 506. With reference to FIG. 29, there is an annular gap 510 between the drive rod shaft 502 and the surfaces 504, 506 having a minimum radial distance in the range of approximately 0.005 inches to approximately 0.02 inches, such as approximately 0.01 inches.

Due to compressive loads applied to the drive rods 456, the shafts may bend or deflect laterally in directions 510, 511 (as well as out of and into the page) and, for example, to the position 512 shown in dashed in FIG. 29. Due to the clearance collars 490, the drive rod shaft 502 may move in directions 510, 511 without contacting the surfaces 504, 506 such that the surfaces 504, 506 do not contact the drive rods 456 and create stress therein. Rather, the head engaging portion 491 of the mounting base 454 imparts any stresses on the drive rods 456 at the heads 459. Because the stresses on the drive rods 456 occur at the heads 459, which are the strongest sections of the drive rods 456, the drive rods 456 are less likely to fail during driving of the rivets 34 out of the guide block guide bores 32 and into the underlying conveyor belt end 40.

Figure 30:
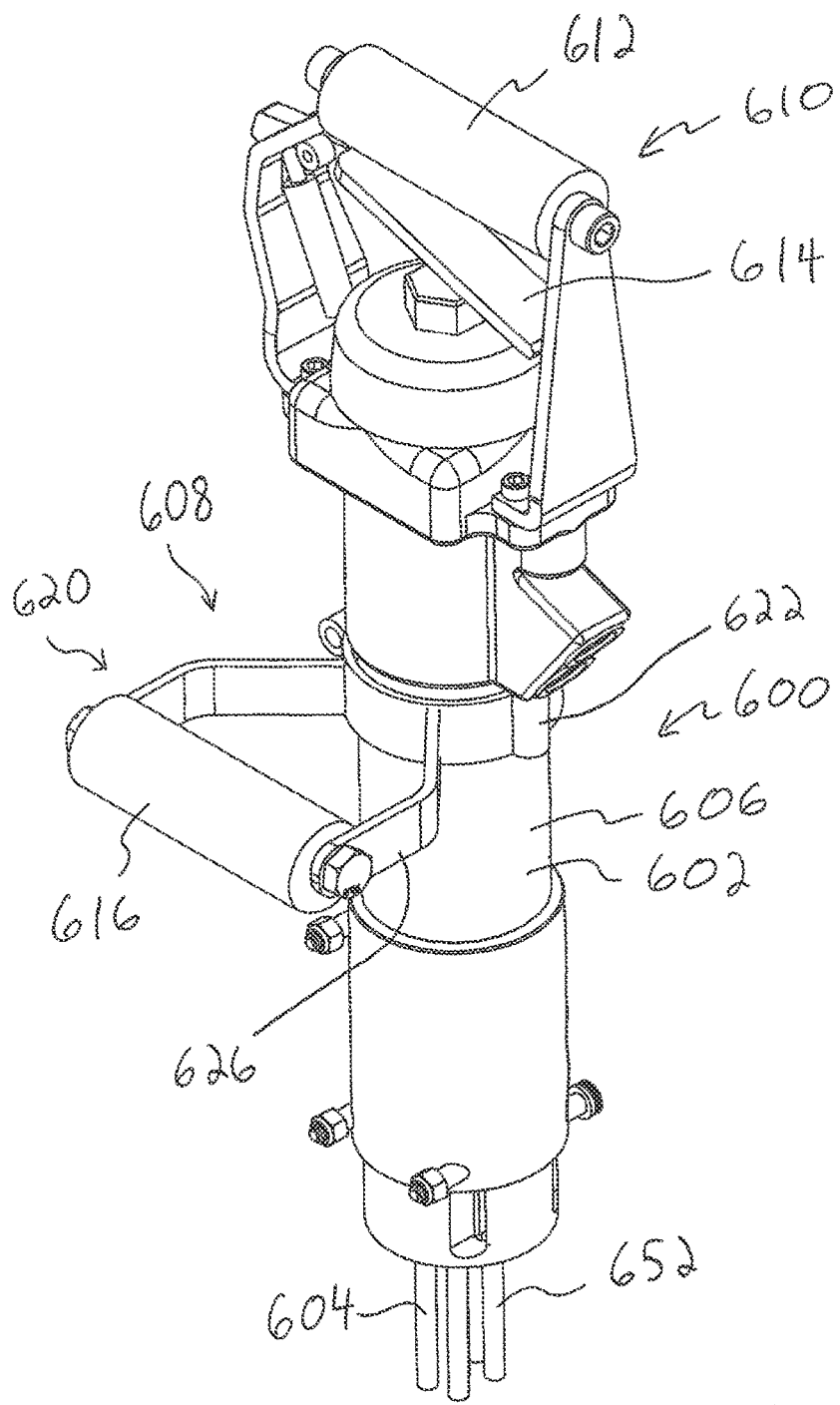
FIG. 30 is a perspective view of another hydraulic vibratory tool showing a laterally positioned handle of the tool.

With reference to FIG. 30, another hydraulic vibratory tool 600 is shown. The hydraulic vibratory tool 600 is similar in many respects to the hydraulic vibratory tools discussed above. The tool 600 includes a body 602 and a driver 604 that is movable relative to the body 602. The body 602 includes a cylindrical wall 606 and a handle 608 secured to the cylindrical wall 606. The tool 600 has a primary handle 610 with a grip 612 and a trigger 614 for operating the tool 600. The handle 608 has a grip 616 that provides another location for a user to grasp the tool. In this manner, a user may operate the tool 600 with both hands on the grips 612, 616 which makes the tool 600 easier to handle during repeated driving operations and improves accuracy.

The handle 608 includes a frame 620 having a collar portion 622 connected to the cylindrical wall 606. In one form, the collar portion 622 is releasably connected to the cylindrical wall 606 such that a user may remove the handle 608 if so desired. Alternatively, the frame 620 may be permanently fixed to the body 602 such as by welding. The frame 620 also has one or more arm portions 626 extending outward from the collar portion 622. The one or more arm portions 626 position the grip 616 laterally from the cylindrical wall 606 a distance that provides clearance for the user's fingers about the grip 616. The arm portions 626 also provide the laterally spaced position of the handles 612, 616 that ergonomically position the user's hands for secure handling of the tool 600 during rivet driving operations.

Figure 31:
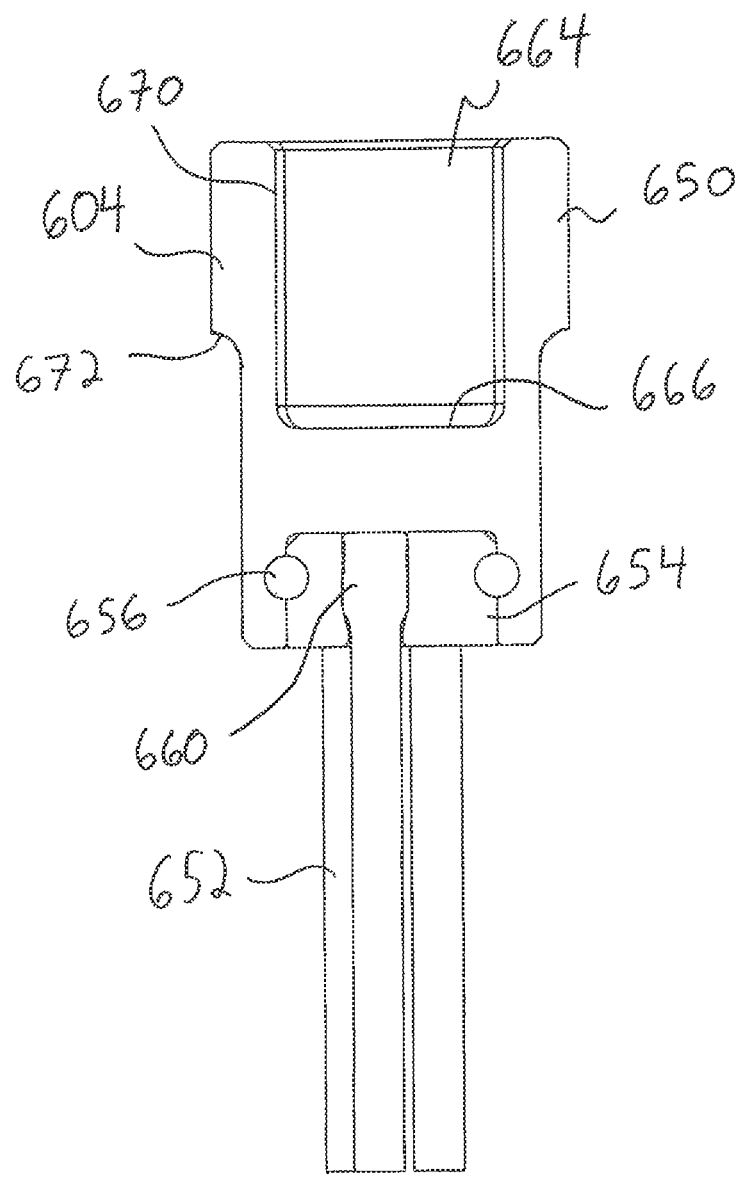
FIG. 31 is a cross-sectional view of a driver of the tool of FIG. 30.

With reference to FIG. 31, the driver 604 of the tool 600 is similar to the driver 450 discussed above. The driver 604 has a body 650, one or more drive rods 652, and a mounting base 654. To maintain the driver 604 in an assembled configuration, the driver 604 has solid pins 656 fixed in apertures of the body 650 that secure the mounting base 654 and enlarged heads 660 of the drive rods 652 to the body 650. The pins 656 may be held in the apertures of the body 650 using for example, a slip fit retained by a silicone adhesive. Other approaches may be used such as a press fit, welding, or other techniques.

The body 650 has an opening 664 that opens to an impact surface 666. The opening 664 has a generally obround cross-section including flat walls 670 near shoulders 672 of the body 650. The flat walls 670 provide a thick sidewall of the body 650 near the shoulders 672 which increases the durability of the body 650.

Figure 32:
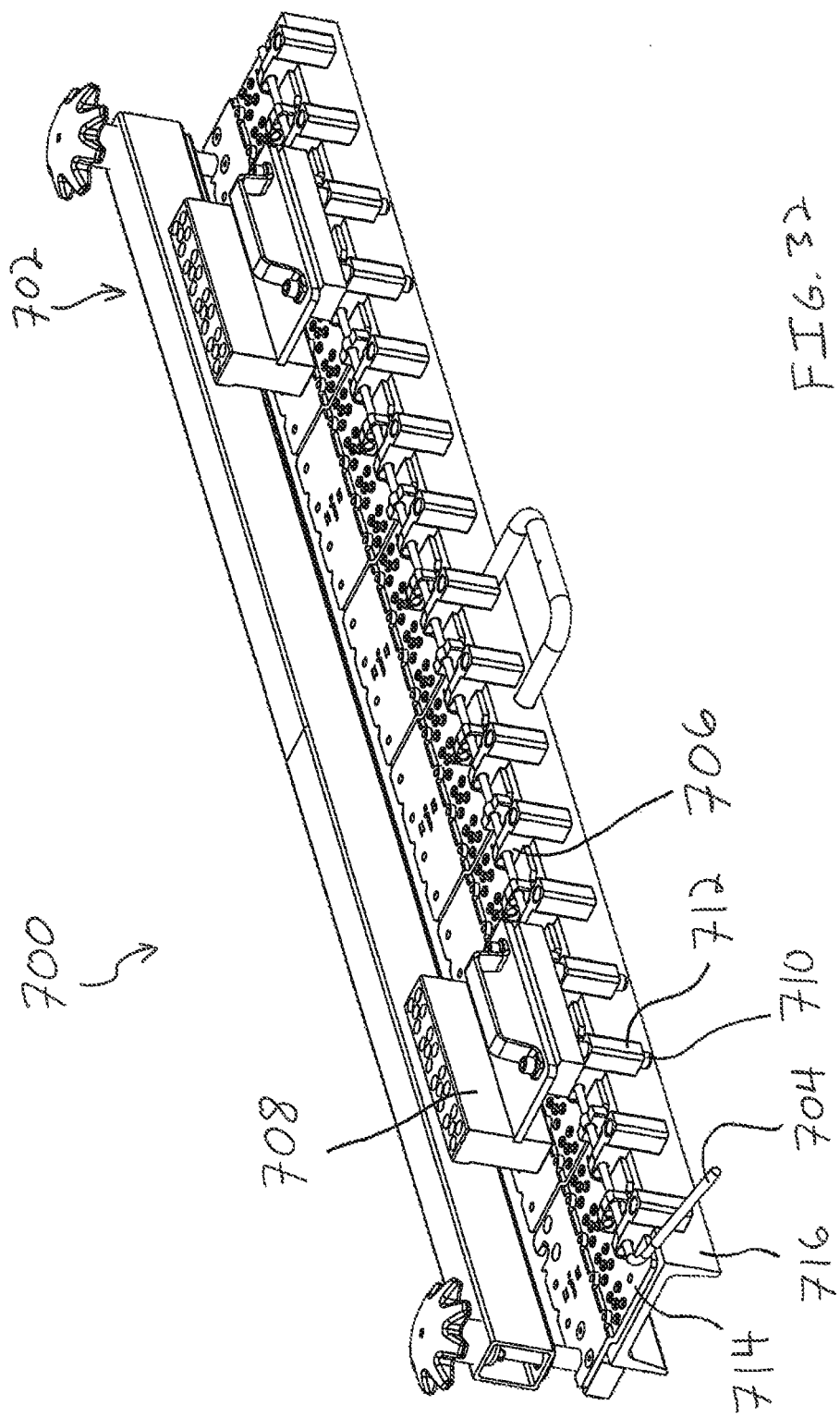
FIG. 32 is a perspective view of another fixture for holding a conveyor belt and guide blocks of the fixture for guiding rivets into the conveyor belt.

With reference to FIG. 32, a fixture 700 is provided that is similar in many respects to the fixture 42 discussed above. The fixture 700 includes heavy-duty components to withstand the high forces applied by hydraulic vibratory tools, which may be much higher than manual or pneumatic tools. The fixture 700 has a belt clamp mechanism 702 that receives and holds an end of a conveyor belt. The fixture 700 has an installation pin 704 and fastener locators 706 that cooperate to hold fasteners for connecting to the conveyor belt end. To guide rivets into the fasteners and through the conveyor belt, the fixture 700 has guide blocks 708 with pins 710 that fit into openings 711 of locators 712. The fixture 700 has anvil plates 714 mounted on a channel 716 that support lower arms of the fasteners as the fasteners are connected to the conveyor belt end.

Figure 33:
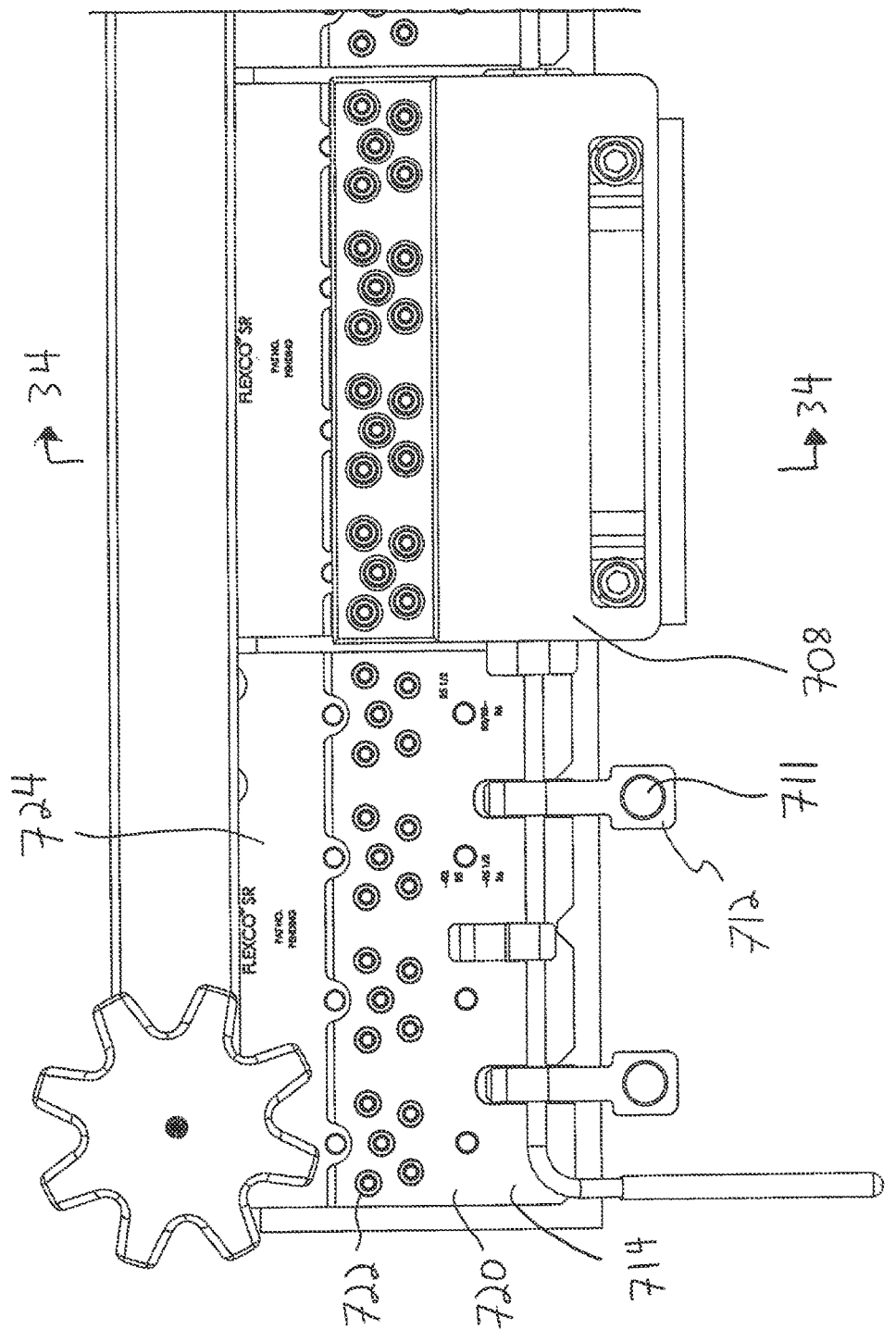
FIG. 33 is a top plan view of a portion of the fixture of FIG. 32 showing locators of the fixture that receive pins of the guide blocks to locate the guide blocks along the conveyor belt end.
Figure 34:
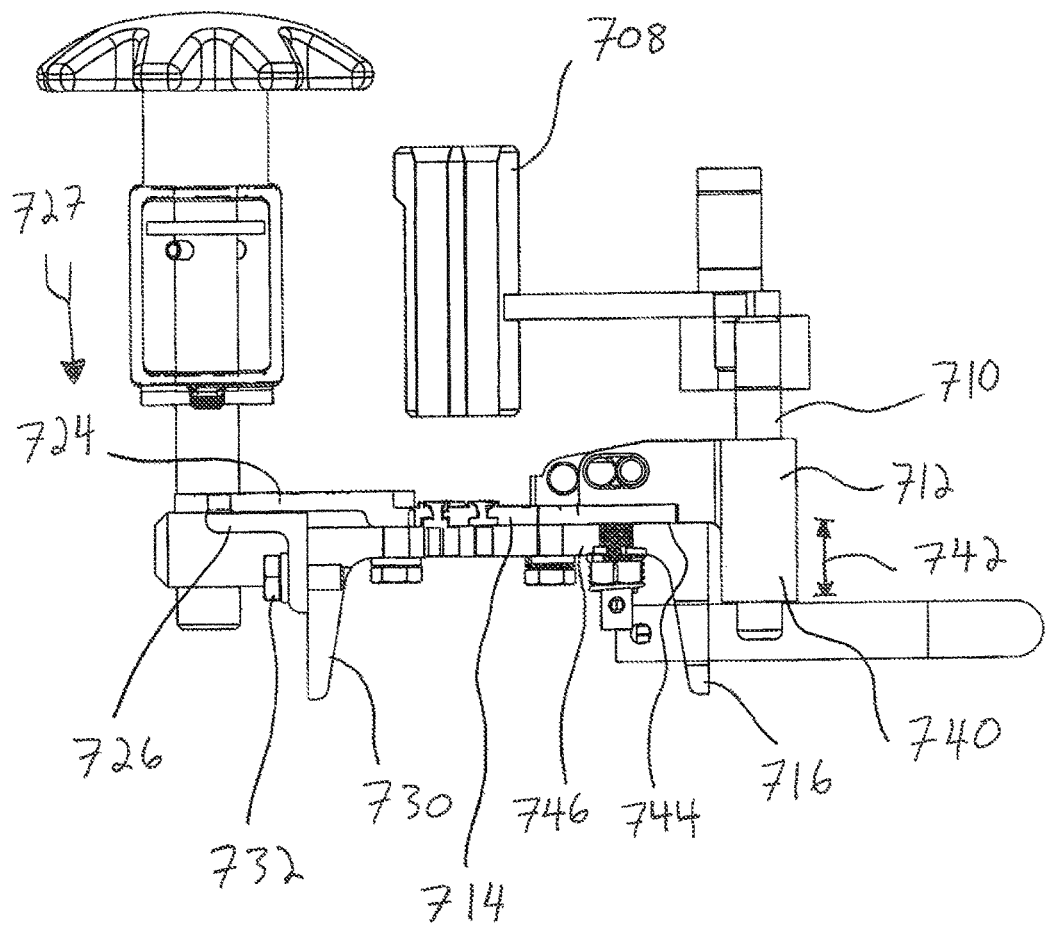
FIG. 34 is a cross-sectional view taken across line 34-34 in FIG. 33 showing an elongated sleeve of one of the locators that provides a more robust connection with the guide block.

With reference to FIGS. 33 and 34, the anvil plates 714 each have anvil portions 720 with bushings 722 that deform leading ends of the rivets and a raised belt portion 724 for supporting an underside of the conveyor belt. The fixture 700 has a support, such as an angle bracket 726, to support the belt portion 724 of the anvil plate 714. The angle bracket 726 resists deflection of the belt portion 724 and associated stress in the anvil plate 714. For example, impacts from tool 10 driving rivets out of the guide block 708 may apply loading against the conveyor belt end which is transmitted to the belt portion 724. The angle bracket 726 resists deflection of the belt portion 724 in direction 727 due to the loading on the conveyor belt end. Because the angle bracket 726 resists deflection of the belt portion 724, the anvil plate 714 is subjected to reduced stress which improves the durability of the anvil plate 714. In one form, the angle bracket 726 extends along a forward leg 730 of the channel 716 to support all of the anvil plates 714 and is fixed to the forward leg 730, such as by a series of fasteners 732 evenly spaced along the leg 730.

Another feature of the fixture 700 that increases the robustness of the fixture 700 is that the locators 712 include elongated sleeves 740 defining the openings 711 for receiving the pins 710 of the guide blocks 708. The sleeves 740 extend downwardly a distance 742 below an upper surface 744 of a bridge portion 746 of the channel 716. The sleeves 740 provide a larger interface for engagement with the pins 710 of the guide block 708. The locators 712 are rigidly mounted to the bridge portion 746 of the channel 716 such that the enlarged engagement between the locators 712 and the pins 710 due to the sleeves 740 increases the strength of the connection between the guide block 708 and the channel 716 with the guide block pins 710 fit into the openings 711 of the locators 712.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A vibratory tool for driving a plurality of rivets out from bores of a guide block into an underlying conveyor belt, the tool comprising:
a body;
a hydraulically actuated main drive rod mounted to the body and having an impact end that rapidly reciprocates along a driving axis between retracted and extended positions;
a driver aligned with the main drive rod and slidably mounted to the body for travel along the driving axis;
a plurality of elongated drive rod members of the driver configured and sized to extend forwardly into the guide block bores for engaging and simultaneously driving multiple rivets out of the guide block bores;
an intermediate impact surface of the driver for being impacted by the main drive rod impact end as the main drive rod impact end rapidly reciprocates between the retracted and extended positions; and
a rearwardly extending spacer wall of the driver for axially spacing the driver intermediate impact surface and the main drive rod impact end in the retracted position thereof by at least a predetermined axial distance sized for optimizing the energy transfer from the main drive rod to the driver when the main drive rod impact end impacts the driver impact surface,
wherein the body includes a housing; and
a nose stabilizing member slidably connected to the housing and projecting axially beyond the housing for engaging the guide block to allow the housing to slide axially toward the guide block along the nose stabilizing member engaged therewith causing the housing to seat against the driver spacer wall with the drive rod members extending into the guide block bores.

2. The vibratory tool of claim 1 wherein the rearwardly extending spacer wall of the driver has an axial length corresponding to the predetermined axial distance.

3. The vibratory tool of claim 1 wherein the body includes a shaft having a bore through which the hydraulically actuated main drive rod extends and the rearwardly extending spacer wall of the driver is configured to abut the shaft with the main drive rod impact end in the retracted position.

4. The vibratory tool of claim 1 wherein the nose stabilizing member is slidable along the driving axis from an extended position to a retracted position; and
a biasing member biasing the nose stabilizing member away from the housing toward the extended position so that moving the nose stabilizing member from the extended position toward the retracted position with the nose stabilizing member engaged with the guide block compresses the biasing member which further urges the nose stabilizing member against the guide block.

5. The vibratory tool of claim 1 wherein the rearwardly extending spacer wall of the driver includes a tubular wall and a bore about which the tubular wall extends with the bore being sized to permit the main drive rod impact end to travel in and along the bore and strike the driver impact surface.

6. The vibratory tool of claim 1 wherein the body has a retainer device that is operable to keep the driver from being separated from the slidable mounting thereof to the body.

7. The vibratory tool of claim 6 wherein the retainer device includes a stop member extending transverse to the driving axis and the driver includes a shoulder with the stop member and shoulder being configured to abut and restrict forward movement of the driver beyond a predetermined axial position along the body.

8. The vibratory tool of claim 1 wherein the driver has a predetermined mass and the hydraulically actuated main drive rod has a predetermined mass in the range of approximately 0.7 to approximately 1.7 times the mass of the driver.

9. The vibratory tool of claim 8 wherein the hydraulically operated main drive rod has a mass of approximately 1.1 times the mass of the driver.

10. The vibratory tool of claim 1 wherein the rearwardly extending spacer wall of the driver axially spaces the driver intermediate impact surface and the main drive rod impact end in the retracted position thereof by an axial distance of at least approximately 1.2 inches.

11. The vibratory tool of claim 10 wherein the rearwardly extending spacer wall of the driver axially spaces the driver intermediate impact surface and the main drive rod impact end in the retracted position thereof by an axial distance of at least approximately 1.4 inches.

12. The vibratory tool of claim 1 further comprising a hydraulic circuit configured to rapidly reciprocate the main drive rod impact end between the retracted and extended positions at a rate of approximately twenty times per second or greater.

13. A power tool comprising:
a tool housing;
a nose stabilizing member slidably connected to the tool housing and projecting axially beyond the tool housing for engaging a guide block having rivets received therein;
a driver slidably mounted to the tool housing and axially shiftable along a driving axis of the tool housing;
a retainer device of the tool housing configured to keep the driver slidably mounted to the tool housing;

a plurality of drive rods of the driver that extend beyond the nose stabilizing member for fitting in openings of a guide block and driving rivets outwardly therefrom; and a biasing member that generates a biasing force biasing the nose stabilizing member and the tool housing apart so that with the nose stabilizing member pushed into engagement with the guide block sliding the tool housing toward the nose stabilizing member against the biasing force urges the nose stabilizing member into tight engagement with the guide block to stabilize the guide block.

14. The power tool of claim 13 wherein the tool housing includes an internal cavity with the driver received in the internal cavity and the retainer device includes a member extending into the cavity to engage the driver and limit axial sliding of the driver.

15. The power tool of claim 13 further comprising a main drive rod with an impact end thereof configured to strike the driver; and
the biasing member includes an inner void and coils extending about the inner void with the inner void being sized to permit the main drive rod impact end to travel into and along the void and strike the driver.

16. The power tool of claim 13 wherein the driver includes a shoulder configured to abut the retainer device and restrict axial movement of the driver beyond the retainer device.

17. A power tool comprising:
a tool housing;
a nose stabilizing member slidably connected to the tool housing and projecting axially beyond the tool housing for engaging a guide block having rivets received therein;
a driver slidably mounted to the tool housing and axially shiftable along a driving axis of the tool housing;
a retainer device of the tool housing configured to keep the driver slidably mounted to the tool housing;
a plurality of drive rods of the driver that extend beyond the nose stabilizing member for fitting in openings of a guide block and driving rivets outwardly therefrom; and
a biasing member that generates a biasing force biasing the nose stabilizing member and the tool housing apart so that with the nose stabilizing member pushed into engagement with the guide block sliding the tool housing toward the nose stabilizing member against the biasing force urges the nose stabilizing member into tight engagement with the guide block to stabilize the guide block,
wherein the driver is axially slidable between a proximal position where the driver abuts the tool housing and a distal position where the driver abuts the retainer device such that the driver is restricted to movement along the driving axis between the proximal and distal positions.

18. A power tool comprising:
a tool housing;
a nose stabilizing member slidably connected to the tool housing and projecting axially beyond the tool housing for engaging a guide block having rivets received therein;
a driver slidably mounted to the tool housing and axially shiftable along a driving axis of the tool housing;
a retainer device of the tool housing configured to keep the driver slidably mounted to the tool housing;
a plurality of drive rods of the driver that extend beyond the nose stabilizing member for fitting in openings of a guide block and driving rivets outwardly therefrom; and
a biasing member that generates a biasing force biasing the nose stabilizing member and the tool housing apart so that with the nose stabilizing member pushed into engagement with the guide block sliding the tool housing toward the nose stabilizing member against the biasing force urges the nose stabilizing member into tight engagement with the guide block to stabilize the guide block,
wherein the tool housing has an inwardly extending collar and the biasing member has a first end that seats against the inwardly extending collar of the tool housing.

19. The power tool of claim 18 wherein the nose stabilizing member includes an end portion facing the inwardly extending collar of the tool housing and the biasing member has a second end that seats against the end portion of the nose stabilizing member.

20. A vibratory tool for driving a plurality of rivets out from bores of a guide block and through an underlying conveyor belt, the tool comprising:
a tool housing;
a hydraulically actuated main drive rod mounted to the tool housing and having an impact end operable to rapidly reciprocate along a driving axis between retracted and extended positions;
a driver aligned with the main drive rod and slidably mounted to the tool housing for travel along the driving axis relative to the tool housing;
a plurality of elongated drive rod members of the driver configured and sized to extend into the guide block bores for engaging and driving the rivets out of the guide block bores;
a nose stabilizing member slidably connected to the tool housing and projecting axially beyond the tool housing for engaging the guide block so that with the nose stabilizing member pushed into engagement with the guide block sliding the tool housing toward the nose stabilizing member causes the tool housing to seat against the driver; and
a spring member having coils biasing the tool housing and nose stabilizing member apart so that sliding the tool housing toward the nose stabilizing member pushed against the guide block compresses the spring member and urges the nose stabilizing member tightly against the guide block with the coils extending about a void in which the main drive rod reciprocates and the driver travels.

21. The vibratory tool of claim 20 wherein the driver includes an impact surface for being impacted by the main drive rod impact end and the tool housing and the driver are configured to axially space the driver impact surface from the main drive rod impact end in the retracted position thereof by at least a predetermined axial distance with the tool housing seated against the driver.

22. The vibratory tool of claim 20 wherein the tool housing includes a shaft having a bore through which the hydraulically actuated main drive rod extends with the shaft being configured to seat against the driver with sliding of the tool housing toward the nose stabilizing member.

23. The vibratory tool of claim 20 wherein the slide connection between the tool housing and the nose stabilizing member includes an opening in one of the tool housing and the nose stabilizing member and a connection member of the other of the tool housing and the nose stabilizing member extending through the opening to slidably connect the tool housing and nose stabilizing member.

24. The vibratory tool of claim 23 wherein the opening is elongated along the driving axis and the opening and connection member are configured and sized to restrict relative movement between the tool housing and nose stabilizing member to sliding movement along the driving axis.

* * * * *